April 5, 1938.  E. C. McCLURE  2,113,352
STERLING CALCULATING MACHINE
Filed Jan. 31, 1934  20 Sheets-Sheet 1

INVENTOR:
E. C. McClure
By Marks & Clerk
Attys.

April 5, 1938.  E. C. McCLURE  2,113,352

STERLING CALCULATING MACHINE

Filed Jan. 31, 1934    20 Sheets-Sheet 3

INVENTOR
E. C. McClure

By Marks & Clerk
Attys.

April 5, 1938.  E. C. McCLURE  2,113,352

STERLING CALCULATING MACHINE

Filed Jan. 31, 1934  20 Sheets—Sheet 5

INVENTOR:
E. C. McClure
By: Marks & Clerk
ATYS.

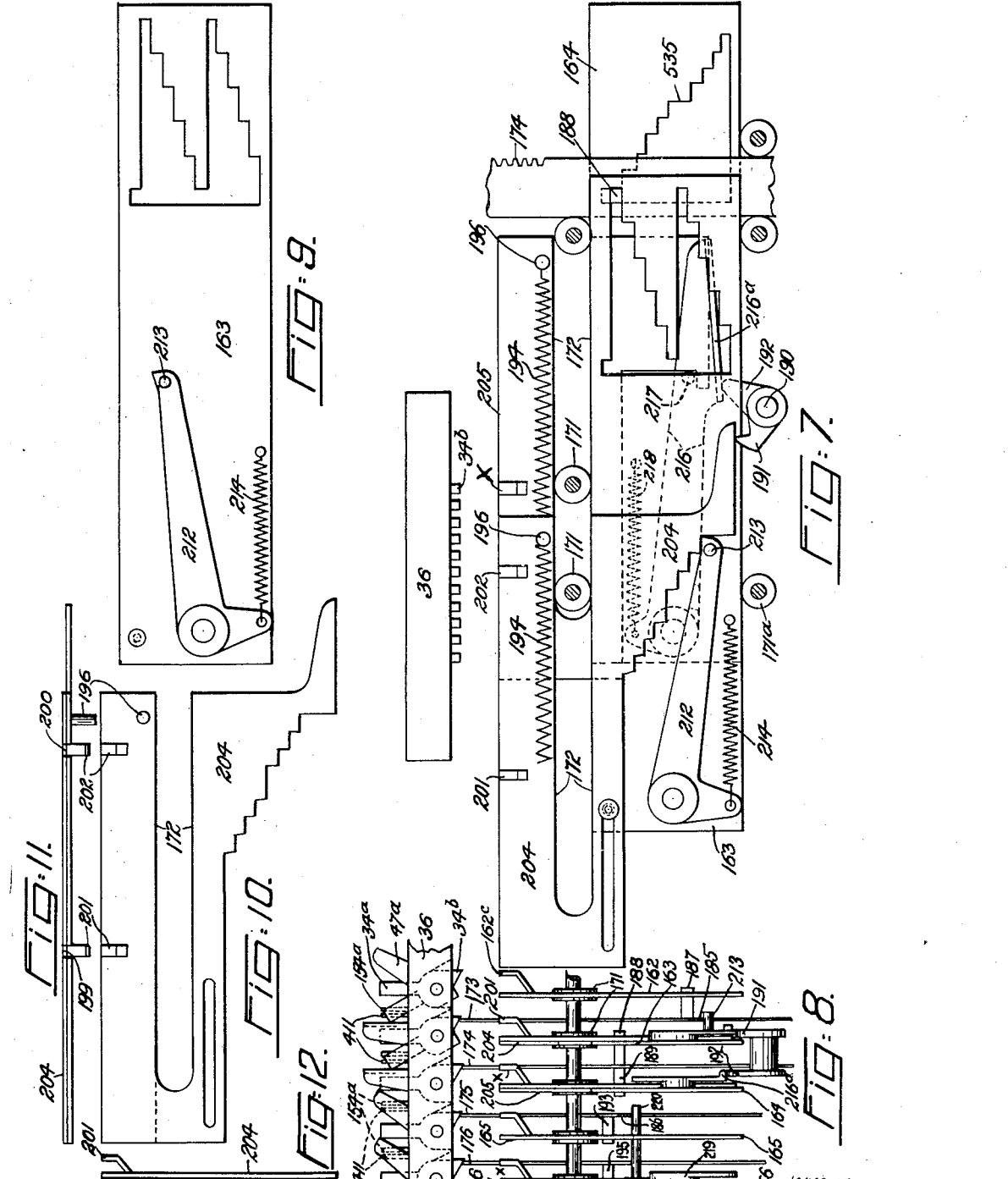

April 5, 1938. E. C. McCLURE 2,113,352
STERLING CALCULATING MACHINE
Filed Jan. 31, 1934 20 Sheets-Sheet 7
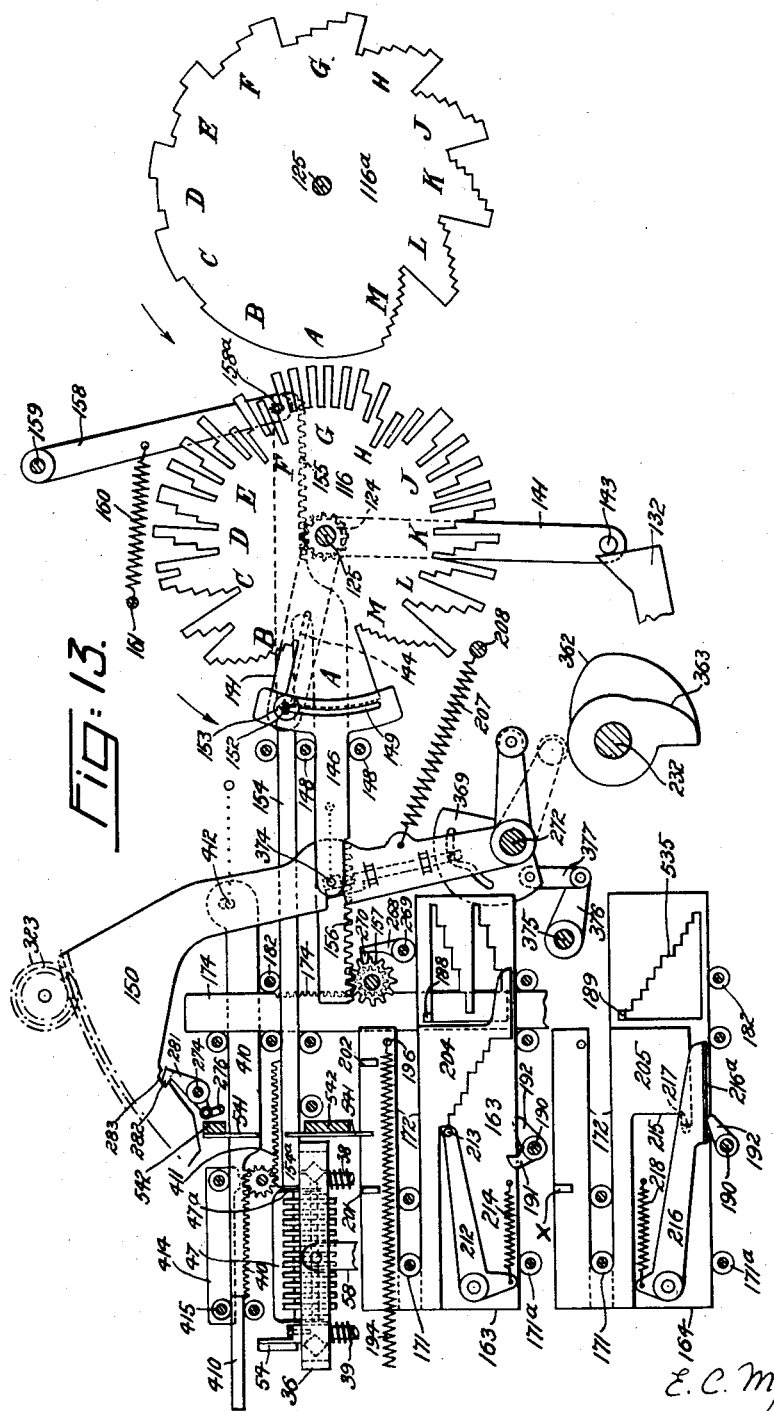

April 5, 1938.　　　E. C. McCLURE　　　2,113,352
STERLING CALCULATING MACHINE
Filed Jan. 31, 1934　　　20 Sheets-Sheet 8
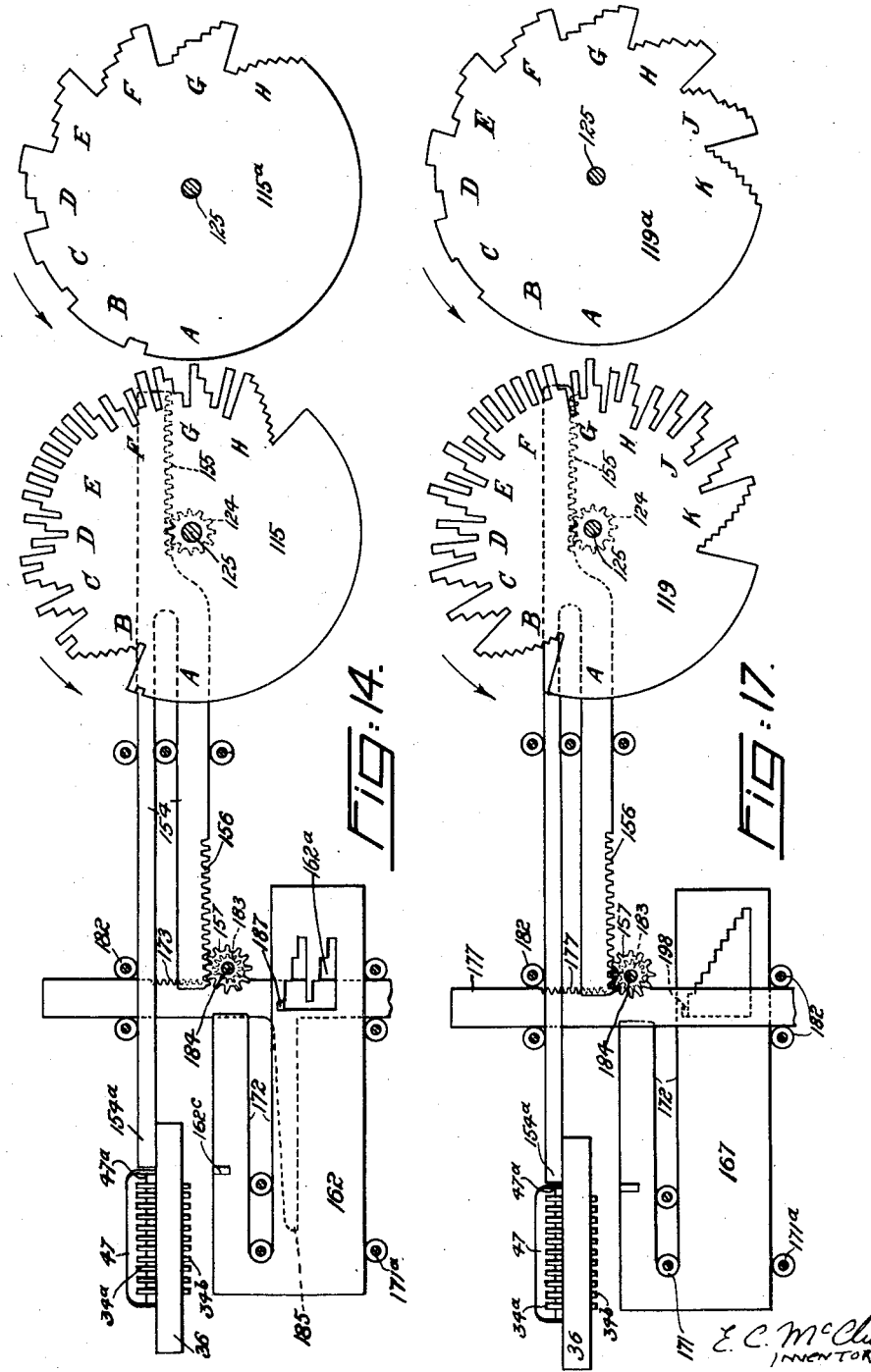

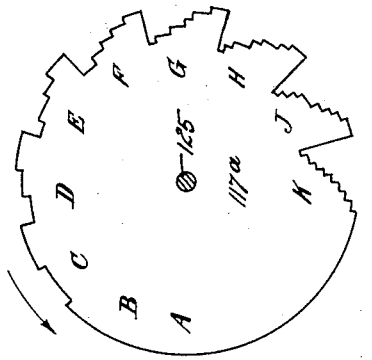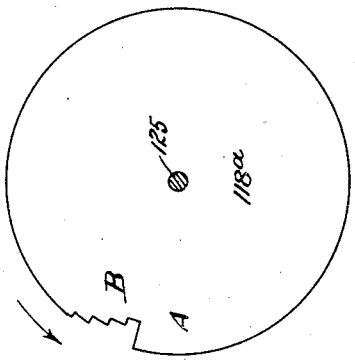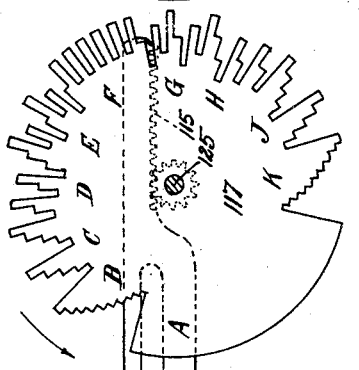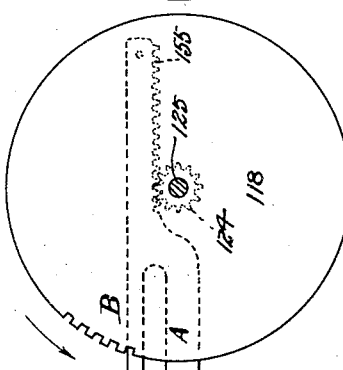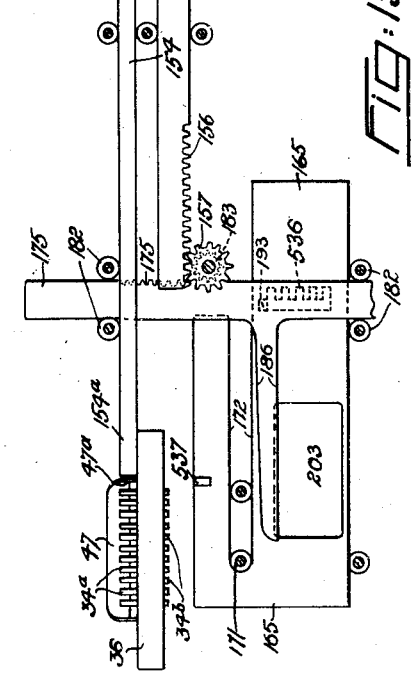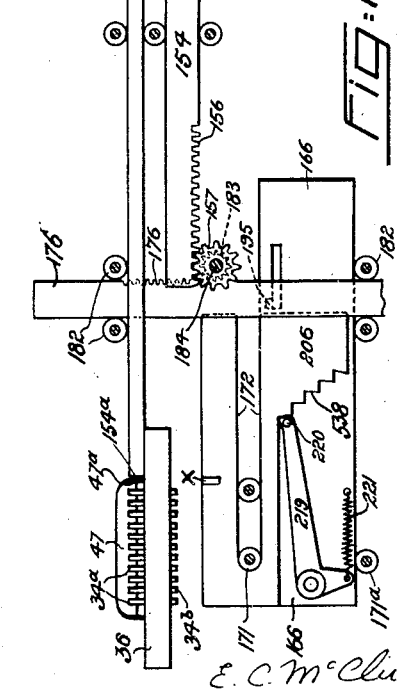

April 5, 1938. E. C. McCLURE 2,113,352
STERLING CALCULATING MACHINE
Filed Jan. 31, 1934 20 Sheets-Sheet 10
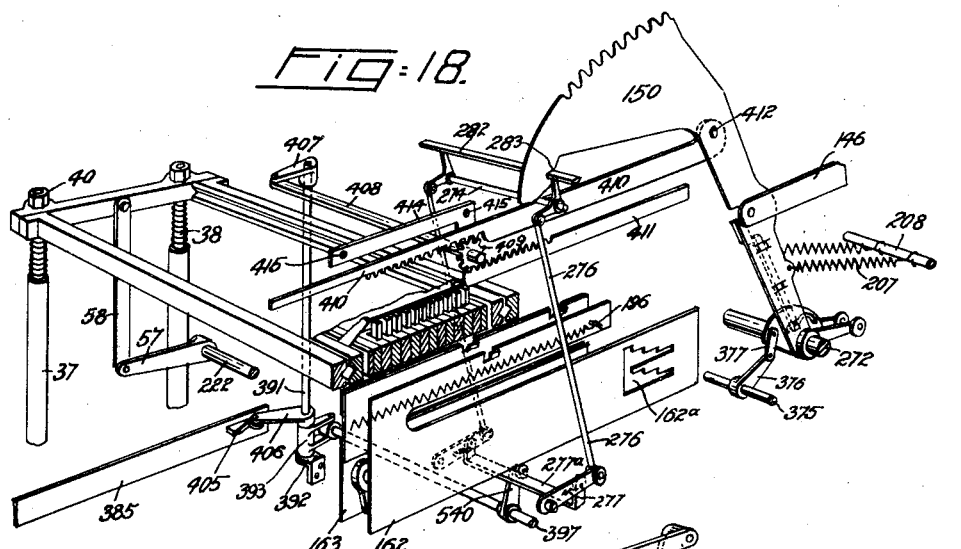
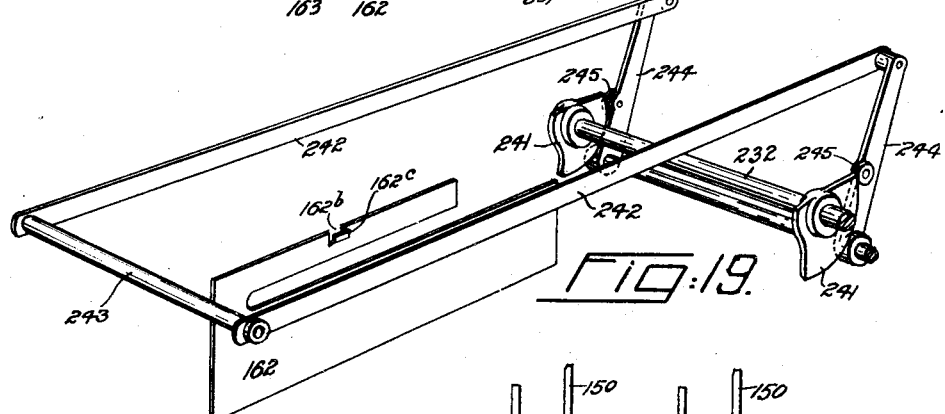
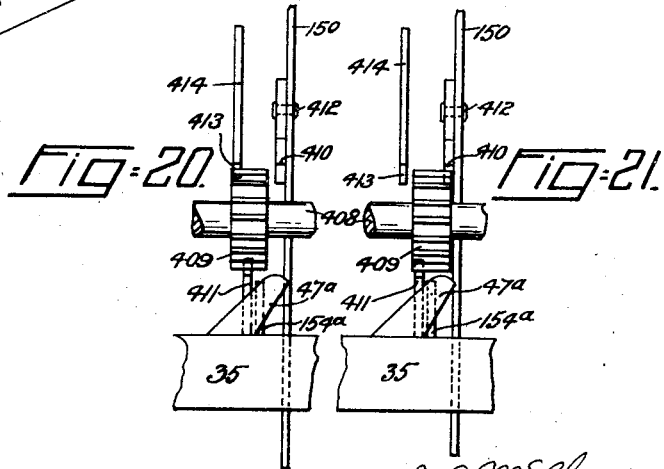
E. C. McClure
INVENTOR
By Marks & Clerk
Attys.

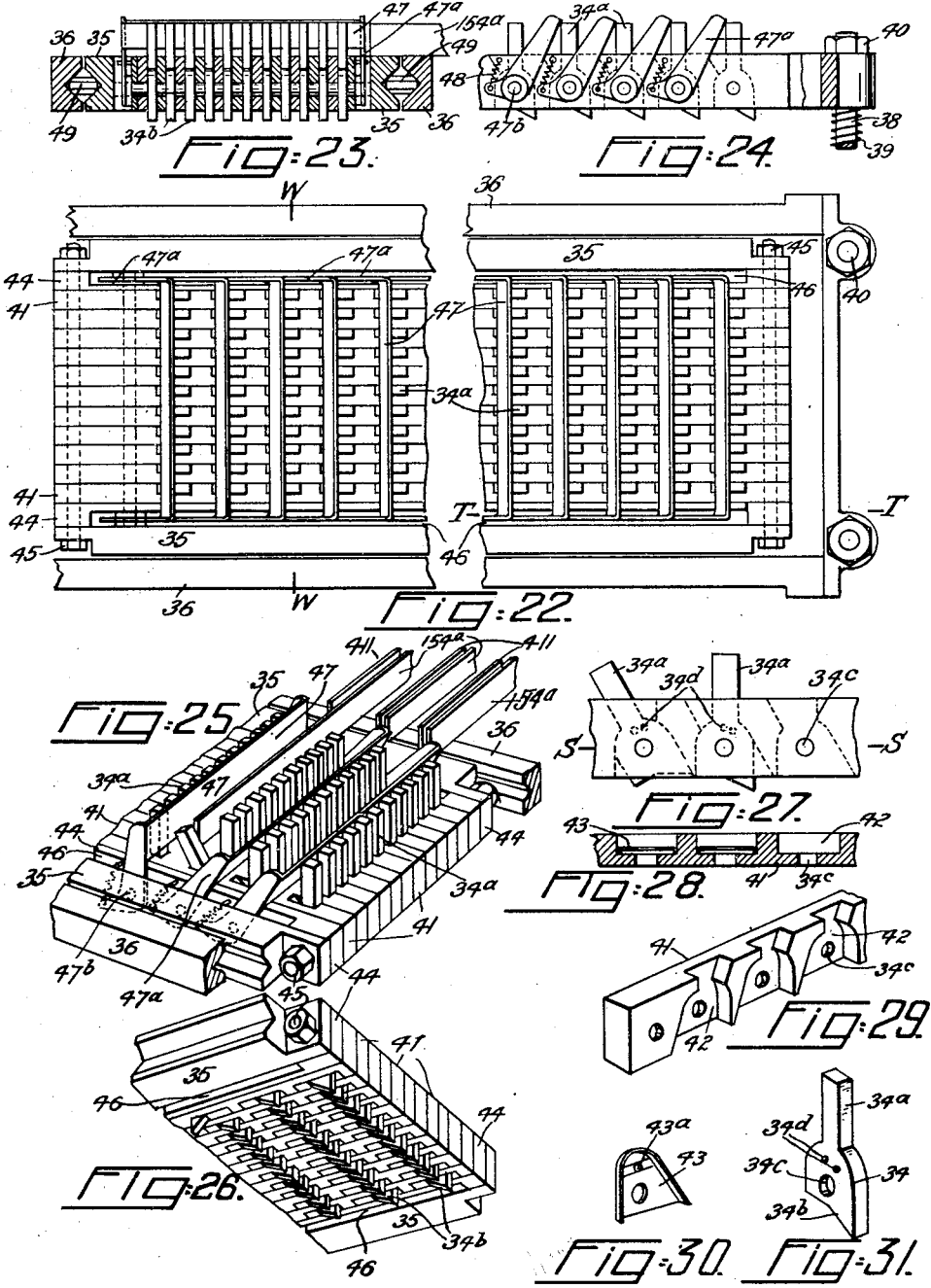

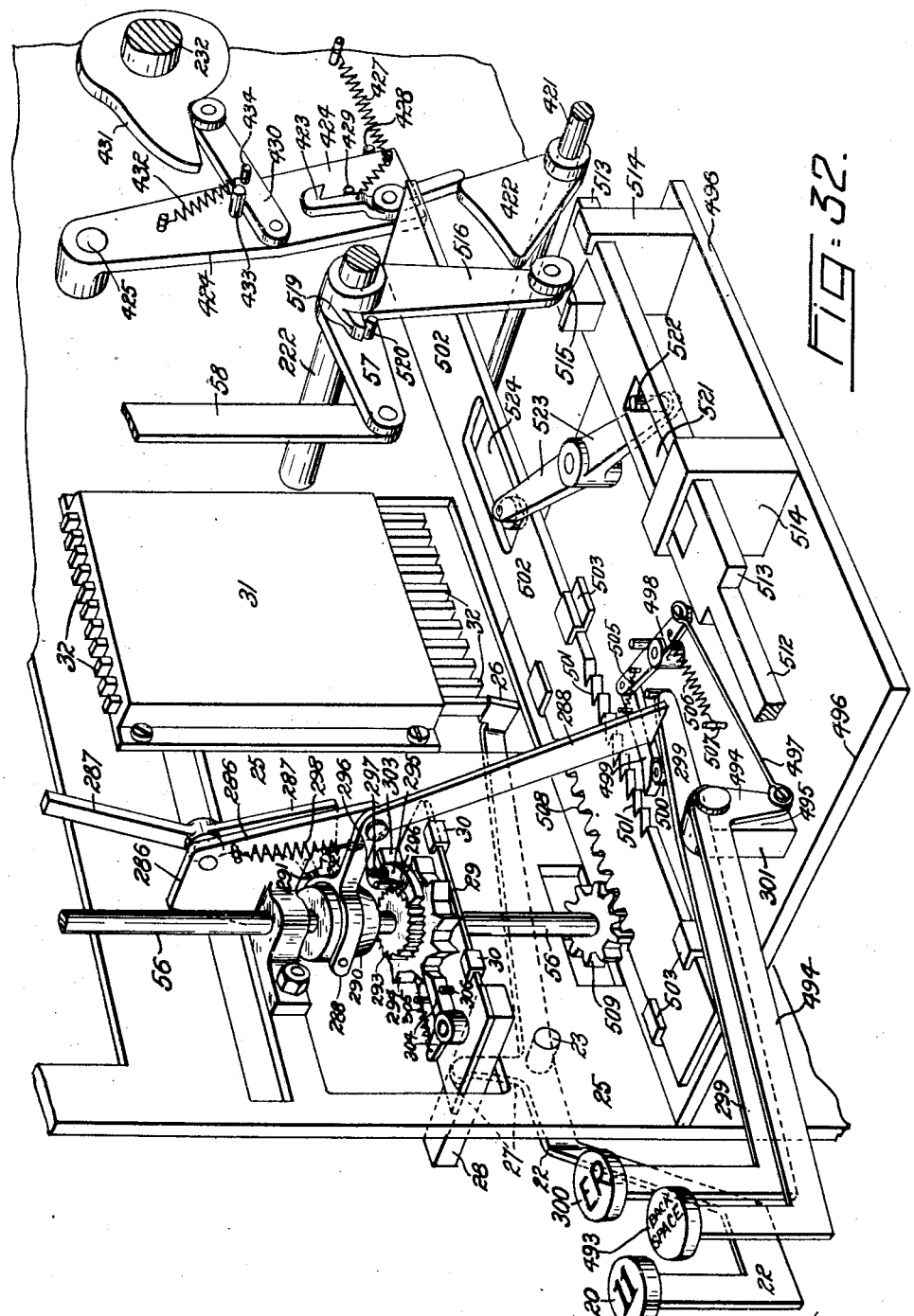

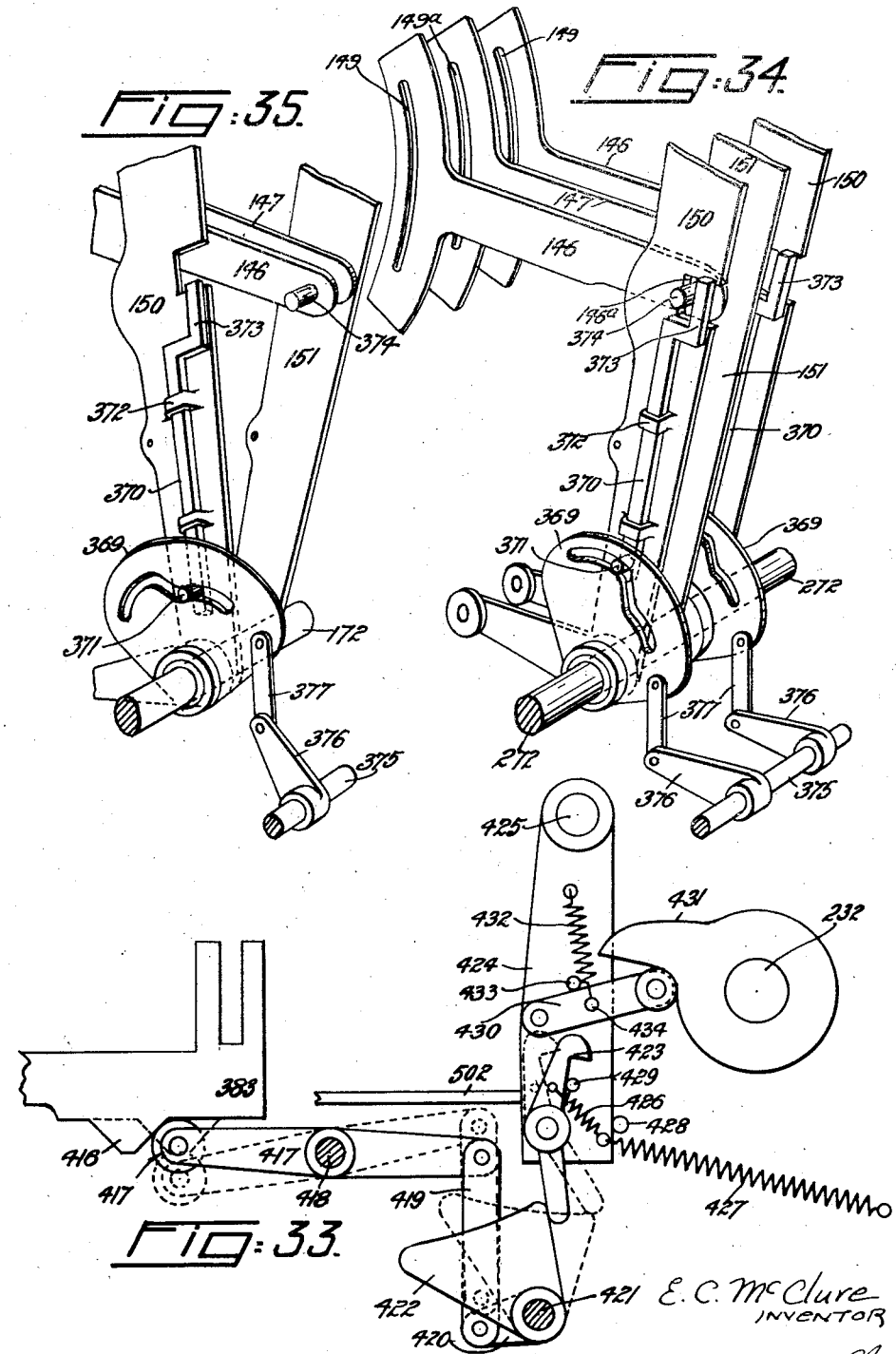

April 5, 1938.    E. C. McCLURE    2,113,352
STERLING CALCULATING MACHINE
Filed Jan. 31, 1934    20 Sheets-Sheet 14
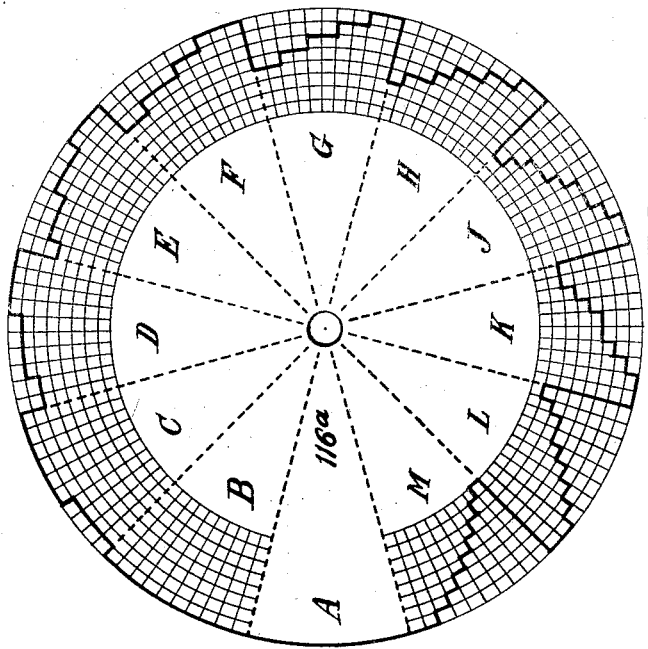
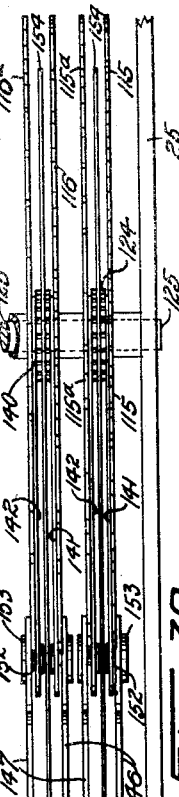
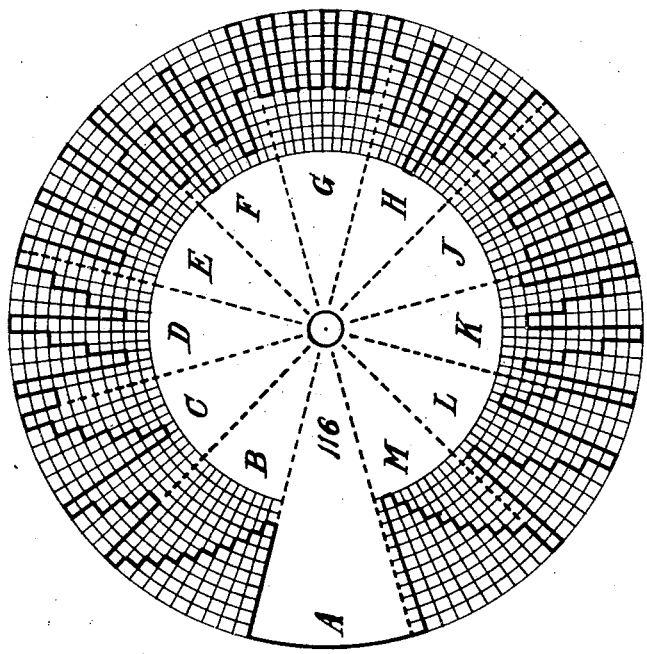
INVENTOR:
E. C. McClure
By Marks & Clerk
Attys.

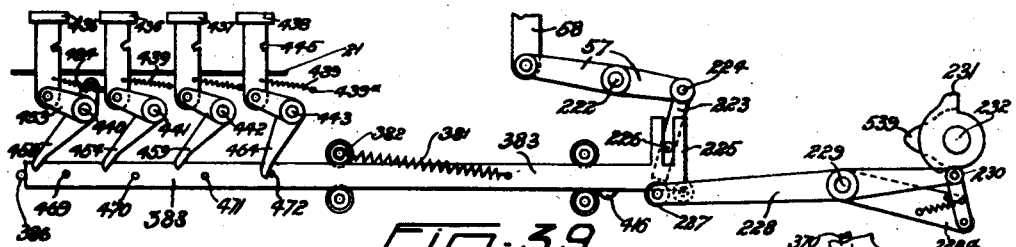

April 5, 1938. E. C. McCLURE 2,113,352
STERLING CALCULATING MACHINE
Filed Jan. 31, 1934 20 Sheets-Sheet 16
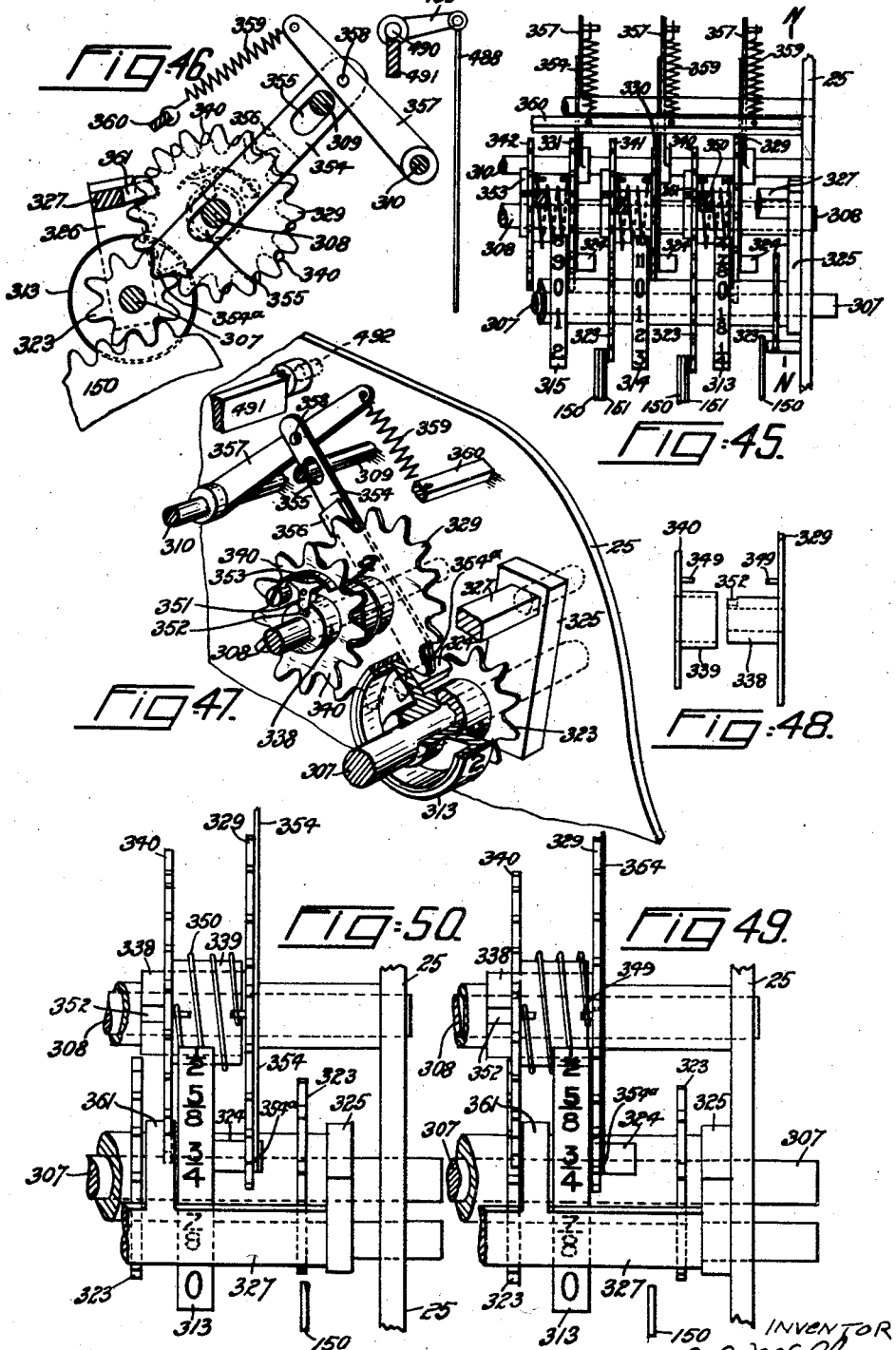

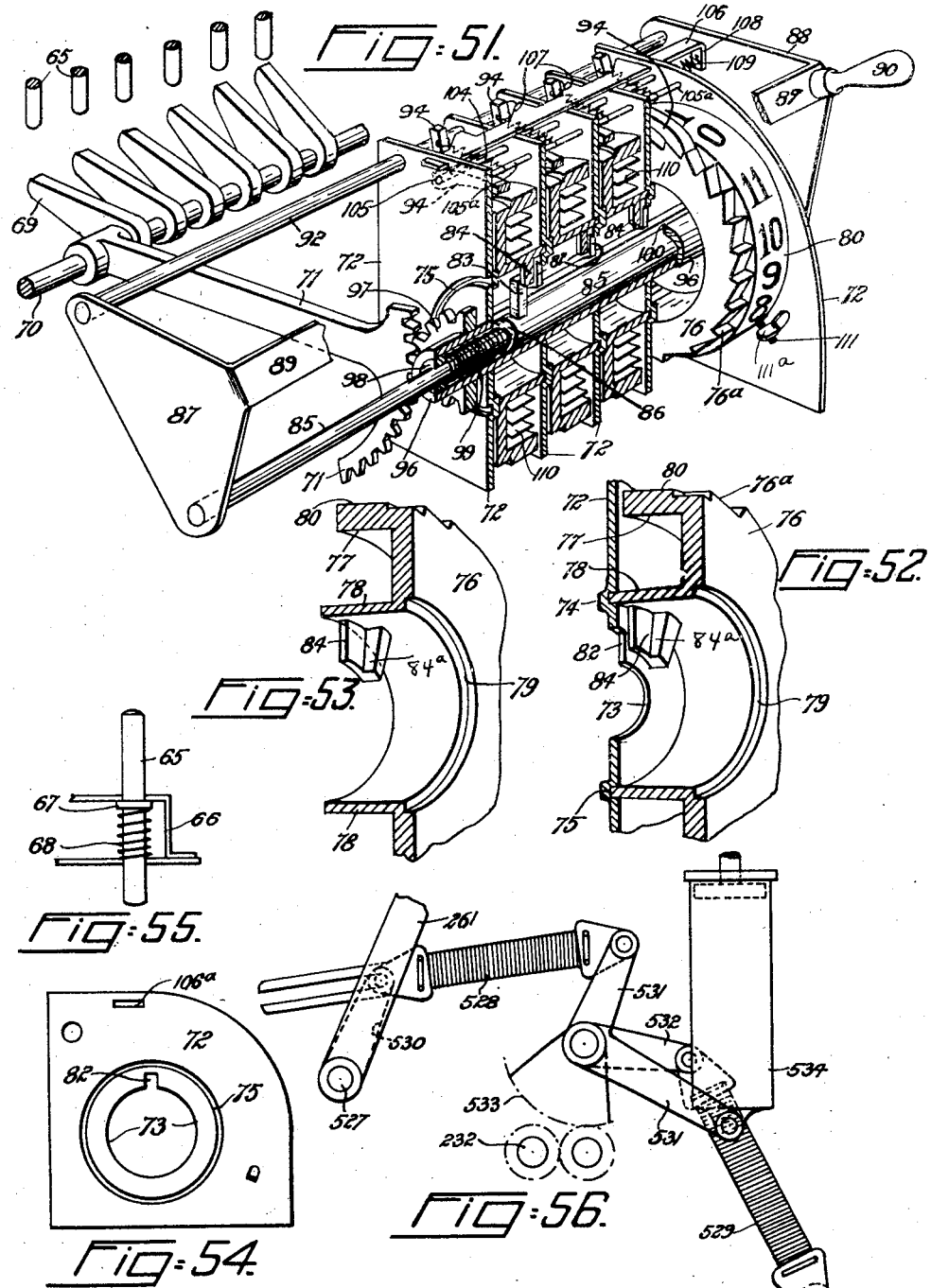

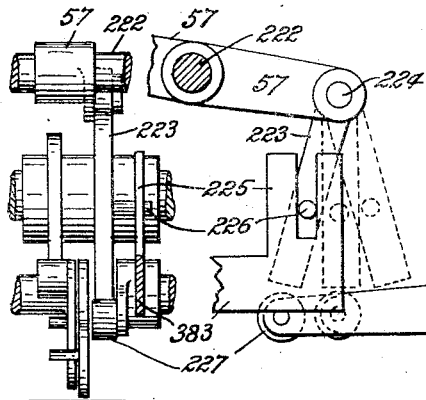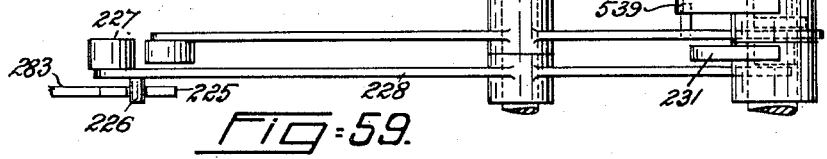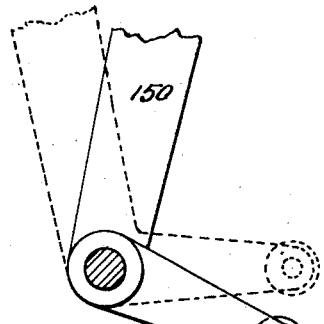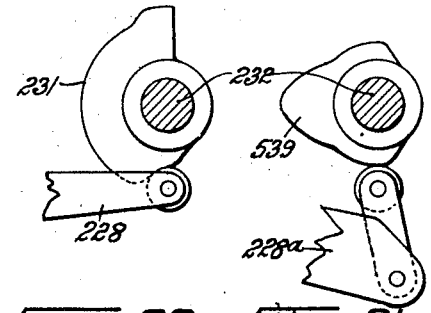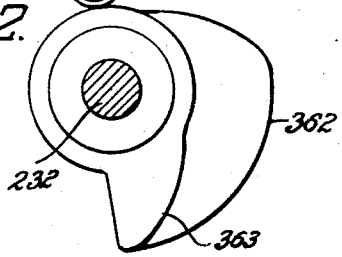

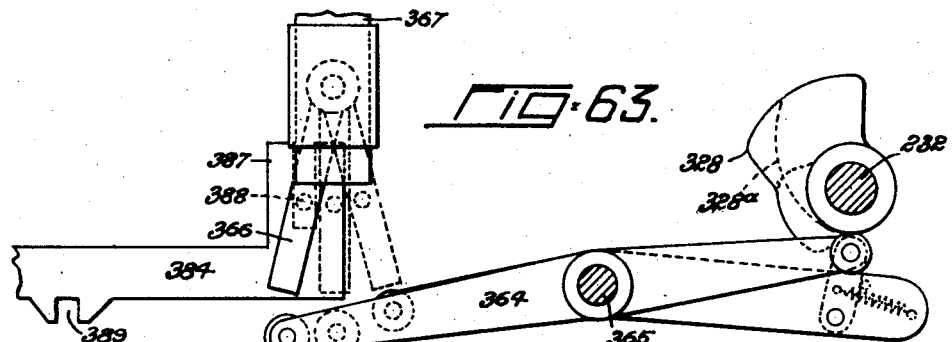
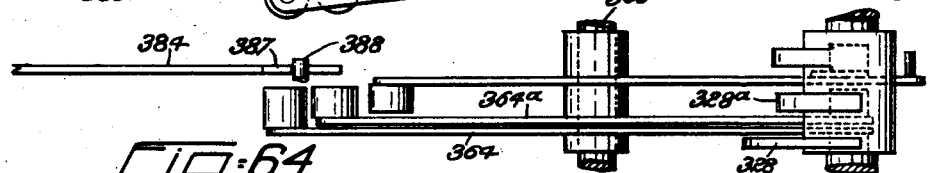
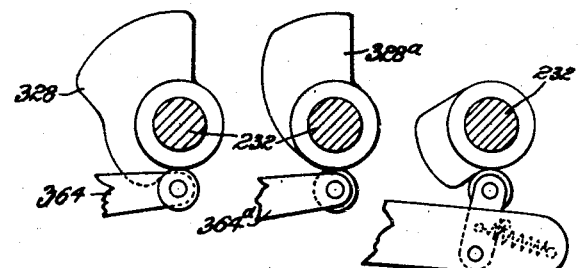
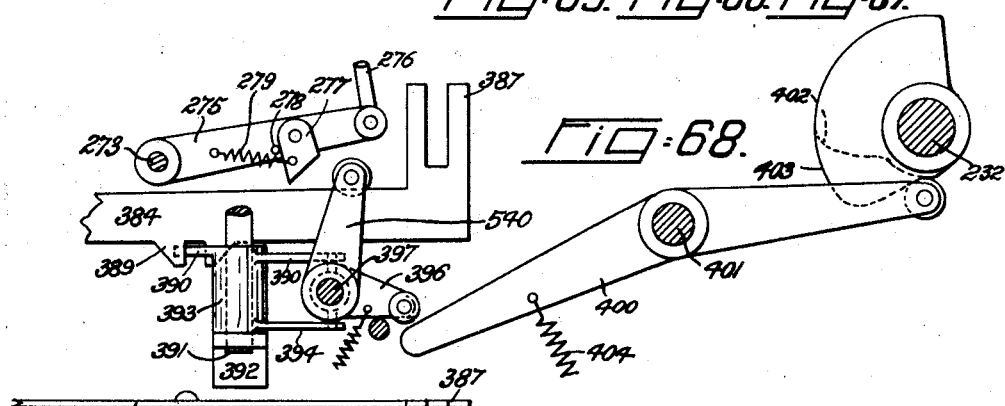
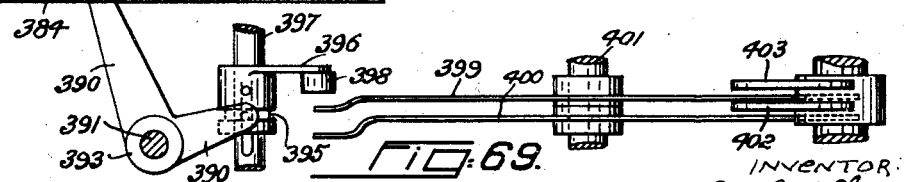

April 5, 1938.  E. C. McCLURE  2,113,352
STERLING CALCULATING MACHINE
Filed Jan. 31, 1934   20 Sheets-Sheet 20
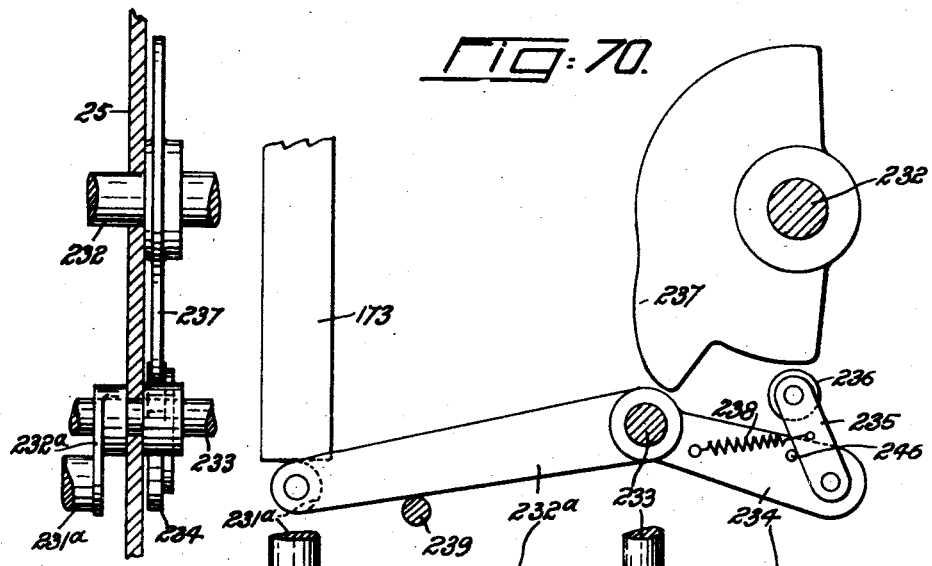
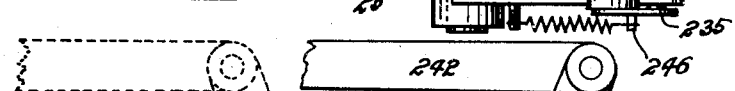
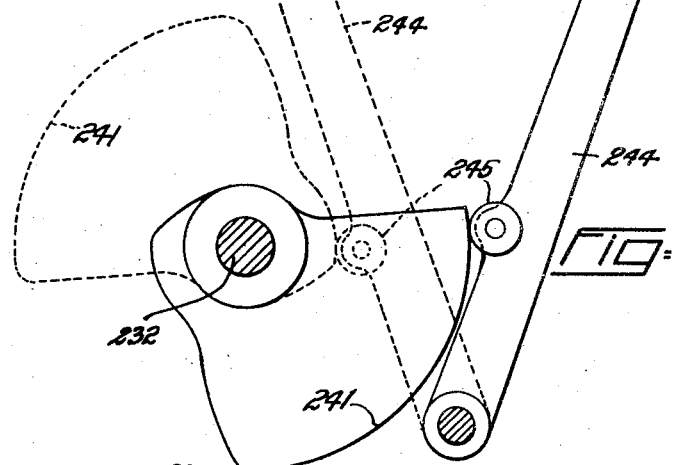
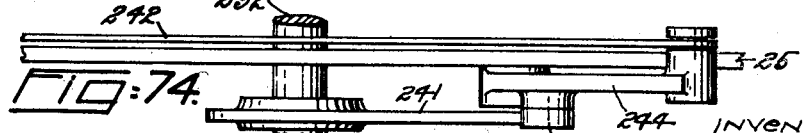
INVENTOR:
E. C. McClure
By Marks & Clark
Attys.

Patented Apr. 5, 1938

2,113,352

UNITED STATES PATENT OFFICE 2,113,352

STERLING CALCULATING MACHINE

Ernest Charles McClure, Wahroonga, New South Wales, Australia, assignor to Powers Accounting Machines Limited Application January 31, 1934, Serial No. 709,219
In Australia December 15, 1933

18 Claims. (Cl. 235—61)

Hitherto calculating machines that have been devised for the purpose of making calculations in sterling have not given entire satisfaction mainly for the reasons that the calculations are decimalized or that a portion of the calculation must be done mentally or worked out by the operator.

In order to reduce the mental effort and also to save time those portions of the calculations to be made by the operator have been tabulated and printed upon a card that is kept upon or adjacent to the machine where it can be quickly and easily referred to by the operator.

The main object of the present invention is to provide a machine which will make a complete calculation in sterling automatically and show the result upon register wheels of registering mechanism provided for that purpose without the necessity for the operator to make any calculations mental or otherwise.

A machine to achieve this object must be capable of calculating not only in pounds, shillings and pence (sterling) but also in fractions of one penny, and the present invention provides means for calculating amounts which may include eighths of one penny without the use of decimals.

The machine may be used for adding, subtracting and multiplying in sterling and whole numbers and dividing whole numbers but as additions and multiplications are the calculations mostly used the description hereinafter given will be more particularly directed to the mechanical means provided for carrying out such calculations.

This invention relates to multiplying machines operating in non-decimal notations, e. g. for dealing with calculations involving the multiplication of a sterling monetary amount by a decimal number.

According to the present invention a multiplying machine operating in non-decimal notations without decimalization, comprises in combination a single set of denominational devices (one device for each multiplicand denomination) representing the products of the multiplier digits 1 to 9 multiplied by each digit in the respective non-decimal denomination, range selecting means for selecting the range of products appropriate to each multiplicand digit entered into the machine, means for selecting from that range the particular product appropriate to a multiplier digit entered into the machine, and for transmitting the product thereby selected into an accumulator and means operative under the control of the range selecting means when selecting the ranges of products appropriate to the digits of the initially entered multiplicand, to condition the machine to select later from said single set of denominational devices the respective product ranges appropriate to the digits of the tens multiple of the multiplicand.

Preferably the multiplicand is entered into the machine by disposing settable members to represent the digits of the multiplicand, and means for reading the setting of the settable members operates the range selecting means in accordance with said setting and also conditions the machine to change the setting of the settable members to represent the tens multiple of the amount represented by said setting.

The setting changing means may comprise denominational setting changing elements each of which is movable from a normal position under the control of elements for reading the setting of the settable members to an extent representing the digit in the respective denomination of the tens multiple of the multiplicand.

According to a preferred form of the invention those setting changing elements of denominations in which the tens multiple of the corresponding denominational digit of the multiplicand may contain a significant digit are under the direct control of the corresponding denominational reading element, while means is provided for imparting to a setting changing element of higher denomination under the control of a reading element of lower denomination a movement, additional to any movement imparted to said setting changing element under the control of its own denominational reading element, and representing the digit in that higher denomination of the tens multiple of the multiplicand digit of said lower denomination.

The invention also includes as a feature a construction for sterling calculations, wherein the units of pounds setting changing element has imparted to it under the control of the reading element for the units of shillings denomination a movement representing the units of pounds digit of the tens multiple of the units of shillings digit of the multiplicand.

In a preferred construction according to the invention the setting changing elements are in the form of slides having notches or steps co-operating with the element which controls the slide, the notches in slides of denominations in which the tens multiple of the corresponding denominational digit of the multiplicand may have a significant digit co-operating with the corresponding denominational control element, while the notches in slides of denominations in which the tens multiple of the corresponding denominational digit of the multiplicand never has a significant digit co-operate with a control element of lower denomination, and those slides to which a movement is to be imparted under the control both of the corresponding control element and of a control element of lower denomination are made in two relatively movable parts constituting a main slide and an auxiliary slide whereof the main slide has notches co-operating with the corresponding denominational control element and the auxiliary slide has notches co-operating with a control member of lower denomination.

Moreover, the multiplicand may be entered into the machine by setting the appropriate stops in a set of columns of stops in which case each setting changing element carries a projection disposed so as to register with a given stop when the setting changing element has been moved to an extent representing the value of that stop; means being provided for effecting relative movement between the stops and the setting changing elements to effect restoration to normal position of previously set stops and to cause the projections to set the stops with which they are in register.

In order to explain the invention more fully one construction of a manually operable machine for multiplying sterling monetary amounts by decimal numbers will now be briefly described by way of example and later in more detail with reference to the accompanying drawings.

In this construction each denominational device, representing the products of the multiplied digits 1 to 9 multiplied by each digit in the respective non-decimal denomination, comprises a pair of stepped or notched circular partial product plates hereinafter referred to as "multiplier plates".

The multiplicand digits are entered into the machine by disposing settable members, which are in the form of stops to represent these digits. These settable stops are disposed in columns in a step-by-step operated carriage, hereinafter referred to as "a pin carriage".

The range selecting means for selecting the range of products appropriate to the multiplicand digits comprises a set of denominational racks geared to the respective denominational partial product plates so that when a rack is moved an amount corresponding to the value of a multiplicand digit the associated pair of multiplier plates is rotated to bring the appropriate range of product notches or stops into position for the selection from that range of the particular notch or stop corresponding to a multiplier digit.

Each of these denominational racks is operated by a corresponding denominational element for reading the setting of the appropriate column of stops in the pin carriage. These denominational reading elements are in the form of reciprocating bars, hereinafter termed "regulator bars", which are connected to or formed integral with the corresponding denominational racks for actuating the multiplier plates.

The regulator bars which read the setting of the stops also serve to condition the machine to change the setting of the stops to represent the tens multiple of said setting.

The means for changing the setting comprises denominational setting changing elements in the form of slides, hereinafter termed pin-setting plates. Those pin-setting plates of denominations in which the tens multiple of the corresponding denominational digit of the multiplicand may contain a significant digit are under the direct control of the corresponding regulator bar. This control is effected by means of a control element in the form of a rack disposed at right angles to the regulator bar and engaging with a pinion which also engages with rack teeth on the regulator bar. Thus when the regulator bar moves up to a stop the control rack moves at right angles to the regulator bar and permits the pin-setting plate to move under spring action, a distance representing the corresponding denominational digit of the tens multiple of the digit represented by the stop. The means whereby the control rack permits the pin-setting plate to move the proper amount will be described later with reference to the accompanying drawings.

The means already mentioned for imparting a movement to a setting changing element or pin-setting plate of higher denomination under the control of a reading element or regulator bar of lower denomination will be described in detail with reference to the accompanying drawings. It will suffice here to state that the control element for permitting such movement of a pin-setting plate comprises a rack arranged at right angles to the regulator bar in question and geared thereto as already described for the case of the direct control of a pin-setting plate from its corresponding denominational regulator bar.

After the pin-setting plates have thus been operated the pin carriage is moved, at a later stage in the operation of the machine, relatively to the pin-setting plates whereby as hereinafter described the stop setting is changed to represent the tens multiple of the previous setting.

From the foregoing description it will be seen that the operation of reading the stop setting by means of the regulator bars, since it also controls the movement of the pin-setting plates, also conditions the machine to change the setting of the stops to represent the digits of the tens multiple of the previous setting. Further, since the setting of the stops governs the selection of the product ranges, the reading of the stop setting conditions the machine to select later the product ranges appropriate to the digits of the tens multiple of said setting.

A brief description has already been given of the manner in which each pair of multiplier plates is rotated to bring the range of product steps or notches corresponding to a multiplicand digit into position for the selection from that range of the particular notch or step corresponding to a multiplier digit.

This selection of the particular notch from a range is made by a notch sensing element provided for each multiplier plate. Each notch sensing element is in the form of a pin carried parallel to the axis of the multiplier plates and mounted to slide in a longitudinal slot formed in an arm moving radially of the multiplier plates.

Each radial arm can move about the centre of the multiplying plates to an extent equal to one range of notches in a plate and the normal position of all the pins is such that each pin is opposite the 0 position in any range of notches which may be presented to it.

The notch sensing pins are all moved simultaneously to a position in the range corresponding to a multiplier digit by the means which enters the multiplier digits into the machine as will be hereinafter described with reference to the accompanying drawings. Thereafter the notch sensing pins are moved along their slots a distance determined by the depth of the selected notch whereby the movements of the two pins associated with a pair of multiplier plates respectively represent the right and left hand digits of a partial product obtained by the multiplication of a multiplicand digit by a multiplier digit.

Associated with each pair of multiplying plates is a pair of denominational quadrantal racks which serve to transmit to a register the partial products obtained.

To this end one quadrantal rack of each pair is connected to the notch sensing pin associated with the corresponding multiplier plate, while the other rack is connected to the pin associated with the other multiplier plate. Thus when the pins move into the notches the quadrantal racks move from a normal position to a like extent.

The register comprises a set of denominational toothed wheels having carry-over mechanism which will be described later with reference to the drawings.

Means is provided for bringing each of the register wheels first into engagement with one quadrantal rack of the corresponding denominational pair and for then zeroizing these racks whereby one digit of each partial product is transmitted to the appropriate register wheel.

The register wheels are then moved to bring each wheel into engagement with the other rack of the corresponding pair and these racks are then zeroized whereby the other digit of each partial product is transmitted to the register.

After multiplication by one multiplier digit has been effected the pin-setting plates are in positions corresponding to the tens multiple of the multiplicand and the pin carriage is moved relatively to the pin-setting plates whereby the stop setting is changed to a setting representing ten times the multiplicand.

The tens digit of the multiplier is then entered into the machine and multiplication of the amount set up on the stops by this digit is then carried out in the manner already described whereby the product of the tens multiple of the multiplicand multiplied by thetens digit of the multiplier is added to the amount already standing in the register. At the end of this operation the pin-setting plates will be positioned to represent the tens multiple of the preceding stop setting, i. e. one hundred times the original multiplicand, so that multiplication by a hundreds multiplier digit can be effected if desired.

The machine which has been briefly described above will now be described in greater detail with reference to the accompanying drawings in which:—

Fig. 7 is a side elevation showing the pence plate and its supplementary plate and portion of the unit of shillings plate and its supplementary plate, the pin carriage being shown in its relative position above the plates.

Fig. 8 is an end elevation of the fractions of pence and supplementary pence, units of shillings and supplementary units of shillings, tens of shillings and units of pounds and supplementary plates, portions of the pin carriage and stops thereon being shown in side elevation in their relative positions above the plates.

Fig. 9 is an elevation of the pence plate with the supplementary plate removed therefrom.

Fig. 10 is an elevation of the supplementary pence plate.

Fig. 11 is a plan of the supplementary pence plate.

Fig. 12 is an elevation of Fig. 10.

Fig. 13 is a side elevation showing the pence multiplier plate together with a co-acting quadrantal rack and its associated parts for multiplying, adding, subtracting and dividing, the co-acting pence plate being removed from its position for obvious reasons. In this view is also shown the pence and supplementary pence pin setting plates together with the pence to shilling pin setting plate.

Fig. 14 is a side elevation of the fractions multiplier plates and their associated pin setting plate with combined regulator bar or rack and vertical rack and pin carriage.

Fig. 15 is a side elevation of the units of shillings multiplier plates and their associated pin setting plate with combined regulator bar and rack, vertical rack and pin carriage.

Fig. 16 is a side elevation of the tens of shillings multiplier plates and their associated pin setting plate with combined regulator bar and rack, vertical rack and pin carriage.

Fig. 17 is a side elevation of the units of pounds multiplier plates and their associated pin setting plates with combined regulator bar and rack, vertical rack and pin carriage.

Fig. 18 is a perspective view showing the mechanism brought into operation by the depression of the addition, subtraction or division keys.

Fig. 19 is a perspective view of the cams and associated levers and frame for returning the pin setting and supplementary plates to their normal position.

Fig. 20 is an enlarged fragmentary front elevation showing the pinion and racks used in addition, subtraction and division the pinion being shown out of engagement with one rack.

Fig. 21 is a similar view to that at Fig. 20 but the pinion is in engagement with both of the racks.

Fig. 22 is a plan of the pin carriage and portion of the frame in which it slides, a central portion being broken away to economize space.

Fig. 23 is a sectional view of the pin carriage the section being taken on the line W—W of Fig. 22.

Fig. 24 is a sectional elevation of a portion of the pin carriage, the section being taken on the line T—T of Fig. 22.

Fig. 25 is a perspective view of a portion of the top of the pin carriage showing one of the stop pins moved to its set position and limiting the travel of a combined regulator bar and rack.

Fig. 26 is a perspective view of that portion of the pin carriage shown at Fig. 25 and showing the position of the cam face of the stop pin that has been set.

Fig. 27 is a side elevation showing the normal and set position of two stop pins.

Fig. 28 is a sectional view taken on the line S—S of Fig. 27, the stop pins having been removed, but the spring plates being left in position.

Fig. 29 is a perspective view of the rear or inner face of that portion of the pin carriage shown at Fig. 27.

Fig. 30 is a perspective view of one of the spring plates shown at Fig. 28.

Fig. 31 is a perspective view of one of the stop pins.

Fig. 32 is a perspective view showing the escapement and its operating key and intermediate mechanism, the back spacing key and mechanism, one of the bank of multiplicand keys and its association with the escapement, the vertical pins for setting the stop pins in the pin carriage, the parts operated by the error lever and the timing mechanism for returning the pin carriage to its normal position.

Fig. 33 is a side elevation showing the timing mechanism positioned by the depression of the addition, subtraction, multiplier and clearance keys and mechanism shown in its normal or multiplying position.

Fig. 34 is a perspective view of the operating mechanism for releasing the quadrantal racks from the slotted T-shaped connecting plates.

Fig. 35 is a perspective view showing one quadrantal rack that has been released from the slotted T-shaped connecting plate.

Fig. 36 is a plan of the fractions and pence multiplier plates, combined regulator bars, vertical racks, quadrantal racks, slotted T-shaped connecting plates, pinions and portion of the re-setting plates.

Fig. 37 is a graph of one of the multiplier plates showing the pence and the sections of steps thereon representing one penny to eleven pence multiplied by one to nine and the number of units of movement represented by each stop.

Fig. 38 is a graph showing the pence carry forward plate forming the second of a pair of pence plates with the sections of steps thereon representing the shillings carried forward as the result of the multiplication of one penny to eleven pence by 1 to 9 and the number of units of movement represented by each step.

Figure 1:
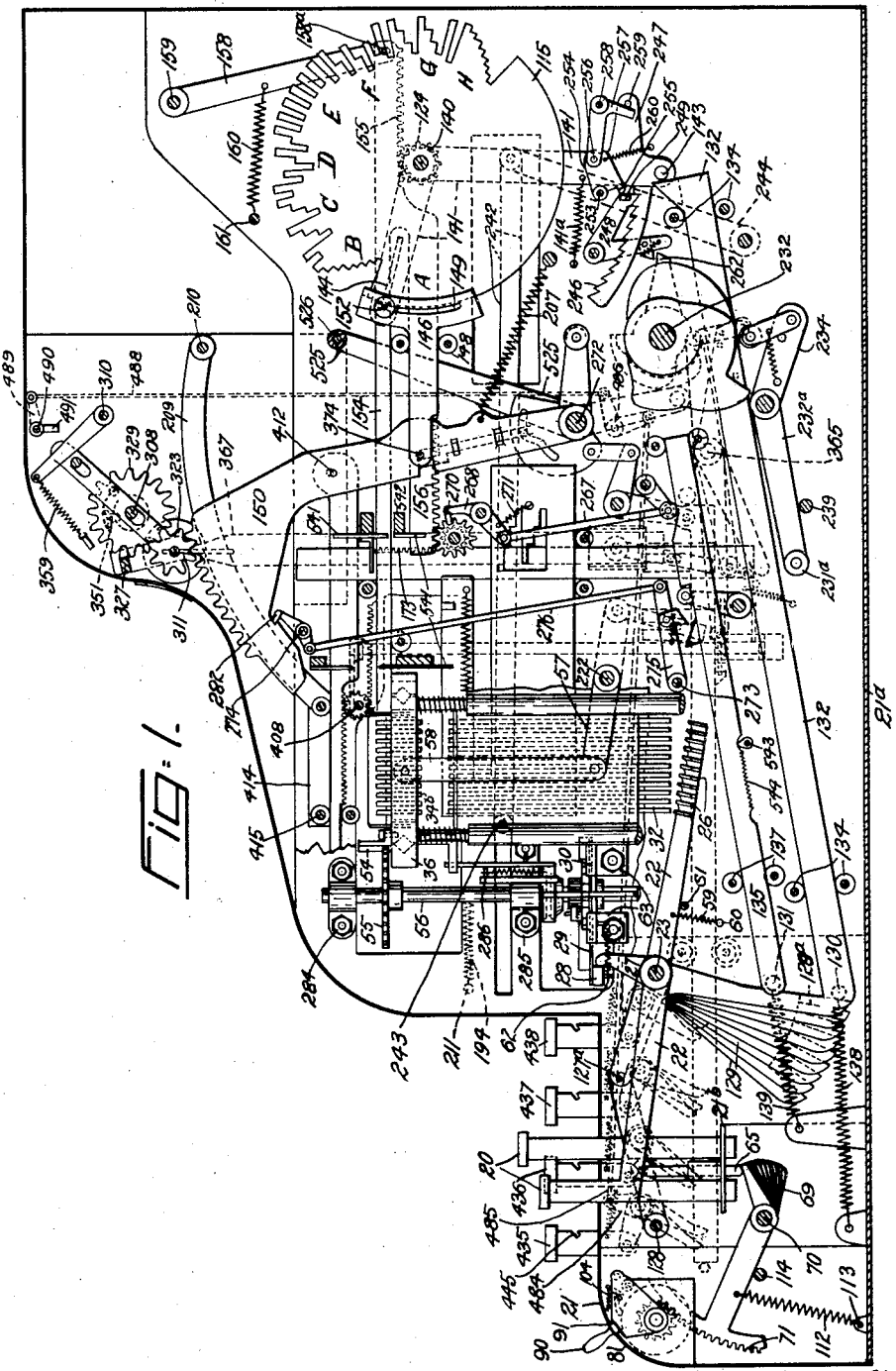
Fig. 1 is a sectional side elevation of a machine constructed according to this invention but for the sake of clearness certain parts have been omitted notably the handle, the handle control springs, dash pot, levers and connecting links, also the escapement release, back spacer, error lever and their connections, the pin carriage and escapement being shown in elevation.

Fig. 39 is a side elevation illustrating the clearance, addition, subtraction and division keys and a sliding bar and associated mechanism actuated by the depression of any one of such keys for the purpose of positioning mechanism for lowering the pin carriage on to the upper edges of the pin setting plates and returning it to its normal position (horizontally) when the operating handle is manually operated.

Fig. 40 is a side elevation illustrating the clearance, addition, subtraction and division keys and a sliding bar and associated mechanism actuated by the depression of any one of such keys for the purpose of releasing alternate quadrantal racks from the multiplier unit.

Fig. 41 is a side elevation illustrating the clearance, addition, subtraction and division keys and the associated mechanism actuated by the depression of any one of such keys for the purpose of engaging the registering mechanism.

Fig. 42 is a side elevation of other mechanism associated with the parts illustrated at Fig. 41 and actuated by the depression of any one of the clearance, addition, subtraction or division keys for the purpose of releasing the quadrantal racks upon the operation of the handle.

Fig. 43 is a side elevation illustrating the addition, subtraction and division keys and associated mechanism for the purpose of positioning the mechanism which in combination with the pin carriage controls the amount of movement to be made by the quadrantal racks in all calculations other than multiplication.

Fig. 44 is an enlarged perspective view showing the method of constructing any one of the addition, subtraction and division keys so that the depression of any one will actuate four push rods shown at Figs. 39, 40, 41 and 43 the clearance key being similarly constructed but it actuates only three of the push rods.

Fig. 45 is a front elevation showing the fractions, pence and units of shillings units of the registering mechanism but a portion of a bar carrying spaced locking teeth has been broken away the spaced locking teeth being shown in section.

Fig. 46 is a sectional side elevation taken on the line N—N of Fig. 45.

Fig. 47 is a fragmentary perspective view partly in section of the fraction unit of the registering mechanism.

Fig. 48 is a detail view showing the construction of a carry forward wheel and its coacting wheel.

Fig. 49 is an enlarged plan view of the fractions unit of the registering mechanism and the carry forward wheel relating to that unit the parts being shown in normal or zero position.

Fig. 50 is a similar view to Fig. 49 but the unit has been moved laterally in readiness to be actuated by the quadrantal racks.

Fig. 51 is a perspective view of the indicator or registering mechanism for showing the amount of the multiplicand represented by the keys depressed.

Fig. 52 is a detail sectional perspective view of a portion of an indicating wheel or drum and division plate and showing a double tooth formed within the indicating drum.

Fig. 53 is a similar view to Fig. 52 but the division plate has been removed.

Fig. 54 is a side elevation of a division plate.

Fig. 55 is an elevation showing the mounting of vertical pins depressed by the multiplicand or multiplier keys and the means employed for returning them to their normal positions.

Fig. 56 is a side elevation of the operating handle lever and a system of springs, levers, quadrantal racks and dash pot through which the cam shaft is operated.

Fig. 57 is a side elevation on an enlarged scale of the operating mechanism associated with the manually operated keys shown at Fig. 39.

Fig. 58 is an end elevation of Fig. 57.

Fig. 59 a plan view of Fig. 57.

Figs. 60 and 61 are fragmentary views showing levers and cams associated with Fig. 57.

Fig. 62 is a view showing the lower end of a quadrantal rack and cams for operating same, the normal position of the quadrantal rack being indicated by dotted lines.

Fig. 63 is a side elevation on an enlarged scale of the mechanism associated with the manually operated keys shown at Fig. 41.

Fig. 64 is a plan view of Fig. 63.

Figs. 65, 66 and 67 are fragmentary views of the levers and cams associated with Figs. 63 and 64.

Fig. 68 is an enlarged view of Fig. 42.

Fig. 69 is a plan view of part of Fig. 68.

Fig. 70 is a side elevation of the cam and associated levers for returning the vertical racks to their normal position.

Fig. 71 is a plan view of Fig. 70.

Fig. 72 is an end view of Fig. 70.

Fig. 73 is a side elevation of the cam and associated lever for returning the pin setting plates to their normal position the normal position being shown in full lines.

Fig. 74 is a plan view of Fig. 73.

The multiplicand or sterling keys 20 are arranged preferably in two parallel rows on the right hand side of the keyboard the position of the keys 20 being staggered for obvious reasons. The keys 20 pass through suitably positioned slots in the cover plate 21 and are bent rearwardly to form levers 22 that are pivotally mounted upon a shaft 23, the ends of which are secured to vertical division walls 24 and 25 respectively. Only one complete key 20 and lever 22 are shown at Fig. 1 but the shape and arrangement of the levers 22 are clearly shown at Fig. 2. By reference to that figure it will be seen that each lever 22 extends in a straight line beyond the shaft 23 to a point where each one is bent diagonally and again outwardly to a position at right angles to the straight part, their extremities 26 lying in a straight line at suitable distances apart.

Figure 3:
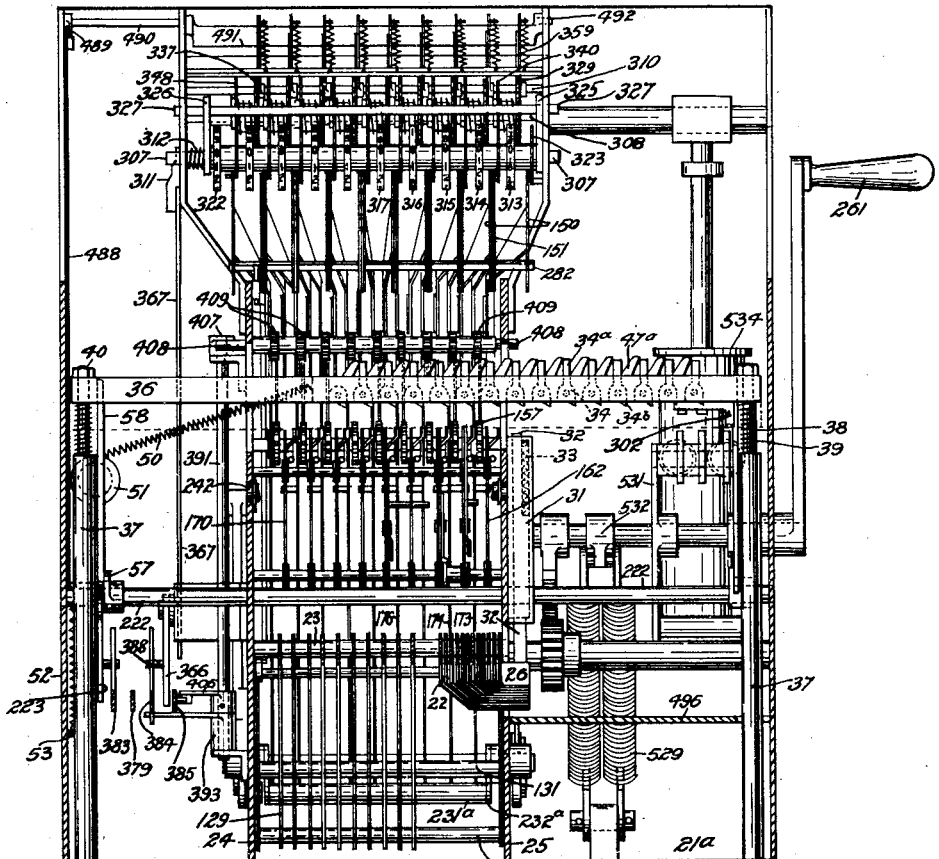
Fig. 3 is a front elevation partly in section, the section being taken on the line y—y of Fig. 2 and the operating handle being shown in elevation.

The lever 22 associated with the 0 key differs from the other levers in that it terminates just beyond the shaft 23 for reasons that will be hereinafter explained. Rigidly secured to or formed upon each lever 22 adjacent to the shaft 23 is an upwardly extending crank 27, the uppermost end of which is shaped to engage with a projection 28 formed upon a sliding plate 29 (Figs. 1 and 32) associated with an escapement movement arranged so that the depression of any key will cause the plate 29 to slide in its associated bearings 30 (Fig. 32). Arranged within a suitably shaped housing 31 that is secured to the vertical wall 25 are eleven specially shaped vertically slidable pins 32 each biased downwardly by a spring 33 (Fig. 3). The upper and lower ends of housing 31 are each provided with an aperture that permits the respective ends of any of the eleven pins 32 to slide therethrough. The pins 32 lie side by side in a row vertically above the respective extremities 26 of the levers 22. The function of the pins 32 is to set the stop pins 34 that are pivotally mounted in a rectangular frame or pin carriage 35 that is slidably mounted in another rectangular frame 36 which is supported upon standards 37 secured to the base 21a of the machine (Fig. 3). The upper ends of the standards 37 are shouldered at 38 to form a bearing for compression springs 39, which support the pin carriage 35 and frame 36, the latter frame being provided with holes at each corner through which the upper ends of the upper screw threaded ends of the respective standards 37 pass and are secured by nuts 40.

The housing 31 is shown at Fig. 3 and the details of construction of the pin carriage 35 and frame 36 and the stop pins 34 are illustrated at Figs. 22 to 31 inclusive. By reference to the latter figures it will be seen that the pin carriage 35 consists of eleven bars 41 each having fourteen (14) specially shaped recesses 42 on one side. The recesses are shaped as shown at Fig. 29 to adapt them to receive the specially shaped stop pins 34 each one of which is provided with an upwardly projecting stop member 34a, and a normally downwardly projecting inclined cam 34b. Each stop member is pivotally secured at 34c within its respective recess 42 and is provided with a spring washer 43 having a detent 43a adapted to engage with either one of the coacting recesses 34d in the stop pin 34 according to the position to which the latter is thrown. The spring washers 43 are seated within their respective recesses 42 between the inner face of the recess and the adjacent face of the stop pin 34 (see Fig. 28). The bars 41 are placed side by side with the recessed side of one bar lying flat against the plain side of the next adjacent bar. When the eleven bars are so positioned two additional bars 44 will be placed longitudinally with the outer members of the group of bars 41 and the whole then clamped together between the frame members 35 by the bolts and nuts 45. The bars 44 are stepped down throughout the major portion of their length so that when the two outside bars 44 are placed against the respective plain inner sides of the frame member 35 a longitudinal slot 46 is formed. The construction just described results in the formation of fourteen parallel rows of stop pins 34 with eleven stop pins in each row.

A guard plate 47 is provided for each row of stop pins 34 and such guard plates are provided with downwardly projecting arms 47a which are pivotally secured at 47b within the slots 46. One end of a spring 48 in tension is secured to the lower end of each arm 47a the other end being secured to a suitably positioned pin in the slot 46, the function of the spring 48 being to keep the guard plate in contact with a stop member, or row of stop members 34a on a stop pin or stop pins 34, the upper end of one of the arms 47a on each guard plate 47 also acting as a stop (see Fig. 25) in certain cases as will be hereinafter explained. In order that the pin carriage 35 and the parts attached thereto may slide longitudinally within the frame 36 when permitted to do so the outer faces of the frame members 35 and the inner faces of the adjacent side members of the frame 36 are V-channeled longitudinally so that the respective adjacent members may be slidably secured together by a bar 49 of square section (see Fig. 23) which will be housed within the square section aperture formed when the respective pairs of side members are properly positioned.

A pair of springs 50 in tension (see Fig. 2) will have one of their ends attached to the pin carriage 35 the other ends being passed over suitable wheels 51 secured by brackets to a side wall 52 of the casing the other ends being secured to stud pins 53, also projecting inwardly from the wall. The springs 50 cause the pin carriage 35 and its attachments to slide towards the wall 52 when it is free to do so.

One of the side members of the pin carriage 35 is provided with a toothed rack 54 rigidly secured thereto and having elongated vertical teeth that engage with a toothed wheel 55 that is secured to a shaft 56 of the escapement 29. The object of the elongated teeth on the rack 54 is to ensure that the teeth on the wheel 55 will remain in mesh therewith when the pin carriage 35 and its attachments are pulled down against the action of the springs 39 by the lever 57 and connecting rod 58 the operation of which will be explained hereinafter. From the foregoing description it will be seen that the depression of any of keys 20 having the denominations 0 to 11 inclusive causes its lever 22 to move pivotwise on the shaft 23 thereby causing the crank 27 (see Fig. 3) to move the extension 28 and the sliding plate 29 on the escapement a predetermined distance, at the same time permitting the springs 59 to cause the pin carriage 35 to slide within the frame 36 in order to bring the cams 34b of a row of stop pins 34 vertically above and in alignment with the row of vertically slidable pins 32. The extremity 26 of the lever 22 has now contacted with the lower end of one of the vertically slidable pins 32 and caused it to slide upwardly and strike the cam 34b of the stop pin 34 lying immediately above it thus causing the stop pin 34 to move upon its pivot 34c to an inclined position shown at Figs. 25 or 27, one half of the cam 34b is now positioned flush with the lower edge of its bar 41 and the other half of the cam projecting below that edge. The normal position of the guard plate 47 is at an incline such that it lies against or immediately adjacent to all the stops 34a on the pins 34 (see Fig. 25) when the latter are in their normal positions, and it will automatically be thrown over to that position by its spring 48 when the stop 34a is moved to its normal vertical position. It should here be noted that the lever 22 connected with the 0 sterling key 20 extends only to a point immediately beyond the shaft 23 but like the other lever 22 it is provided with a crank 27 so that the depression of that key will actuate the escapement and cause the pin carriage 35 to make the same longitudinal sliding movement as is brought about by any of the other sterling keys 20, but of course the vertical pins 32, the pins 34 and guard plates 47 will be unaffected.

The release of the key that was depressed will permit it to be returned to its normal raised position by a spring 59 one end of which is connected to a horizontal pin 60 rigidly secured to the vertical division plate 25 the other end being secured to the lever 22 rearwardly of the shaft 23, the limit of movement being determined by a stop pin 61 (Fig. 1). The return of the lever 22 will permit the spring 33 to actuate the vertically slidable pin 32 which was previously raised and thereby return it to its normal position. At the same time the crank 27 will move with its lever 22 thus permitting the escapement plate 29 (Figs. 1 and 32) to be returned to its normal position by a tension spring 62 one end of which is secured to a pin on the extension 28 on the plate 29 the other end being suitably secured to a supporting bracket 63 (Fig. 1). Normally the spring 62 (Fig. 1) pulls the escapement plate 29 to the right in Fig. 32, and in this position of the escapement plate an escapement pawl 304 pivoted to the said plate is in engagement with the teeth of the escapement wheel 294 this pawl 304 is held against a stop 306 by a spring 305.

When a key 20 is depressed, the crank 27 pulls the escapement plate 29 to the left in Fig. 32, the shaft 56 passing through a slot (not shown) in plate 29 whereby this movement is permitted.

Secured to the plate 29 is stop 303 which is clear of the teeth of the escapement wheel 294 when the latter are engaged with the pawl 304, and is moreover positioned so as to register with a space between two teeth when a tooth is engaging pawl 304.

The movement of plate 29 to the left brings the pawl 304 clear of wheel 294 and stop 303 into operative relation therewith. As soon as the pawl 304 is clear, the springs 50 acting through rack 54, wheel 55 and escapement shaft 56, turn the wheel 294 through half a tooth pitch until a tooth engages stop 303.

When the key 20 is released, the spring 62 pulls the plate 29 to the right thereby disengaging it from stop 303 and bringing it into operative relation with pawl 304, whereupon springs 50 turn the wheel 294 another half tooth pitch until the next tooth engages the pawl 304. The wheel 294 has now made a movement equivalent to one tooth pitch whereby the pin carriage 35 has moved one column pitch. The sequence of movements described in reference to the depression and return of a sterling key takes place every time one of the sterling keys 20 are depressed in any calculation to be made.

*Indicating mechanism*

The indicator mechanism is actuated every time a key 20 or one of those in the multiplier bank of keys 64 is actuated by the operator the object being to show which key or keys have been operated but there are two separate indicating mechanisms or units one for the sterling bank of keys 20 and the other for the multiplier bank of keys 64.

Both the indicating mechanisms are identical in construction and it is therefore only necessary to describe one of them. The construction and arrangement of the various parts are clearly depicted at Fig. 51 to which reference will now be made. The mechanism or unit shown in this figure is that which is operated by the sterling bank of keys 20 below each of which is a vertical pin 65 slidably arranged in an angle plate 66 (Fig. 55) which is provided with a bracket plate in which are a number of holes vertically in alignment with similar holes in the angle plate and in which the pins 65 may slide. Each pin 65 is provided with a collar 67 which lies below the horizontal portion of the bracket plate and a coil spring 68 surrounds each pin 65 between the collar 66 and the upper surface of the horizontal member of the angle plate 66 which is suitably shaped and secured to the base 21a in any convenient manner. Below the lower end of each pin is a lever 69 each one of which is rigidly secured to shaft 70, the ends of which are secured in bearings formed in or secured to the respective side walls of the casing, the positions of levers 69 upon the shaft being such that they are progressively stepped so that their outer ends lie at progressively increasing distances (from right to left) from the lower extremities of the pins 65, the extremities of the pins lying in horizontal alignment with one another. In this manner the depression of the sterling keys 20 (the stroke of all of which is equal) will move the levers 69 varying distances, owing to the varying distances the pins will travel before their lower ends contact with the levers 69, the object being to impart a predetermined amount of movement to a toothed quadrant 71, the radial arm of which is rigidly secured to the shaft 70.

Figure 2:
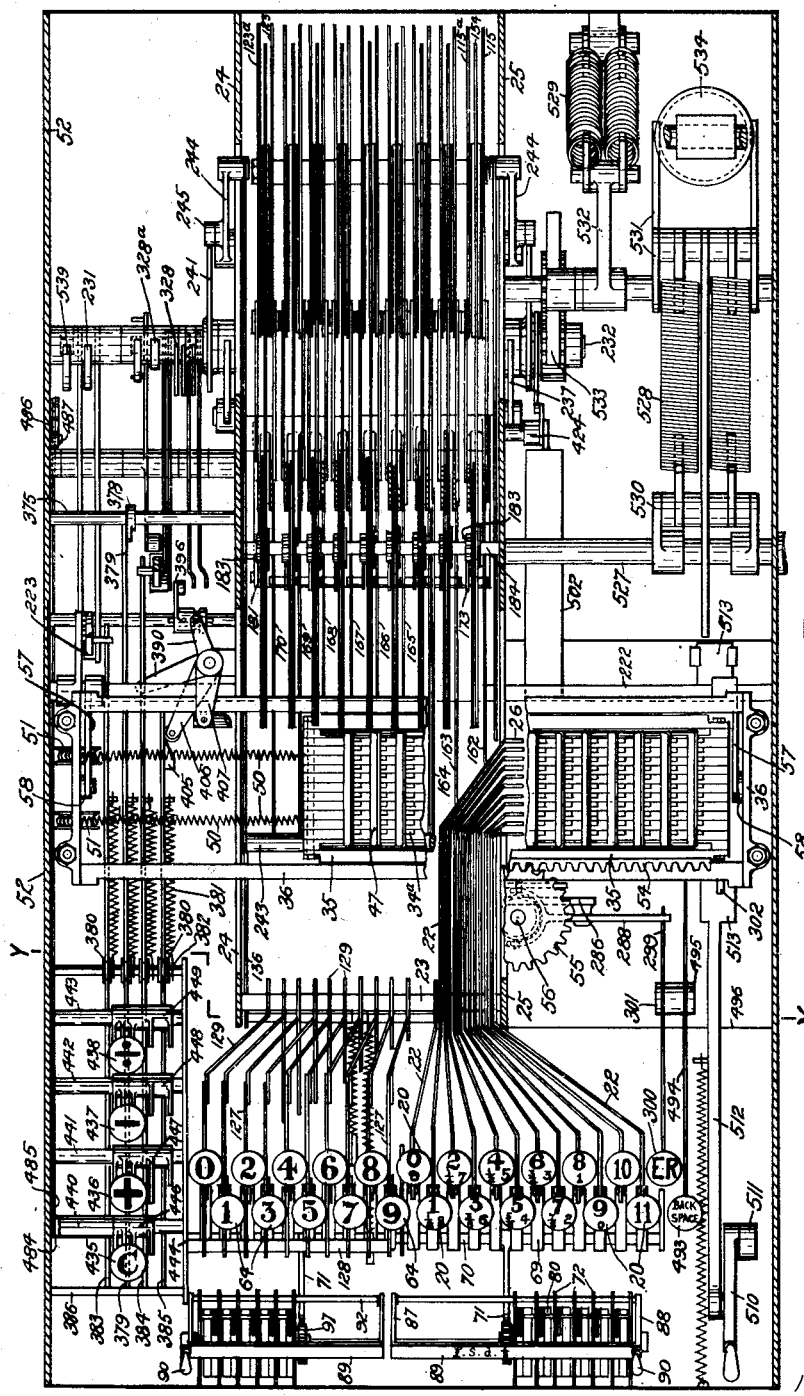
Fig. 2 is a plan view which includes the parts omitted from Fig. 1 but certain parts, notably the registering mechanism have been omitted.

At the front of and within the casing are a plurality of equidistant vertically positioned plates 72 rigidly secured to the inner face or faces of the casing in any convenient manner. Each one of the plates 72 is provided with a circular orifice 73, an annular boss 74 being formed on one side thereof and an annular groove 75 on the other side, each boss 74 and groove 75 being concentric to the orifice 73, and all of the latter having the same axial line and being of the same diameter. An indicating drum (see Figs. 51, 52 and 53) is rotatably mounted between each pair of plates 72. Each drum consists of a ratchet wheel 76 integral with and from one side of which two shallow cylindrical and concentric walls 77, 78 project. The length of the cylindrical wall 78 is greater than that of the wall 77 to permit it to be rotatably seated in the annular groove 75 in the plate 72 adjacent thereto. At the opposite end of the cylindrical wall 78 a seating 79 is formed to receive the annular boss 74 on the plate 72 adjacent thereto. The outer cylindrical wall 77 forms an indicator wheel the periphery 80 of which is divided into 13 equal spaces and these spaces will be consecutively marked with the numerals 0 to 11 with a blank space between the 11 and 0. The object of the blank space is to cause the 0 to appear at the sighting aperture 81 (Fig. 1) when the corresponding key is depressed. The teeth of the ratchet wheel 76 lie beside the periphery 80 and within the diameter thereof. It will be noticed that six indicating drums 76—77—78 are shown at Fig. 2 so that any amount in sterling up to £99.19.11⅞ which requires six columns could be registered thereon. It will be obvious however that the number of indicating drums and their associated mechanisms could be increased if desired. At Fig. 51 only four of the indicating drums have been shown, this number being considered sufficient to fully illustrate the construction and operation of the mechanism. By referring particularly to Figs. 52 and 55 it will be seen that the plate 72 is provided with a radial slot 82 extending from the periphery of the circular orifice 73 outwardly for a distance sufficient to enable the radial pin 83 (Fig. 51) to pass through it as will be presently explained. A stepped or double tooth 84, 84a is formed upon or rigidly secured to the inner face of the cylindrical wall 78 and the portion 84 projects radially towards the centre for a sufficient distance to enable it to cover or partly cover the slot 82 and, in certain circumstances, form a stop to prevent the pin 83 from passing through the slot 82. Passing centrally through the orifices 73 in the fixed plates 72 and also through the indicating drums 76—77—78 is a shaft 85 which is reduced in diameter at a suitable point to form a shoulder 86, the respective ends of such shaft being fixed to suitably shaped plates 87 and 88 which are connected together by a bar 89 that is provided with a handle 90 that projects through a slot 91 formed in the casing or cover plate 21 to enable the operator to slide the handle and its attachments along the slot 91 (see Fig. 1) for the purpose of zero setting or clearing the indicator mechanism. That portion of the shaft 85 having the large diameter forms a bearing upon which a sleeve shaft 96 may rotate. Rigidly secured to the sleeve shaft 96 exterior to an end plate 72 is a pinion 97 the teeth of which mesh with the teeth of the quadrantal rack 71. The sleeve shaft 96 is provided with a collar 98 which is screwed thereinto to close the end of the annular space between the reduced portion of the shaft 85 and the internal face of the sleeve shaft 96. This annular space forms a housing for a spring 99 that is held in compression between the shoulder 86 and the collar 98. The sleeve shaft 96 is also provided with a longitudinal slot 100 along which the radial pin 83 will slide with its shaft 85 to which it is rigidly secured. The crank pawls 94 are pivotally secured upon a rod 105, each one having one end of a spring 104 attached to the rear ends thereof, the other end of the springs being fastened to a rod 105a which is passed through suitably positioned holes in the plates 72. The object of the springs 104 is to maintain the forward ends of the crank pawls in contact with the ratchet teeth 76a of the respective indicating drums. It is however necessary when zero setting or clearing the indicating wheels of the drums 76—77—78 to raise all the crank pawls 94 in order to allow all of those that have been operated, for the purpose of indicating an amount, to be returned to their normal position in which the blank space on each indicating wheel will lie in register with the sighting aperture 81 (Fig. 1). For this purpose a bar 106 is slidably arranged in slots 106a formed at corresponding positions in each of the plates 72. The bar 106 has a number of cam plates 107 fixed thereto or integral therewith and positioned so that a cam plate lies between each pair of fixed plates 72 with a cam face adjacent to the side of the rear end of a crank pawl 94. One end of the slidable bar 106 projects beyond an end plate 72 and its extremity bent as shown at 108 to form a seating for one end of a compression spring 109 the other end of which impinges against the adjacent end plate 72. The spring 109 may be secured in position in any convenient manner and will normally hold the bar 106 and its cams 107 free of their respective crank pawls.

The return of the indicating drums 76—77—78 to the normal position is effected by helical springs 110 one of which is located in each of the annular spaces formed between the respective pairs of cylindrical walls 77 and 78. Each helical spring 110 will have one end secured to its respective annular wall 78 the other end being secured to the face of a fixed plate 72 adjacent thereto.

It will be seen from the foregoing description that the plates 87 and 88 and the parts connected thereto may move in a direction parallel with the axial line of the indicating drums 76—77—78 as the movement of the handle 90 towards the indicating drums will cause the shaft 85 to slide through the sleeve shaft 96 and as the plate 88 adjacent to handle approaches the indicating drums it will impinge against the bent end 108 of the sliding bar 106 and cause it to slide longitudinally, thereby causing the cams 107 to move laterally. The lateral movement of the cams 107 will bring their faces into contact with the rear ends of the respective crank pawls 94 thus raising the latter out of engagement with the ratchet teeth 76a and permitting the indicating drums to be actuated by the respective springs 110. Projecting from the side face of the ratchet wheel 76 is a short stud 111 adapted to engage a similar stud 111a formed upon an adjacent face of a fixed plate 72 such studs forming limit stops for holding the indicating drums when they are returned to their normal positions.

By referring to Fig. 1 it will be seen that the vertical pins 65 are situated between and parallel with the two rows of sterling keys 20. The levers of the front row can therefore pass vertically above and across the top ends of the pins 65 but it will be necessary for each key in the back row of keys 20 to be provided with short forward extensions of the lever 22 and these extensions will lie vertically above and across the top ends of their respective pins 65.

The bar 89 (Fig. 51) is located above and parallel with the sighting orifice 81 (see Fig. 1) and is provided with markings £, S, D⅛, (not shown) which also represent five columns viz., one for £, two for shillings, one for pence and one for fractions of pence the latter being denoted by the ⅛ marking.

The normal position of the radial teeth 84, 84a is such that the portions 84 cover the radial slots 82, the normal position of the radial pin 83 being in engagement with the portion 84 of the radial stop tooth in the left hand indicating drum 76—77—78. When those parts are in that position all the indicating faces 80 will be positioned so that the blank space on each one is in register with the sighting aperture 81, the ⅛ or fraction marking on the bar 89 being located immediately beside the first indicating drum on the left hand side, the spring 99 being in compression. As an example of the movement of the various parts of the indicator mechanism it will be assumed that the multiplicand to be dealt with consists of the amount of five shillings and seven pence three farthings. The operator first strikes the key 20 (in that sterling bank) whereon is the numeral 5. The depression of this key forces its corresponding vertical pin 65 downwardly, against the action of its spring 68, causing the lower end thereof to strike the corresponding lever 69 and the shaft 70 to partially rotate carrying with it the toothed quadrant 71. The toothed quadrant 71 in moving through an arc will cause the pinion 97 to rotate a predetermined distance carrying with it the sleeve shaft 96 and radial pin 83 which being in engagement with the radial tooth 84 that is fixed to the left hand indicating drum 76—77—78 will, by bearing on the surface 84a of said tooth (Fig. 52) carry that indicating drum through an equivalent arc but will be free to leave it at that point. The release of the depressed key 20 will permit it to be returned to its normal position by its spring 59 and the vertical pin 65 to be returned to its normal position by its spring 68. The toothed quadrant 71 is now free to be returned to its normal position by a spring 112 one end of which is secured to the radial arm of the toothed quadrant 71 and the other end being fastened to a stud pin 113 fixed to the base 21a or any other convenient fixture, a limit pin 114 being suitably positioned to limit the return movement of the toothed quadrant 71. The return of the toothed quadrant to its normal position will cause the pinion 97 to partly rotate and in doing so partly rotate the sleeve shaft 96; the radial pin 83 lying in the slot 100, and being rotatable with the shaft 85 will also be carried to its normal position by the return movement of the pinion 97 and sleeve shaft 96 but as the radial tooth 84, 84a has been moved through an arc, the portion 84 of said tooth has now left uncovered the slot 82 and the radial pin 83 when it reaches its normal position will be free to be actuated by the spring 99 pressing against the shoulder 86 on the shaft 85 and forcing it longitudinally through the slot 82 until it is arrested by the portion 84 of the radial tooth in the next indicating drum 76—77—78. The plates 87 and 88, bar 89 and handle 90 being secured to the shaft 85 will move longitudinally with the latter and the marking ⅛ (indicating fractions) will be moved to a position directly over the sighting aperture for the denomination on the first indicating drum 76—77—78. It will here be noted that the markings are not properly positioned until the keys 20 denoting the multiplicand have been depressed a proper number of times. Thus in the normal position the ⅛ marking is to the left of the extreme left hand sight orifice.

When the 5 key is depressed 5 appears through the extreme left hand sighting orifice and the bar 89 moves to bring the ⅛ marking over the extreme left hand orifice (indicating ⅝ of a penny).

If therefore the amount is ⅝ pence only it is correctly indicated.

If however the amount is 5 pence then in order to indicate this, the 0 key must be depressed (i. e. 5 pence 0 eighths of a penny). Depression of the 0 key then shifts bar 89 to bring the ⅛ marking over the second orifice from the left and the "pence" marking over the extreme left hand orifice, thus indicating 5 pence 0 eighths of a penny.

If the amount is 5 shillings then the 0 key must be again depressed (i. e. 5 shillings 0 pence 0 eighths of a penny) whereupon the bar 89 is shifted to the right again to bring the ⅛ marking over the third opening from the left, the pence marking over the second opening and the shillings marking over the extreme left hand opening. The amount now indicated is 5 shillings 0 pence 0 eighths of a penny.

It will thus be seen that the indicating drums are not denominational since the actual denomination of a digit appearing on a given drum depends on the number of digits in the amount indicated.

Continuing now, the depression of the keys 20 to denote five shillings and seven pence three farthings (¾) the 5 having been placed upon the first indicating drum the next key to be depressed will be the 7 denoting 7 pence and the depression of that key will bring about a corresponding cycle of movements and move the radial pin 83 into engagement with the radial tooth 84, 84a in the next indicating drums 76—77—78, at the same time moving the bar 59 so that the "D" denoting pence will lie above the 5 shown at the sighting aperture and the ⅛ marking will lie down above the 7 denoting pence. The completion of the multiplicand will be made by striking the "6" key 20 (representing six eighths or three farthings) when another cycle of movements will be brought about similar to the first cycle of movements described and the bar 59 will be again moved so that the S (shillings) marking will lie above the 5 shown at the sighting aperture, the "d" (pence) marking above the 7 and ⅛ (denoting fractions) above the 6, denoting six eighths or three farthings.

The method of multiplying will be described hereinafter and at the completion of any calculation or if any error has occurred the indicating drums and their associated parts may be returned to the normal position in the following manner. From the foregoing description it will be seen that the slots in the first three division plates 72 have been left uncovered so that the operator may grip the handle 90 and slide it and its associated parts toward the left hand side and towards the end of that movement the plate 88 will strike the turned down end 108 of the slidabl. bar 106 causing the latter to move longitudinally against the action of its spring 109 and thereby bringing the cams 107 into engagement with the rear end of the cranked pawls 94, forcing the latter rearwardly and lifting their forward ends out of engagement with the teeth 76a on the ratchet wheels 76 thus leaving the latter free to be actuated by their respective helical springs 110. In this manner any of the indicating drums that are not prevented from moving rearwardly by their respective stops 111, will be rotated until those stops co-act with the stops on the dividing plates 72, when all the blank spaces on the indicating drums will be in register with their respective sighting apertures. It will be seen however that the handle 90 and plate 88 must be permitted to return a short distance in order to disengage the cams 107 from the rear ends of their respective cranked pawls. This short movement is provided by the additional distance the radial pin may travel between the radial tooth 84 and the inner face of the dividing plate 72, the radial pin 83 travelling right up to the latter whilst the indicating drums 76—77—78 are being returned by their helical springs 110 so that when the operator releases the handle 90 the spring actuating the shaft 85 will carry the radial pin back longitudinally so that it engages with the radial tooth 84 in the first drum and which has been brought back to its normal position, covering the slot 82 in the second dividing plate, by the helical spring 110. This short movement of the pin 83 causes the shaft and parts attached thereto to move so that the plate 88 moves away from the bent end of the sliding bar 106 so that the latter is free to be actuated by its spring 109 for the purpose of moving the cams 107 out of engagement with the rear ends of the cranked pawls.

*Multiplying mechanism*

It has been shown that the depression of a key in the sterling bank of keys 20 will throw over a stop pin 34, and how on the raising of a key 20 to its normal position the slidable pin carriage 35 will be moved by the escapement so that any one of the stop pins 34 in the next adjacent row of pins may be similarly actuated by the depression and return of any one of the keys 20 and it will now be shown how these parts are associated with the multiplying mechanism. One of the important features of this mechanism consists of a plurality of pairs of combined plain and stepped multiplier plates. For the purpose of this specification the machine illustrated is provided with nine pairs 115, 115a; 116, 116a; 117, 117a; 118, 118a; 119, 119a; 120, 120a; 121, 121a; 122, 122a; 123, 123a. Between each pair of multiplier plates and axially therewith is a pinion 124 that is rotatably mounted upon the shaft 125 and to which the respective pairs of multiplier plates are rigidly secured all the multiplier plates and their pinions being rotatably mounted upon a common shaft 125, that is fixed in suitably positioned bearings not shown in the drawings. It might here be stated that in order to obviate complicating the drawings, the bearings for some of the shafts and also some of the stud pins have not been shown but it is to be understood that bearings on suitably positioned fixtures will be provided.

The pair of plates 115, 115a relate to fractions of 1/8 of one penny and its co-acting whole number pence plate.

The pair of plates 116, 116a relate to pence and its co-acting shillings plate.

The pair of plates 117, 117a relate to units of shillings and its co-acting ten shilling plate.

The pair of plates 118, 118a relate to tens of shillings and its co-acting pounds plate.

The pairs of plates 119, 119a; 120, 120a; 121, 121a; 122, 122a; 123, 123a relate respectively to the units, tens, hundreds, thousands and tens of thousands of pounds and their co-acting pounds carrying plates.

All the plates 115, 115a to 123, 123a inclusive are substantially circular but their peripheries are cut to form steps varying in number as well as in length. These steps are made in sections of their respective plates and the face of each step forms a chord of an arc concentric with the plate and every such step forms a stop that is positioned at a definite predetermined distance from the periphery of its particular plate. All the plates 115a to 123a inclusive are definitely positioned in relation to their respective plates 115 to 123 inclusive, i. e. the sectors on the main plates 115 to 123 inclusive have a corresponding sector on their respective co-acting plates 115a to 123a.

The plate 115 is laid off into 8 sectors A, B, C, D, E, F, G, H of equal arcs (see Fig. 14), the sector A having a plain periphery, the correspondingly positioned sector A on the plate 115a also having a plain periphery. The object of these plain peripheries is to prevent movement of certain parts when the 0 key in the multiplicand bank of keys is depressed and released as will be explained later. The stepped sectors in plates 115, 115a provide for the multiplication of fractions of 1/8 to 7/8 by any number 1 to 9.

The sector B in plate 115 provides for the multiplication of 1/8 of one penny by 1 to 9. Reading the steps in the direction of the arrow in that sector the flight of steps permits movement to be made by co-acting parts, such movement increasing in length, measured from the periphery to the face of the step, as the multiplier increases from 1 to 7. The next higher multiplier however is 8 and the product is one penny without a remainder. There is therefore a step on the co-acting plate 115a which permits of a movement to record 1 but as there is no remainder the portion of the sector on plate 115 which is in a corresponding position to the last mentioned step on the plate 115a, extends right to the periphery to prevent movement of the fraction recording parts. The next higher multiplier is 9, 1/8×9=1 1/8 pence so that the 1 penny is provided for in the next step on the plate 115a by increasing the length of the face of the step on that plate just referred to, the remainder 1/8 being provided for by the next adjacent single step on the plate 115.

The sector C on the plate 115 provides for the multiplication of 1/4 (2/8) by numbers from 1 to 9. Hereinafter the term "unit of movement" will be used in reference to the steps on the plates 115 to 123 and 115a to 123a both inclusive, and the term will denote the depth of one unit or step from the peripheries towards the centre of the plates.

The first step on the sector C plate 115 provides 2 units of movement, the second step provides for 4 units of movement, the third step for 6 units of movement and as the fourth step (1/4×4) equals 1 the movement of parts will be provided for by one unit of movement on the sector C plate 115a, the corresponding portion of the sector C on the plate 115 extending to the periphery thereof as there is no remainder and therefore nothing to register.

The following tables give a complete list of the units of movement permitted by each one of the respective pairs of plates after they have been moved to a predetermined position by the depression of a multiplier key. The first column denotes each fraction, penny, unit of shillings, ten shillings and pound in the multiplicand i. e. ⅛ to ⅞ of a penny multiplied by 1 to 9, 1 penny to eleven pence multiplied by 1 to 9, 1 shilling to 9 shilling multiplied by 1 to 9, 10 shillings multiplied by 1 to 9 and 1 pound multiplied by 1 to 9. The second column denotes the sector in which any fraction (in ⅛ths) penny, shilling, or pound will be located. The third column denotes the number of the plate in which the sector occurs. The fourth column denotes the units of movement permitted by that plate, whilst the fifth, sixth and seventh columns denote the sector plate and unit of movement, in the respective co-acting plate.

It will be noted that the units of shillings plate 117a is stepped in the same manner as if it were carrying into a similar fraction. Example 9/— ×5 is expressed as 45/— instead of £2.5.0. The shillings are converted to pounds in the totalling mechanism.

|  | Sector | Plate | Unit of movement | Sector | Plate | Unit of movement |
|---|---|---|---|---|---|---|
| Fractions |  |  |  |  |  |  |
| ⅛×1 | B | 115 | 1 | B | 115a |  |
| ×2 | B | 115 | 2 | B | 115a |  |
| ×3 | B | 115 | 3 | B | 115a |  |
| ×4 | B | 115 | 4 | B | 115a |  |
| ×5 | B | 115 | 5 | B | 115a |  |
| ×6 | B | 115 | 6 | B | 115a |  |
| ×7 | B | 115 | 7 | B | 115a |  |
| ×8 | B | 115 |  | B | 115a | 1 |
| ×9 | B | 115 | 1 | B | 115a | 1 |
| ²⁄₈×1 | C | 115 | 2 | C | 115a |  |
| ×2 | C | 115 | 4 | C | 115a |  |
| ×3 | C | 115 | 6 | C | 115a |  |
| ×4 | C | 115 |  | C | 115a | 1 |
| ×5 | C | 115 | 2 | C | 115a | 1 |
| ×6 | C | 115 | 4 | C | 115a | 1 |
| ×7 | C | 115 | 6 | C | 115a | 1 |
| ×8 | C | 115 |  | C | 115a | 2 |
| ×9 | C | 115 | 2 | C | 115a | 2 |
| ³⁄₈×1 | D | 115 | 3 | D | 115a |  |
| ×2 | D | 115 | 6 | D | 115a |  |
| ×3 | D | 115 | 1 | D | 115a | 1 |
| ×4 | D | 115 | 4 | D | 115a | 1 |
| ×5 | D | 115 | 7 | D | 115a | 1 |
| ×6 | D | 115 | 2 | D | 115a | 2 |
| ×7 | D | 115 | 5 | D | 115a | 2 |
| ×8 | D | 115 |  | D | 115a | 3 |
| ×9 | D | 115 | 3 | D | 115a | 3 |
| ⁴⁄₈×1 | E | 115 | 4 | E | 115a |  |
| ×2 | E | 115 |  | E | 115a | 1 |
| ×3 | E | 115 | 4 | E | 115a | 1 |
| ×4 | E | 115 |  | E | 115a | 2 |
| ×5 | E | 115 | 4 | E | 115a | 2 |
| ×6 | E | 115 |  | E | 115a | 3 |
| ×7 | E | 115 | 4 | E | 115a | 3 |
| ×8 | E | 115 |  | E | 115a | 4 |
| ×9 | E | 115 | 4 | E | 115a | 4 |
| ⁵⁄₈×1 | F | 115 | 5 | F | 115a |  |
| ×2 | F | 115 | 2 | F | 115a | 1 |
| ×3 | F | 115 | 7 | F | 115a | 1 |
| ×4 | F | 115 | 4 | F | 115a | 2 |
| ×5 | F | 115 | 1 | F | 115a | 3 |
| ×6 | F | 115 | 6 | F | 115a | 3 |
| ×7 | F | 115 | 3 | F | 115a | 4 |
| ×8 | F | 115 |  | F | 115a | 5 |
| ×9 | F | 115 | 5 | F | 115a | 5 |
| ⁶⁄₈×1 | G | 115 | 6 | G | 115a |  |
| ×2 | G | 115 | 4 | G | 115a | 1 |
| ×3 | G | 115 | 2 | G | 115a | 2 |
| ×4 | G | 115 |  | G | 115a | 3 |
| ×5 | G | 115 | 6 | G | 115a | 3 |
| ×6 | G | 115 | 4 | G | 115a | 4 |
| ×7 | G | 115 | 2 | G | 115a | 5 |
| ×8 | G | 115 |  | G | 115a | 6 |
| ×9 | G | 115 | 6 | G | 115a | 6 |
| ⁷⁄₈×1 | H | 115 | 7 | H | 115a |  |
| ×2 | H | 115 | 6 | H | 115a | 1 |
| ×3 | H | 115 | 5 | H | 115a | 2 |
| ×4 | H | 115 | 4 | H | 115a | 3 |
| ×5 | H | 115 | 3 | H | 115a | 4 |
| ×6 | H | 115 | 2 | H | 115a | 5 |

|  | Sector | Plate | Unit of movement | Sector | Plate | Unit of movement |
|---|---|---|---|---|---|---|
| ⁷⁄₈×7 | H | 115 | 1 | H | 115a | 6 |
| ×8 | H | 115 |  | H | 115a | 7 |
| ×9 | H | 115 | 7 | H | 115a | 7 |
| Pence |  |  |  |  |  |  |
| 1×1 | B | 116 | 1 | B | 116a |  |
| ×2 | B | 116 | 2 | B | 116a |  |
| ×3 | B | 116 | 3 | B | 116a |  |
| ×4 | B | 116 | 4 | B | 116a |  |
| ×5 | B | 116 | 5 | B | 116a |  |
| ×6 | B | 116 | 6 | B | 116a |  |
| ×7 | B | 116 | 7 | B | 116a |  |
| ×8 | B | 116 | 8 | B | 116a |  |
| ×9 | B | 116 | 9 | B | 116a |  |
| 2×1 | C | 116 | 2 | C | 116a |  |
| ×2 | C | 116 | 4 | C | 116a |  |
| ×3 | C | 116 | 6 | C | 116a |  |
| ×4 | C | 116 | 8 | C | 116a |  |
| ×5 | C | 116 | 10 | C | 116a |  |
| ×6 | C | 116 |  | C | 116a | 1 |
| ×7 | C | 116 | 2 | C | 116a | 1 |
| ×8 | C | 116 | 4 | C | 116a | 1 |
| ×9 | C | 116 | 6 | C | 116a | 1 |
| 3×1 | D | 116 | 3 | D | 116a |  |
| ×2 | D | 116 | 6 | D | 116a |  |
| ×3 | D | 116 | 9 | D | 116a |  |
| ×4 | D | 116 |  | D | 116a | 1 |
| ×5 | D | 116 | 3 | D | 116a | 1 |
| ×6 | D | 116 | 6 | D | 116a | 1 |
| ×7 | D | 116 | 9 | D | 116a | 1 |
| ×8 | D | 116 |  | D | 116a | 2 |
| ×9 | D | 116 | 3 | D | 116a | 2 |
| 4×1 | E | 116 | 4 | E | 116a |  |
| ×2 | E | 116 | 8 | E | 116a |  |
| ×3 | E | 116 |  | E | 116a | 1 |
| ×4 | E | 116 | 4 | E | 116a | 1 |
| ×5 | E | 116 | 8 | E | 116a | 1 |
| ×6 | E | 116 |  | E | 116a | 2 |
| ×7 | E | 116 | 4 | E | 116a | 2 |
| ×8 | E | 116 | 8 | E | 116a | 2 |
| ×9 | E | 116 |  | E | 116a | 3 |
| 5×1 | F | 116 | 5 | F | 116a |  |
| ×2 | F | 116 | 10 | F | 116a |  |
| ×3 | F | 116 | 3 | F | 116a | 1 |
| ×4 | F | 116 | 8 | F | 116a | 1 |
| ×5 | F | 116 | 1 | F | 116a | 2 |
| ×6 | F | 116 | 6 | F | 116a | 2 |
| ×7 | F | 116 | 11 | F | 116a | 2 |
| ×8 | F | 116 | 4 | F | 116a | 3 |
| ×9 | F | 116 | 9 | F | 116a | 3 |
| 6×1 | G | 116 | 6 | G | 116a |  |
| ×2 | G | 116 |  | G | 116a | 1 |
| ×3 | G | 116 | 6 | G | 116a | 1 |
| ×4 | G | 116 |  | G | 116a | 2 |
| ×5 | G | 116 | 6 | G | 116a | 2 |
| ×6 | G | 116 |  | G | 116a | 3 |
| ×7 | G | 116 | 6 | G | 116a | 3 |
| ×8 | G | 116 |  | G | 116a | 4 |
| ×9 | G | 116 | 6 | G | 116a | 4 |
| 7×1 | H | 116 | 7 | H | 116a |  |
| ×2 | H | 116 | 2 | H | 116a | 1 |
| ×3 | H | 116 | 9 | H | 116a | 1 |
| ×4 | H | 116 | 4 | H | 116a | 2 |
| ×5 | H | 116 | 11 | H | 116a | 2 |
| ×6 | H | 116 | 6 | H | 116a | 3 |
| ×7 | H | 116 | 1 | H | 116a | 4 |
| ×8 | H | 116 | 8 | H | 116a | 4 |
| ×9 | H | 116 | 3 | H | 116a | 5 |
| 8×1 | J | 116 | 8 | J | 116a |  |
| ×2 | J | 116 | 4 | J | 116a | 1 |
| ×3 | J | 116 |  | J | 116a | 2 |
| ×4 | J | 116 | 8 | J | 116a | 2 |
| ×5 | J | 116 | 4 | J | 116a | 3 |
| ×6 | J | 116 |  | J | 116a | 4 |
| ×7 | J | 116 | 8 | J | 116a | 4 |
| ×8 | J | 116 | 4 | J | 116a | 5 |
| ×9 | J | 116 |  | J | 116a | 6 |
| 9×1 | K | 116 | 9 | K | 116a |  |
| ×2 | K | 116 | 6 | K | 116a | 1 |
| ×3 | K | 116 | 3 | K | 116a | 2 |
| ×4 | K | 116 |  | K | 116a | 3 |
| ×5 | K | 116 | 9 | K | 116a | 3 |
| ×6 | K | 116 | 6 | K | 116a | 4 |
| ×7 | K | 116 | 3 | K | 116a | 5 |
| ×8 | K | 116 |  | K | 116a | 6 |
| ×9 | K | 116 | 9 | K | 116a | 6 |
| 10×1 | L | 116 | 10 | L | 116a |  |
| ×2 | L | 116 | 8 | L | 116a | 1 |
| ×3 | L | 116 | 6 | L | 116a | 2 |
| ×4 | L | 116 | 4 | L | 116a | 3 |
| ×5 | L | 116 | 2 | L | 116a | 4 |
| ×6 | L | 116 |  | L | 116a | 5 |
| ×7 | L | 116 | 10 | L | 116a | 5 |
| ×8 | L | 116 | 8 | L | 116a | 6 |
| ×9 | L | 116 | 6 | L | 116a | 9 |
| 11×1 | M | 116 | 11 | M | 116a |  |
| ×2 | M | 116 | 10 | M | 116a | 1 |
| ×3 | M | 116 | 9 | M | 116a | 2 |
| ×4 | M | 116 | 8 | M | 116a | 3 |
| ×5 | M | 116 | 7 | M | 116a | 4 |
| ×6 | M | 116 | 6 | M | 116a | 5 |
| ×7 | M | 116 | 5 | M | 116a | 6 |
| ×8 | M | 116 | 4 | M | 116a | 7 |
| ×9 | M | 116 | 3 | M | 116a | 8 |

| | Sector | Plate | Unit of movement | Sector | Plate | Unit of movement | | Sector | Plate | Unit of movement | Sector | Plate | Unit of movement |
|---|---|---|---|---|---|---|---|---|---|---|---|---|---|
| Shillings | | | | | | | | X3 | C | 119 | 6 | C | 119a | |
| 1×1 | B | 117 | 1 | B | 117a | | | X4 | C | 119 | 8 | C | 119a | |
| X2 | B | 117 | 2 | B | 117a | | | X5 | C | 119 | | C | 119a | 1 |
| X3 | B | 117 | 3 | B | 117a | | | X6 | C | 119 | 2 | C | 119a | 1 |
| X4 | B | 117 | 4 | B | 117a | | | X7 | C | 119 | 4 | C | 119a | 1 |
| X5 | B | 117 | 5 | B | 117a | | | X8 | C | 119 | 6 | C | 119a | 1 |
| X6 | B | 117 | 6 | B | 117a | | | X9 | C | 119 | 8 | C | 119a | 1 |
| X7 | B | 117 | 7 | B | 117a | | | 3×1 | D | 119 | 3 | D | 119a | |
| X8 | B | 117 | 8 | B | 117a | | | X2 | D | 119 | 6 | D | 119a | |
| X9 | B | 117 | 9 | B | 117a | | | X3 | D | 119 | 9 | D | 119a | |
| 2×1 | C | 117 | 2 | C | 117a | | | X4 | D | 119 | 2 | D | 119a | 1 |
| X2 | C | 117 | 4 | C | 117a | | | X5 | D | 119 | 5 | D | 119a | 1 |
| X3 | C | 117 | 6 | C | 117a | | | X6 | D | 119 | 8 | D | 119a | 1 |
| X4 | C | 117 | 8 | C | 117a | | | X7 | D | 119 | 1 | D | 119a | 2 |
| X5 | C | 117 | | C | 117a | 1(10/-) | | X8 | D | 119 | 4 | D | 119a | 2 |
| X6 | C | 117 | 2 | C | 117a | 1 | | X9 | D | 119 | 7 | D | 119a | 2 |
| X7 | C | 117 | 4 | C | 117a | 1 | | 4×1 | E | 119 | 4 | E | 119a | |
| X8 | C | 117 | 6 | C | 117a | 1 | | X2 | E | 119 | 8 | E | 119a | |
| X9 | C | 117 | 8 | C | 117a | 1 | | X3 | E | 119 | 2 | E | 119a | 1 |
| 3×1 | D | 117 | 3 | D | 117a | | | X4 | E | 119 | 6 | E | 119a | 1 |
| X2 | D | 117 | 6 | D | 117a | | | X5 | E | 119 | | E | 119a | 2 |
| X3 | D | 117 | 9 | D | 117a | | | X6 | E | 119 | 4 | E | 119a | 2 |
| X4 | D | 117 | 2 | D | 117a | 1(10/-) | | X7 | E | 119 | 8 | E | 119a | 2 |
| X5 | D | 117 | 5 | D | 117a | 1 | | X8 | E | 119 | 2 | E | 119a | 3 |
| X6 | D | 117 | 8 | D | 117a | 1 | | X9 | E | 119 | 6 | E | 119a | 3 |
| X7 | D | 117 | 1 | D | 117a | 2 | | 5×1 | F | 119 | 5 | F | 119a | |
| X8 | D | 117 | 4 | D | 117a | 2 | | X2 | F | 119 | | F | 119a | 1 |
| X9 | D | 117 | 7 | D | 117a | 2 | | X3 | F | 119 | 5 | F | 119a | 1 |
| 4×1 | E | 117 | 4 | E | 117a | -(10/-) | | X4 | F | 119 | | F | 119a | 2 |
| X2 | E | 117 | 8 | E | 117a | 1 | | X5 | F | 119 | 5 | F | 119a | 2 |
| X3 | E | 117 | 2 | E | 117a | 1 | | X6 | F | 119 | | F | 119a | 3 |
| X4 | E | 117 | 6 | E | 117a | 2 | | X7 | F | 119 | 5 | F | 119a | 3 |
| X5 | E | 117 | | E | 117a | 2 | | X8 | F | 119 | | F | 119a | 4 |
| X6 | E | 117 | 4 | E | 117a | 2 | | X9 | F | 119 | 5 | F | 119a | 4 |
| X7 | E | 117 | 8 | E | 117a | 3 | | 6×1 | G | 119 | 6 | G | 119a | |
| X8 | E | 117 | 2 | E | 117a | 3 | | X2 | G | 119 | 2 | G | 119a | 1 |
| X9 | E | 117 | 6 | E | 117a | 3 | | X3 | G | 119 | 8 | G | 119a | 1 |
| 5×1 | F | 117 | 5 | F | 117a | 1(10/-) | | X4 | G | 119 | 4 | G | 119a | 2 |
| X2 | F | 117 | | F | 117a | 1 | | X5 | G | 119 | | G | 119a | 3 |
| X3 | F | 117 | 5 | F | 117a | 2 | | X6 | G | 119 | 6 | G | 119a | 3 |
| X4 | F | 117 | | F | 117a | 2 | | X7 | G | 119 | 2 | G | 119a | 4 |
| X5 | F | 117 | 5 | F | 117a | 3 | | X8 | G | 119 | 8 | G | 119a | 4 |
| X6 | F | 117 | | F | 117a | 3 | | X9 | G | 119 | 4 | G | 119a | 5 |
| X7 | F | 117 | 5 | F | 117a | 4 | | 7×1 | H | 119 | 7 | H | 119a | |
| X8 | F | 117 | | F | 117a | 4 | | X2 | H | 119 | 4 | H | 119a | 1 |
| X9 | F | 117 | 5 | F | 117a | 4 | | X3 | H | 119 | 1 | H | 119a | 2 |
| 6×1 | G | 117 | 6 | G | 117a | 1(10/-) | | X4 | H | 119 | 8 | H | 119a | 2 |
| X2 | G | 117 | 2 | G | 117a | 1 | | X5 | H | 119 | 5 | H | 119a | 3 |
| X3 | G | 117 | 8 | G | 117a | 2 | | X6 | H | 119 | 2 | H | 119a | 4 |
| X4 | G | 117 | 4 | G | 117a | 2 | | X7 | H | 119 | 9 | H | 119a | 4 |
| X5 | G | 117 | | G | 117a | 3 | | X8 | H | 119 | 6 | H | 119a | 5 |
| X6 | G | 117 | 6 | G | 117a | 3 | | X9 | H | 119 | 3 | H | 119a | 6 |
| X7 | G | 117 | 2 | G | 117a | 4 | | 8×1 | J | 119 | 8 | J | 119a | |
| X8 | G | 117 | 8 | G | 117a | 4 | | X2 | J | 119 | 6 | J | 119a | 1 |
| X9 | G | 117 | 4 | G | 117a | 5 | | X3 | J | 119 | 4 | J | 119a | 2 |
| 7×1 | H | 117 | 7 | H | 117a | | | X4 | J | 119 | 2 | J | 119a | 3 |
| X2 | H | 117 | 4 | H | 117a | 1 | | X5 | J | 119 | | J | 119a | 4 |
| X3 | H | 117 | 1 | H | 117a | 2 | | X6 | J | 119 | 8 | J | 119a | 4 |
| X4 | H | 117 | 8 | H | 117a | 2 | | X7 | J | 119 | 6 | J | 119a | 5 |
| X5 | H | 117 | 5 | H | 117a | 3 | | X8 | J | 119 | 4 | J | 119a | 6 |
| X6 | H | 117 | 2 | H | 117a | 4 | | X9 | J | 119 | 2 | J | 119a | 7 |
| X7 | H | 117 | 9 | H | 117a | 4 | | 9×1 | K | 119 | 9 | K | 119a | |
| X8 | H | 117 | 6 | H | 117a | 5 | | X2 | K | 119 | 8 | K | 119a | 1 |
| X9 | H | 117 | 3 | H | 117a | 6 | | X3 | K | 119 | 7 | K | 119a | 2 |
| 8×1 | J | 117 | 8 | J | 117a | | | X4 | K | 119 | 6 | K | 119a | 3 |
| X2 | J | 117 | 6 | J | 117a | 1 | | X5 | K | 119 | 5 | K | 119a | 4 |
| X3 | J | 117 | 4 | J | 117a | 2 | | X6 | K | 119 | 4 | K | 119a | 5 |
| X4 | J | 117 | 2 | J | 117a | 3 | | X7 | K | 119 | 3 | K | 119a | 6 |
| X5 | J | 117 | | J | 117a | 4 | | X8 | K | 119 | 2 | K | 119a | 7 |
| X6 | J | 117 | 8 | J | 117a | 4 | | X9 | K | 119 | 1 | K | 119a | 8 |
| X7 | J | 117 | 6 | J | 117a | 5 | | | | | | | | |
| X8 | J | 117 | 4 | J | 117a | 6 | | | | | | | | |
| X9 | J | 117 | 2 | J | 117a | 7 | | | | | | | | |
| 9×1 | K | 117 | 9 | K | 117a | | | | | | | | | |
| X2 | K | 117 | 8 | K | 117a | 1 | | | | | | | | |
| X3 | K | 117 | 7 | K | 117a | 2 | | | | | | | | |
| X4 | K | 117 | 6 | K | 117a | 3 | | | | | | | | |
| X5 | K | 117 | 5 | K | 117a | 4 | | | | | | | | |
| X6 | K | 117 | 4 | K | 117a | 5 | | | | | | | | |
| X7 | K | 117 | 3 | K | 117a | 6 | | | | | | | | |
| X8 | K | 117 | 2 | K | 117a | 7 | | | | | | | | |
| X9 | K | 117 | 1 | K | 117a | 8 | | | | | | | | |
| 10/—×1 | B | 118 | 1 | B | 118a | | | | | | | | | |
| X2 | B | 118 | | B | 118a | 1 | | | | | | | | |
| X3 | B | 118 | 1 | B | 118a | 1 | | | | | | | | |
| X4 | B | 118 | | B | 118a | 2 | | | | | | | | |
| X5 | B | 118 | 1 | B | 118a | 2 | | | | | | | | |
| X6 | B | 118 | | B | 118a | 3 | | | | | | | | |
| X7 | B | 118 | 1 | B | 118a | 3 | | | | | | | | |
| X8 | B | 118 | | B | 118a | 4 | | | | | | | | |
| X9 | B | 118 | 1 | B | 118a | 4 | | | | | | | | |
| Pounds units | | | | | | | | | | | | | | |
| 1×1 | B | 119 | 1 | B | 119a | | | | | | | | | |
| X2 | B | 119 | 2 | B | 119a | | | | | | | | | |
| X3 | B | 119 | 3 | B | 119a | | | | | | | | | |
| X4 | B | 119 | 4 | B | 119a | | | | | | | | | |
| X5 | B | 119 | 5 | B | 119a | | | | | | | | | |
| X6 | B | 119 | 6 | B | 119a | | | | | | | | | |
| X7 | B | 119 | 7 | B | 119a | | | | | | | | | |
| X8 | B | 119 | 8 | B | 119a | | | | | | | | | |
| X9 | B | 119 | 9 | B | 119a | | | | | | | | | |
| 2×1 | C | 119 | 2 | C | 119a | | | | | | | | | |
| X2 | C | 119 | 4 | C | 119a | | | | | | | | | |

Figure 5:
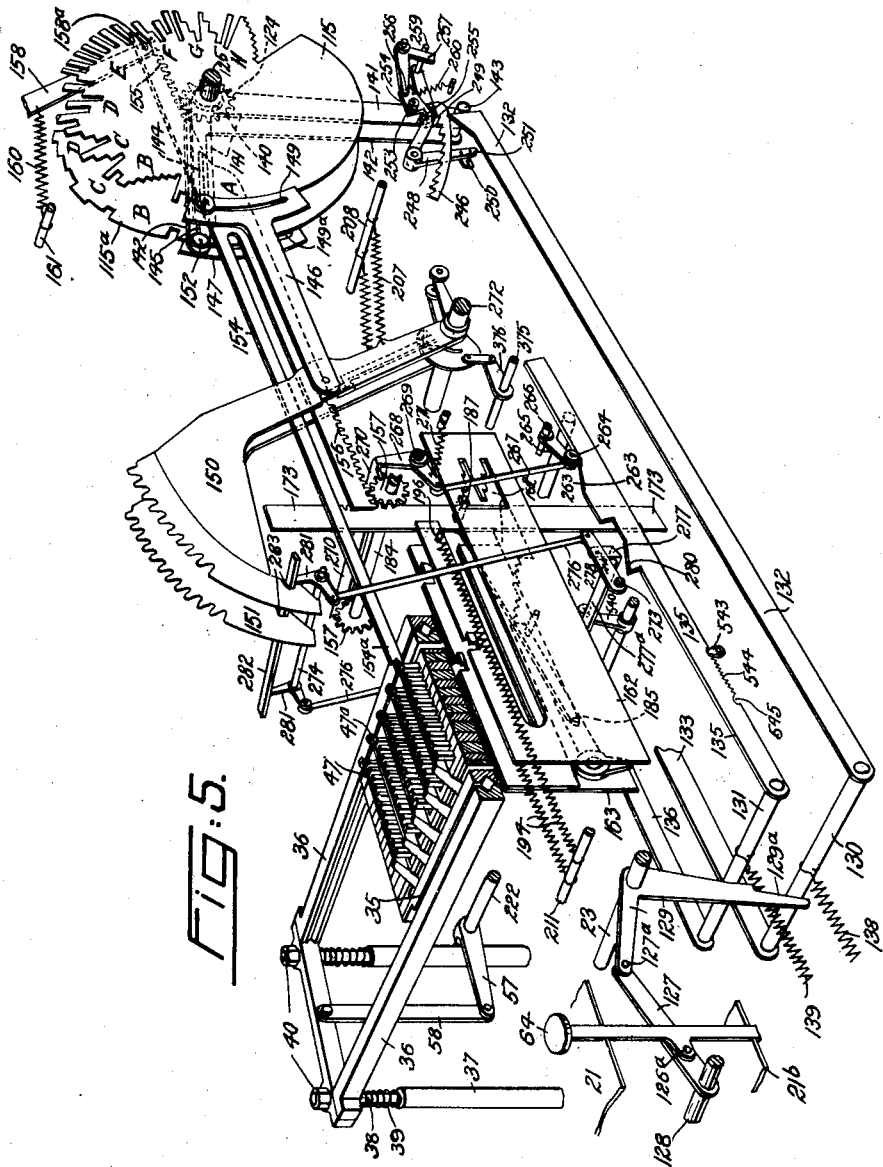
Fig. 5 is a perspective view showing the general arrangement of the multiplier unit.

Referring now more particularly to Figs. 1, 2 and 5 the multiplier keys 64 (Fig. 2) are each slidably mounted vertically in slots formed in the plates 21 and 21b in the manner shown for the keys 20 in Fig. 2 and are pivotally connected at 126a (Fig. 5) to a lever 127 one end of which is rotatably mounted upon a shaft 128 the other end being pivotally connected at 127a to one end of a specially shaped bell crank lever 129 that is suitably pivoted to another shaft 23. The ends of the shaft 128 are fixed to or supported in any suitable manner by any convenient vertical walls or standards. The free members of the bell crank levers 129 are of varying widths across their side faces in order that their rear extremities (of all but one) may be cut away at 129a to a gradually increasing extent for the purpose of allowing the rear edges of those parts to lie at graduated distances from the horizontally positioned rod 130 which they directly actuate when their respective keys 64 are depressed. These graduations are each equal to the chord of any single-face step of any of the plates 115, 115a to 123, 123a. The rear edges 129b of the bell crank levers, inwardly beyond the cut away portions 129a, all lie normally against a horizontally positioned rod 131. The rod 130 forms the central member of a U-shaped member the side arms 132 and 133 of which are supported in a slightly inclined position between upper and lower pairs of channelled anti-friction guide rollers 134 (see Fig. 1) which may be rotatably secured upon stud pins fixed to vertical standards (not shown in the drawings). The rod 131 also forms the central member of another U-shaped member the side arms 135 and 136 of which are similarly supported in upper and lower pairs of anti-friction channelled guide rollers 137. In this manner the pairs of arms 132—3 and 135—6 form supports for their respective rods 130 and 131 but they have other functions as well. The rod 130 is normally maintained in contact with one of the levers 129 by a spring 138 one end of which is attached to the rod and the other end to any convenient fixture. The rod 131 is normally maintained in contact with all the bell crank levers 129 by a spring 139 one end of which is attached to the rod and the other end to any convenient fixture.

Figure 4:
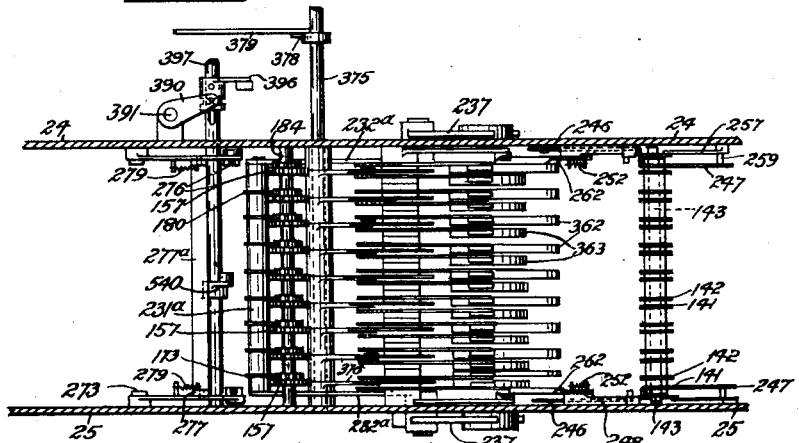
Fig. 4 is a sectional plan showing the upper mechanism for releasing the quadrantal racks, the mechanism for returning the vertical racks, the mechanism for disengaging the quadrantal racks from the multiplier plates, the cams for the return of the quadrantal racks and mechanism for positioning the bell cranks relating to the multiplier plates.

The pinions 124, of which there are nine, are each provided with a plain central boss at each side to form pivotal bearings 140 upon each of which a pair of bell crank levers 141 and 142 may swing. The lower end of the pendent arms of all of the bell crank levers 141 and 142 are connected together by a rod 143 which passes transversely through each one, Figure 4, both ends of such rod 143 projecting and being normally maintained in contact with the rear ends of the side arms 132 and 133 by means of a spring 142a in order that the side arms may function as push rods for the purpose of causing the bell crank levers 141 and 142 to swing through an arc each time a multiplier key 64 is depressed and the push rod 132 thereby caused to slide longitudinally in its guide rollers 134. The other arms of the bell crank levers 141 and 142 are provided with longitudinal slots 144 and 145 respectively. Located on the outside of each one of the pairs of stepped plates 115—115a to 123—123a are substantially T-shaped connecting plates 146 and 147 respectively positioned so that the legs thereof lie horizontally between upper and lower pairs of guide rollers 148 arranged to permit the connecting plates 146 and 147 to slide freely back and forth. One end of each connecting plate 146 and 147 is provided with an arcuate slot 149, 149a respectively that is concentric with the arc through which the bell crank levers 141 and 142 move, the other end of the connecting plates 146 and 147 having a pin to enable them to be pivotally connected at 374 to the respective quadrantal racks 150 and 151, to which reference will hereinafter be made. The pairs of plates 115—115a to 123—123a are all of the same diameter and the arcuate slots 149—149a are normally positioned immediately adjacent to and beyond the respective peripheries of the plates. The uppermost arms of the bell crank levers 141—2 extend radially beyond the respective plates 115—115a to 123—123a to permit the outer ends of the slots 144 and 145 to extend to a point radially beyond the peripheries of those plates. In this manner the arms of the bell crank levers 141 and 142 on the inside of the respective plates 115—115a to 123—123a may be loosely connected to T-shaped connecting plates 146—147 on the outside of the respective plates by pins 152 which pass freely through the co-acting pairs of slots 144—149 and 145—149a and are maintained therein by nuts 153 secured to the projecting ends thereof, so that the pins may freely slide in their respective pairs of the slots 144—149 and 149—149a. The pins 152 lie axially parallel with the shaft 125 and normally just beyond the periphery of its respective stepped plate. Between each pair of stepped plates 115—115a to 123—123a is a horizontally positioned combined toothed rack and distance regulator bar 154, the forward end 154a of which is extended to a point immediately adjacent to the line of arms 47a on the rear ends of the guard plates 47. The lower edge of each distance regulator bar 154 is provided with toothed racks 155, 156, one at each end, the toothed rack 155 at the rear end meshing with the teeth on the pinion 124, whilst the toothed rack 156 meshes with the toothed wheel 157. When the regulator bar 154 is free to move longitudinally as will be explained hereinafter movement is imparted thereto by means of a spring actuated lever 158 one end of which is pivoted to a transverse rod 159, the other end being pivoted at 158a to the rear end of the regulator bar 154, a spring 160 being connected at one end to the lever 158 and at the other end to a transverse rod 161.

The foremost lever 129 (Fig. 1) which relates to the key marked with the numeral 9 in the multiplier bank of keys 64, is not cut away and is at all times normally in contact with the rods 130 and 131. The next adjacent lever to the foremost lever just referred to is not seen at Fig. 1 because it is the same width as the foremost lever but unlike it in that it is provided with a cut away portion 129a so that it must travel a certain distance before it can contact with the bar 130. The levers 129 shown in the fan formation (Fig. 1) relate respectively to the 9, 8, 7, 6, 5, 4, 3, 2, 1, 0 numeral keys, the cut away portion of the last (that one relating to the 0 numeral key) is such that although it operates the rod 131 its arc of movement is not sufficient to bring the cut away edge into contact with the rod 130 and consequently when the 0 numeral key in the multiplier bank 64 is depressed the push rods 132 and 133 are not moved.

It will be seen from this explanation that the push rods 132 and 133 are moved different distances according to which key in the bank 64 is depressed and these various amounts of movement are transferred to all the pairs of the bell crank levers 141—142, and determine the position at which the pins 152 will be positioned in their respective arcuate slots 149—149a. The amount of movement which the pins 152 may make inwardly along their respective slots 144 and 145 is determined by the unit or units of movement represented by the particular step that is brought into radial alignment with its respective pin 152.

The positioning of any particular step or portion of the peripheral edge of the pairs of plates 115—115a to 123—123a by the movement of the racks 155 and their co-acting pinions 124 and the movement of the rack and the particular rack or racks to be moved is determined by which particular stop pin or pins 34 have been thrown over by the depression of a key 20 or plurality of keys 20 and also the position to which the rows, in which those thrown over-stop pins 34 occur, have been moved by the sliding movement of the pin carriage 35 in the manner already described. The extension 154a however is integral with the rack 156 that is in mesh with the toothed wheel 157 which is normally locked so that no movement of the racks 115, 156 or of the stepped plates 115—115a to 123—123a can take place until the toothed wheel 157 is released in a manner that will be described hereinafter.

By reference to Figs. 22 and 25 it will be seen that there are eleven stop pins 34 in each row. The sector A in all the stepped plates 115—115a to 123—123a has a full peripheral edge and lies in register with the arcuate slots 149—149a in the respective plates 146. A longitudinal movement of the regulator bar 154 and its extension 154a a distance equal to the distance between the faces, adjacent to the end of the extension 154, of any two adjacent stop pins 34 in a row, will cause the respective pairs of plates 115—115a to 123—123a to move through an arc equal to one sector. The distance between the outer face of an arm 47a and the adjacent face of any stop pin 34a is equal to the distance between any two adjacent stop pins 34.

It has now been shown how the stop pins 34 in the slidable pin carriage 35 are set from the keyboard and how those pins determine the amount of movement to be permitted to the regulator bar 154 and it will now be shown how after the depression and release of the key denoting the digit of a multiplier, the stop pins 34 are automatically returned to their normal position and other pins 34 denoting an amount equal to ten times the amount of the multiplicand are simultaneously reset so that if the multiplier exceeds units the depression of another multiplier key will cause the plates 115—115a, 123—123a to again be positioned so that those bars 154—154a permitted to do so by the pins 34 that have been reset may again move to the digit value determined by the respective pins.

Lying transversely below the carriage 35 in which the stops are mounted is a series of denominational pin-setting plates which serve to change the stop setting to represent the tens multiple of the previous setting.

For reasons which will be explained later certain of the pin-setting plates are made in two parts, constituting a main plate and a supplementary plate arranged so that movement of the main plate carries the supplementary plate with it, but the supplementary plate can move additionally by itself.

Figure 6:
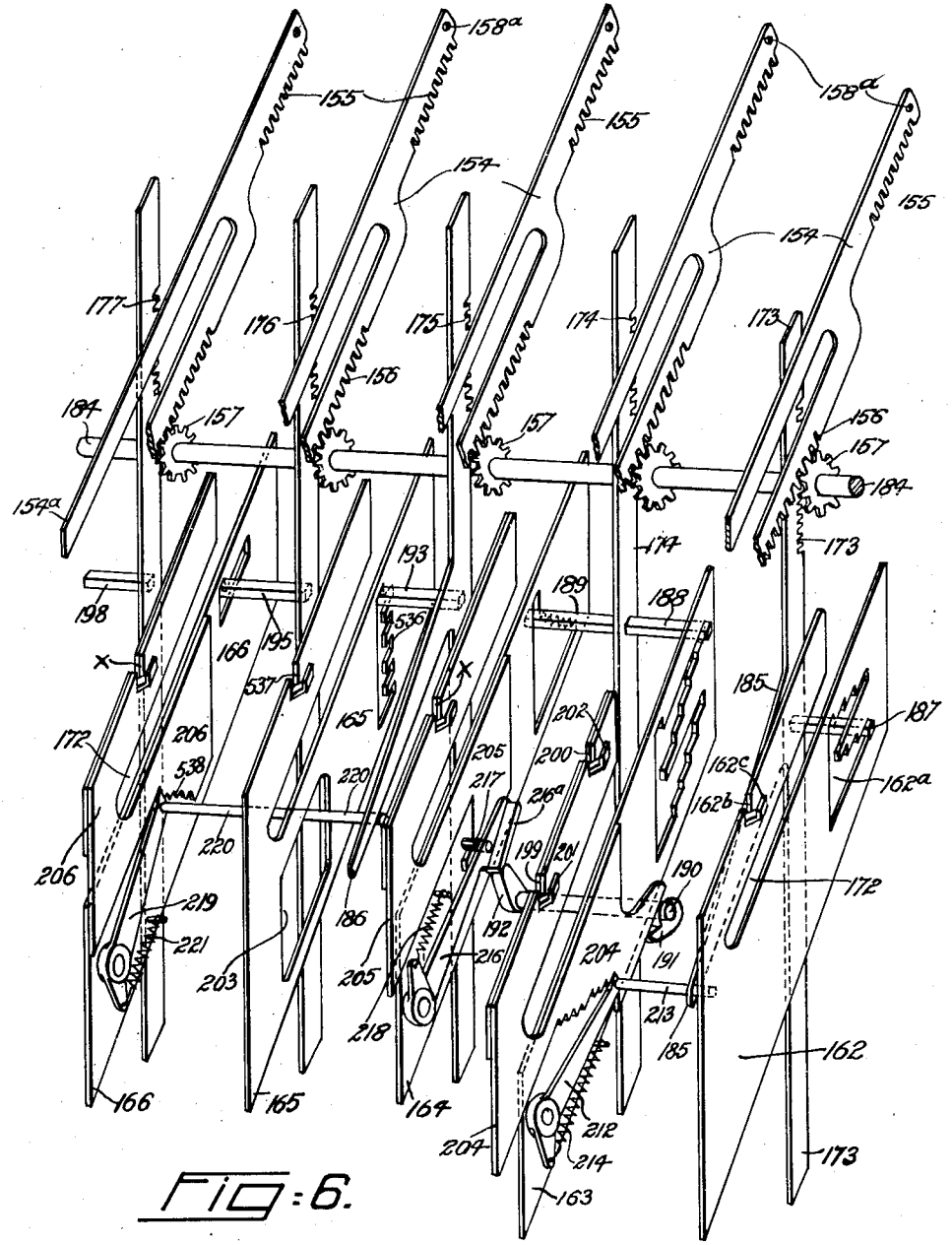
Fig. 6 is a perspective view showing a partial assembly of the pin setting plates and the immediately associated parts including the vertical racks and their pinions, and the combined regulator bars and racks, some of the plates and their parts being in the position they would occupy after operating the machine for multiplying one penny and seven eighths of a penny by ten.

The pin-setting plates for the pence fractions, pence, shillings unit, shillings tens and pounds units, are shown in perspective in Figure 6, while all the pin-setting plates are shown in end elevation in Figure 3 and in plan in Figure 2.

Reading from right to left in Figures 3 and 6 the arrangement of the pin-setting plates is as follows:—

In the pence fractions denomination a single plate 162.

In the pence denomination a main plate 163 carrying a supplementary plate 204.

In the shillings units denomination a main plate 164 carrying a supplementary plate 205.

In the shillings tens denomination a single plate 165.

In the pounds units denomination a main plate 166 carrying a supplementary plate 206.

In the tens, hundreds, thousands, and ten thousands of pounds denomination there is a single plate 167, 168, 169 and 170 respectively.

Each pin-setting plate carries means for changing the setting of the column of stops located above it; this setting changing means comprising a bracket tooth located beside and in register with a gap in the upper edge of the plate. The bracket tooth for the fractions plate 162 is shown at 162c and the associated gap at 162b.

In denominations where a main and supplementary plate are employed the bracket tooth and gap are formed on the supplementary plate.

For reasons which will be explained later the pence supplementary plate 204 carries two bracket teeth 201, 202 with associated gaps 199 and 200.

The shillings units supplementary plate 205 carries one bracket tooth 205c and associated gap 205b, while the shillings tens plate 165 carries a bracket tooth 165c and gap 165b. The units of pounds supplementary plate 206 carries a bracket tooth 206c and gap 206b.

Each of the remaining pin-setting plates 167 to 170 carries respectively a bracket tooth 167c to 170c and an associated gap 167b to 170b.

All of the pin-setting plates are supported in upper and lower anti-friction channelled rollers 171 and 171a (Figures 13–16) but as the upper horizontal edges of the single plates 162, 152 and 167 to 170 respectively carry the bracket teeth 162c, 165c and 167c to 170c each of these plates is provided with a longitudinal slot to engage with the upper rollers 171. Similarly the supplementary plates 204, 205, 206 are provided with slots 172 for the same reason.

The movement of the regulator bars 154 up to the stops 34 which have been set also serves to position the pin-setting plates so that the bracket teeth in each denomination except the pence, will be disposed under the stop representing the digit in the respective denomination of the tens multiple of the multiplicand. In the case of pence, one of the two bracket teeth 201, 202 will be disposed under the stop representing the pence digit of the tens multiple of the multiplicand.

In order to position the pin-setting plates in this manner a series of vertical denominational control racks 173—180, is provided, each of which is vertically slidable in guide rollers 182 which are suitably mounted on any convenient vertical fixture. The teeth of each vertical control rack 173—180 (Figures 3 and 6) mesh with their respective pinions 183 which are integral with respective gear wheels 157 all of which are rotatably mounted on a horizontal shaft 184 the ends of which may be suitably secured to the respective division plates 24 and 25.

Since the gear wheels 157 mesh with rack teeth on the corresponding regulator bars 154 it will be seen that when any regulator bar moves up to a stop 34 the corresponding control rack will move downwardly to an equal extent.

It will here be convenient to explain the manner in which the bracket teeth co-operate with the stops to change their setting.

Considering the fractions denomination, the arrangement of the stops is such that in the column of stops immediately above the fractions plate 162, the stop which has been set from the key board will have its portion 34e located above the edge of the plate 162, while the stops which have not been set will have their cams 34b positioned in the same plane as the bracket tooth 162c.

If the fractions plate 162 is moved to bring the bracket tooth 162c to a particular position and the stop carriage is moved down towards the resetting plates, the bracket tooth 162c will strike the cam 34b of the stop immediately above it, thereby rocking the stop and setting it, the gap being provided to accommodate the portion 34e of the stop which now projects below the bars 41. At the same time the upper edge of the plate 162 resets the stop which was previously set, by engaging the portion 34c and rocking the stop back to normal position.

The action of the bracket teeth and gaps on all the pin-setting plates is similar to that described above.

The action of the control racks 173—180 in positioning the pin-setting plates will now be described taking each denomination in turn, with particular reference to Figure 6.

The fractions digit in the tens multiple of the multiplicand can only be derived from one source, namely, the multiplication of the fractions digit of the multiplicand by ten. Accordingly the fractions pin-setting plate 162 is under the control of the fractions vertical rack 173.

The fractions plate 162 is provided with a cut-away portion or perforation 162a having steps representing the fractions digits of the tens multiple of all the fractions digits which it is possible to have in the multiplicand. Through this perforation projects an abutment pin 187 on the control rack 173. Consequently when the fractions regulator bar 154 moves up to a stop the control rack 173 descends to a corresponding extent and positions the pin 187 opposite one of the steps in the perforation 162a. A spring 194 then pulls the plate 162 until the step engages with the pin 187 whereby the plate 162 is appropriately positioned.

The pence digit of the tens multiple of the multiplicand may be derived from two sources, namely, the pence component of the product of the fractions digit of the multiplicand multiplied by ten and the pence component of the product of the pence digit of the multiplicand multiplied by ten. For this reason the pence pin-setting plate comprises a main plate 163 and a supplementary plate 204.

The main plate 163 is under the control of the pence vertical rack 174 and the supplementary plate 204 is under the control of the fractions rack 173.

To this end the main plate is provided with steps co-operating with a control pin 188 on the pence rack 174 and a portion of the supplementary plate is cut away at its forward lower corner and has a series of seven single steps and one double step formed thereon.

When free to do so the supplementary plate 204 will be caused to slide forwardly upon its main resetting plate 163 by a spring 194 in tension one end of which is secured to the supplementary plate 204, the other end being secured to a transverse rod 211 (Figure 1). Pivoted to the main pin-setting plate 163 is a bell crank lever 212, the extremity of one arm of which is adapted to engage with any one of the steps just mentioned and which is provided with a laterally projecting pin 213 the length of which is such that it may be engaged by an abutment arm or trip lever 185 on the fractions rack 173 as the latter descends and the lever 212 be thus caused to engage with any selected step in the series just referred to. The other end of the bell crank lever 212 is connected to one end of a spring 214 in tension the other end being connected to the main pin-setting plate 163 in order that the lever 212 will be returned to its normal position when free to do so.

By this means both the pence plates 163 and 204 are caused to move an amount representing the pence component of the tens multiple of the pence digit of the multiplicand, while the supplemental plate 204 can move additionally, under the action of a spring 194, to an extent representing the pence component of the tens multiple of the fractions digit of the multiplicand.

Consequently the total movement of the plate 204 equals the sum of these pence components.

In some cases the sum of these pence components may exceed eleven, in which case, if only one bracket tooth were provided this tooth would be moved beyond the end of the column of stops. Consequently two bracket teeth 201, 202 are provided, spaced apart a distance equal to twelve times the pitch of the stops. If the sum of the pence components is 11 or less, then the tooth 201 will set the appropriate stop, whereas if the sum exceeds 11 then the tooth 202 will set the stop, no stop being, of course, set when the sum equals 12 pence or one shilling.

When the sum exceeds eleven pence it is necessary to carry one to the shillings plate, and to this end the lower edge of the supplementary pence plate 204 co-operates with a cam 191 on a shaft 190 thereby rotating said shaft and also a cam 192 secured thereto. The operation of this mechanism will be described later.

The tens multiple of the units of shillings digit of the multiplicand never contains a significant digit in the units of shillings denomination but the tens multiple of the multiplicand as a whole may contain a digit in the shillings units denomination derived from the shillings units component of the tens multiple of the pence digit of the multiplicand.

Consequently the units of shillings resetting plate is not controlled by the units of shillings vertical rack 175 but is controlled by the pence control rack 174.

Moreover when the sum of the pence components of the tens multiple of the fractions and pence digits of the multiplicand exceeds eleven it is required to carry one to the shillings pin-setting plate..

Accordingly the shillings pin-setting plate is made in two parts, a main plate 164 having steps cut in it to co-operate with a control pin 189 in the pence control rack 174 and a supplementary plate 205 which carries the bracket tooth 205c, and is controlled by the cam 192 already referred to.

Thus when the pence rack 174 moves to an extent representing the pence digit of the multiplicand, the pin 189 co-operating with the steps in the main shillings units plate 164, permits said plate 164 to move under the action of its spring 194 an amount representing the shillings component of the tens multiple of the pence digit of the multiplicand, and the plate 164 carries the supplementary plate 205 with it.

If one is to be carried over from the pence pin-setting plate the cam 192 permits the supplementary plate to move alone one additional step under the action of its spring 194.

In order to effect this carry-over of one the supplementary plate 205 (Figure 13) has a substantially rectangular portion removed from the lower forward corner and on the lower end of the vertical edge 215 is formed a single step. Upon the side of the main plate 164 a bell crank lever 216 is pivotally secured, one arm of such lever having a face 216a formed thereon to enable it to be engaged by the cam 192 and raised thereby to a position where a stud pin 217 projecting from the inner face of the lever 216 will permit the supplementary plate 205 to slide forwardly upon the main plate 164 to the limit of the one step formed upon the supplementary plate 205. When that supplementary plate 205 is returned to its normal position, in a manner hereinafter described, the bell crank lever 216 will be returned to its normal position by a spring 218 in tension, one end of which is secured to the short arm of the bell crank lever 216, the other end being fixed to a suitable point on the main plate 164.

The tens multiple of the tens of shillings digit of the multiplicand never contains a significant figure in the tens of shillings denomination, but the tens multiple of the multiplicand as a whole may contain a significant figure in the tens of shillings denomination derived from the tens of shillings component of the tens multiple of the units of shillings digit of the multiplicand.

Accordingly the tens of shillings pin-setting plate 165 is not controlled from the tens of shillings rack 176 but is controlled only from the units of shillings rack 175, by means of a pin 193 projecting from the rack 175 and co-operating with steps cut in the tens of shillings resetting plate 165.

The tens multiple of the units of pounds digit of the multiplicand never contains a significant figure in the units of pounds denomination but the units of pounds digit of the tens multiple of the multiplicand as a whole may be a significant figure derived from two sources, namely, the pounds units components of the tens multiple of the tens of shillings and the units of shillings digits respectively of the multiplicand.

Accordingly the units of pounds pin-setting plate is made in two parts, a main plate 166 controlled by the tens of shillings control rack 176 by means of a pin 195 co-operating with steps in the plate 166, and a supplementary plate 206 carrying the bracket tooth 206c, which is controlled from the units of shillings control rack 175.

The control of the units of pounds supplementary plate 206 from the shillings units control rack 175 is effected by means of an abutment arm or trip lever 186 co-operating with the following mechanism:

The supplementary plate 206 (Figure 16) has its lower forward corner cut away and a series of steps formed thereon, a bell crank lever 219 being pivotally secured to the associated main plate 166. The bell crank lever 219 is provided with a long arm and a short arm, the long arm thereof having a laterally projecting pin 220 which passes through the aperture 203 in the plate 165, its extremity lying below the trip lever 186, so that as the latter descends with its rack 175 it will strike the pin 220 and depress the bell crank lever 219 to a point where it will permit the supplementary plate 206 to slide forwardly upon its associated main plate 166 until a selected step on the supplementary plate engages with the extremity of the long arm of the bell crank lever 219. The short arm of the bell crank lever 219 is connected to one end of a spring 221 in tension the other end of which is connected by suitable means to the main plate 166 so that when the supplementary plate 206 and the trip lever 186 are returned to their normal positions as will be described hereinafter, the bell crank lever 219 will be returned to its normal position by its spring 221.

In the denominations higher than the pounds units the control of the pin-setting plate is effected in each case from the control rack of next lower denomination, since the tens multiple of any digit in the units of pounds or higher denominations only produces a significant digit in the next higher denomination.

Thus the units of pounds control rack 177 carries a pin 198 which co-operates with the tens of pounds pin-setting plate (not shown in Figure 6). Likewise the control racks 178, 179, 180 of the higher denominations carry pins similar to 198 co-operating with steps in the resetting plate of next higher denomination, there being no control rack in the tens of thousands denomination, since in the machine shown in the drawings there is no higher denomination than tens of thousands.

It has already been mentioned that the carriage 35 contains fourteen columns of stops, and it may here be pointed out that the number of columns of stops and the initial or normal position of the carriage relative to the setting pins 32 must be such that after a multiplicand has been set up the pin-setting plates can set up that multiplicand multiplied by the power of ten corresponding to the highest multiplier denomination. Thus if the multiplier contains four digits, the pin-setting plates first set up the tens multiple of the multiplicand, then the hundreds multiple and then the thousands multiple by setting up each time the tens multiple of the previous stop setting.

It will be noted that when any pair of the plates 115—115a to 123—123a are moved through an arc of one sector the respective co-acting racks 173 to 181 will be moved downwardly a distance equal to one step on any of the pin setting plates 162 to 170 or the supplementary plates 204, 205 and 206, and any of these pin setting plates and supplementary plates that are permitted to do so by the downward movement of their respective control pins 187, 188, 193, 195, 198, 213, 217 or 220 will move forward to an extent determined by the distance between those control pins and the face of the step with which it is brought into register by the downward movement of the racks 173 to 181. It should here be borne in mind that when the multiplicand has been set up by the positioning of the stop pins 34a the pin carriage 35 ceases to move laterally.

After the multiplicand keys 20 have been operated the stops 34a are set in readiness for the depression of a multiplier digit key 64 and the subsequent throw over of the handle 261, the operation of which automatically repositions those stops and simultaneously sets other pins representing ten times the amount of the multiplicand in readiness for the next series of movements.

It has been previously stated that the pin carriage 35 and frame 36 are pulled down by the levers 57 and connecting rod 58, and it will now be shown how these parts are actuated. The upper ends of a pair of connecting rods 58 are pivotally connected to the respective ends of frame 36 (Fig. 1) the lower end of each one being connected to the respective levers 57 which are rotatably mounted upon a shaft 222. The rear end of one lever 57 will be provided with a tail piece 223 that is pivotally secured at 224 to its respective lever 57 in order that its contacting position may be varied for a purpose that will be hereinafter explained. Its several positions are shown at Fig. 57 and it is moved to those positions by a forked lever 225 on a rod 383 that engages a pin 226 on the tail piece 223. Motion is transmitted through the tail piece 223 to the lever 57 by the antifriction roller 227 that is suitably mounted on the forward end of a lever 228 which is rotatably mounted upon a shaft 229. The rear end of the lever 228 is provided with an anti-friction roller 230 which contacts with a cam 231 on the cam shaft 232. The position of the tail piece 223 shown partly in full lines at Fig. 57 is the position it occupies for multiplication calculations and the means adopted for moving the forked lever 225 in order to alter the position of the tail piece will be explained in the description relative to other calculations.

It has been shown how the racks 173 to 181 descend and the function they thereby perform, and it will now be shown how they are returned to their normal positions. Positioned immediately below the lower ends of the row of racks 173 to 181 is a horizontal rod 231a which may be rotatably supported in the forward ends of a pair of levers 232a (Fig. 70) the rear ends of which are fixed to a shaft 233 that is rotatably mounted in bearings formed in the division plates 24 and 25 respectively. Another lever 234 has one of its ends fixed to the shaft 233 and extends rearwardly therefrom, its rear end having one end of an upwardly projecting arm 235 pivoted thereto, the upper end of such arm being provided with an anti-friction roller 236 adapted to contact with a cam 237 on the cam shaft 232. The arm 235 is maintained in its normal position by a spring 238 one end of which is secured thereto, the other end being secured at a suitable point on the lever 234. The rod 231a will gravitate to its normal position, a stop 239, limiting the downward movement of the lever 232a. Means such as the stop pin 246 on the lever 234 will be employed to limit the movement of the arm in the direction of its spring 238. The spring controlled arm 235 provides an elastic means whereby the cam 237 passes the lever 234 in one direction and operates it on the return. The pin setting plates 162 to 170 are moved forwardly by their respective springs 194 but any plate or plates that have been actuated by their springs in any multiplying operation are returned to their normal positions by the cams 241 on the cam shaft 232 in the following manner (Figs. 19 and 73). A pair of substantially horizontal rods 242 are supported in anti-friction rollers suitably secured to the division plates 24 and 25, the forward ends of the rods 242 being connected to the respective ends of a transverse rod 243 which lies in front of the forward ends of the pin setting plates 162 to 170. The rear ends of the rods 242 are connected to the respective upper ends of a pair of levers 244 the lower ends of which are rotatably mounted on a shaft suitably secured to the respective division plates 24 and 25, so that the anti-friction rollers 245 on the respective levers 244 may be engaged by the cam 241 at a predetermined timing.

Returning now to the pairs of bell crank levers 141 and 142, it has been shown how these are moved to different positions by the bank of multiplier keys 64 but it is necessary to hold them firmly after they have been positioned. The mechanism for effecting this object is shown in perspective at Fig. 5, but details are shown at Fig. 1. The pendent arm of preferably an end bell crank lever 141 is provided with a forwardly projecting arcuate ratchet 246 and a rearwardly projecting bracket 247 both of which are integral with the pendent arm. Pivotally mounted upon a stud pin suitably fixed to the division plate 25 is a bell crank pawl 248 one end of which is shaped to engage the teeth on the ratchet 246 and is provided with a pin 249 projecting from its inner face. Adjacent to the other end of the bell crank pawl 248 is a pivoted trip lever 250 that projects from a side thereof and is limited in its pivotal movement by a stop pin 251 with which it is normally held in contact by a spring 252 one end of which is suitably secured to the trip lever 250 the other end being connected to the lowermost end of the bell crank pawl 248. Pivotally secured at 253 to the division plate 25 is a specially shaped latch plate 254 having a suitably shaped latch 255 on one side of the pivot 253 and a stud 256 on the other side. Another bell crank lever 257 is pivoted at 258 to the division plate 25 and one end thereof is pivotally connected at 256 to the latch plate 254. The rotatable movement of the bell crank lever 257 being limited by any suitable means to prevent the rear or pendent end of the bell crank lever 257 moving out of the arc traversed by a pin 259 on the bracket 247. A spring 260 is connected at one end to the latch plate 254, its other end being connected to a pin fixed to the division plate 25 or other fixture in order to move the latch plate 254 into the engaging position when free to do so. The operation of these parts is as follows:—When the pendent arm of the bell crank lever 141 is moved rearwardly by the rod 132 as previously described it carries with it the ratchet 246 and pin 259 until it reaches the predetermined limit of movement; at this point the bell crank pawl 248 will be in engagement with one of the teeth on the ratchet 246. Being now free to move, the latch plate 254 will be moved downwardly to the limit of its travel by the spring 260 and the latch 255 thereby positioned in readiness to engage the pin 249 on the bell crank pawl 248. The movement of the handle 261 will cause the cam 262 (Fig. 1) on the cam shaft 232 to raise and pass the trip lever 250 and, having passed, the spring 252 will return the trip lever to its normal position. The return movement of the handle 261 will cause the cam 262 to return downwardly and, striking the trip lever, will cause the bell crank pawl to rise out of engagement with the teeth of the ratchet 246 and the pin 249 to engage the latch 255 and thereby temporarily hold the bell crank pawl out of engagement with the teeth of the ratchet. When the bell crank levers 141—142 are free to be returned by their springs 141a to their normal position (Fig. 1) the pin 259 will strike the pendent end of the bell crank lever 257 and thereby move the latch 255 out of engagement with the pin 249 and thus permit the bell crank pawl 248 to return to its normal position in which it is in engagement with the teeth on the ratchet 246.

It is necessary to lock the regulator bars 154 between each complete function of the machine and the means whereby they are locked and unlocked will now be described (see Fig. 5). The upper edge of each of the side arms 135—136 have a cam 263 formed thereon and so shaped that as the arms are pushed rearwardly by a multiplier digit key 64 and its bell crank lever 129 the anti-friction roller 264, which is rotatably secured to one end of a lever 265, will be engaged by the cam 263 and thus cause the forward end of the lever 265 to rise. The rear end of the lever 265 is rotatably secured to a shaft 266 the ends of which are secured to the division plates 24 and 25. The forward end of the levers 265 are pivotally connected to the lower end of a connecting rod 267 its upper end being connected to one end of the bell crank lever 268 which is rotatably mounted upon a pin 269 fixed to the division plate 25. The other end of the bell crank lever 268 is rigidly secured to or integral with an elongated pawl 270 adapted to engage with the teeth on the gear wheels 157. At Fig. 5 the pawl 270 is shown in engagement with the gear wheel 157 and the depression of a multiplier digit key 64 will slide the arms 135 and 136 rearwardly, raise the forward end of the lever 265 and thus force the pawl out of engagement with the teeth of the gear wheels 157. When the arms 135 and 136 are released by the raising of a multiplier digit key 64, they are returned by their spring 139, the bell crank lever 268 being returned to its normal position by a spring 271 (Fig. 1), one end of which is secured to the bell crank lever 268 the other end being secured to a convenient fixture and the pawl 270 again engages the teeth on the gear wheels 157 and temporarily locks them. It will be seen from Fig. 5 that the locking of the wheels 157 also prevents the regulator bars 154, 154a from being actuated by their springs 160 and levers 158.

The pairs of quadrantal racks 150 and 151 are mounted upon a shaft 272 having its ends suitably mounted in bearings formed in the respective division plates 24 and 25. Two other shafts 273 and 274 also have their respective ends suitably supported on the division plates 24 and 25. A pair of levers 275 have one of their ends fixed to the shaft 273, the other end being pivotally secured to the lower ends of connecting rods 276 the upper ends of which are each secured to a cranked lever 281 rotatably secured upon the shaft 274. Each lever 275 is provided with a stop pin 278 and a trip lever 277, the latter being connected together by a bar 277a, a spring 279 being connected at one end to the trip lever 277 and at the other end to the lever 275 in order to normally maintain the trip lever against the stop pin 278. The arms 135 and 136 have each a cam 280 formed upon their upper edges the function of which is to engage the trip lever on the return movement of the arms 135 and 136 forcing the lever 275 and connecting rod 276 upwardly and causing the crank levers 281 to partly rotate upon the shaft 274 and thereby cause the locking bar 282, to which they are attached, to move out of engagement with catch members 283 formed upon the quadrantal racks 150, 151.

Referring now more particularly to Fig. 32 but also to those parts of Fig. 1 showing the escapement mechanism, the bearings 30 are integral with a bracket or brackets 63, rigidly secured to the plate 25. The shaft 56 is vertically positioned in bracket bearings 284 and 285 rigidly secured to the division plate 25. Integral with the bearing 285 is a vertical bracket 286 wherein are formed bearings for the crank levers 287 and 288. The upper end of the lever 288 is forked in order to form a support for a tapered collar 290 which is pivoted to and between the fork members, one of the pivots 291 being engageable by the lower stepped end 292 of the lever 287. Positioned between the collar 290 and the sliding plate 29 is a ratchet wheel 293 that is rigidly secured upon the shaft 56, and also an escapement wheel 294 that is rotatably mounted upon the shaft 56. Upon the face of the escapement wheel 294 is pivoted a pawl 295 adapted to engage with the ratchet wheel 293, an upwardly projecting pin 296 being rigidly secured to the face of the pawl 295 in such a manner that the descent of the tapered collar 290 will strike the pin 296 and move the pawl 295 out of engagement with the ratchet wheel 293. The pawl 295 will be provided with a suitable spring 297 to normally maintain it in engagement with the ratchet wheel 293. The upper, forked end, of the lever 288 is connected to one end of a spring 298, the other end of which is connected to the bracket 286. The lower end of the lever 288 is positioned immediately above one end of a lever 299, the other end of which is bent upwardly to form the manually operable key 300, the lever 299 being pivoted to a standard 301. From this description it will be seen that the depression of the key 300 will cause the forked end of the lever 288 to descend against the action of the spring 298 and carry with it the slidable collar 290, which will throw the pawl 295 out of engagement with the ratchet wheel 293, and simultaneously permit the stepped end 292 of the lever 287 to engage the projecting pin 291 and thereby prevent the spring 298 from raising the forked end of the lever 288. The object of this movement is to permit the shaft 56 and the wheel 55 thereon to freely rotate and enable the spring 50 (Fig. 3) to function and move the slidable pin carriage 35 from one side of the machine to the other. When the pin carriage 35 has reached the limit of its movement a stop 302 fixed to and projecting from the side of the pin carriage will strike the upper end of the lever 287 so as to move the lower stepped end 292 thereof out of engagement with the pin 291 and permit the spring 298 to raise the forked end of the lever 288 and tapered collar 290 in order to allow the pawl 295 to be again moved into engagement with the ratchet wheel 293 by its spring 297.

It has been shown how the depression of a key 20 will cause the lever 27 to engage the extension 28 on the slidable escapement plate 29 and move it in one direction. The escapement wheel 294 is controlled by a stop 303 fixed to the plate 29 and lever 304 pivotally secured to that plate, the plate itself being provided with a slot (not shown in the drawings) through which the shaft 56 passes. The rear end of the lever 304 is connected to one end of a spring 305, the other end of which is fixed to a pin on the sliding plate 29, whereon is another stop pin 306 to limit the movement of the lever 304 by its spring 305. The object of the pivoted lever 304 is to enable the escapement shaft 56 and wheels 55, 293 and 294 to be rotated in a reverse direction by means and for a purpose that will be hereinafter described.

The pairs of quadrantal racks 150 and 151 mesh with wheels (in multiplication) and thereby actuate a registering mechanism each time they are returned to their normal positions (Figs. 1 and 46). The registering mechanism has been specially designed and the details of its construction will now be fully described.

The registering mechanism is mounted upon four shafts 307, 308, 309, 310 (Figs. 46 and 47), the ends of which are supported by a rearward extension of the respective division plates 24 and 25. The shaft 307 is slidably mounted and one of its projecting ends is slotted to receive a cam 311 (Fig. 3) which passes through the shaft 307 for the purpose of moving it longitudinally against the action of a spring 312 (Fig. 3) by which it will be returned to its normal position when the cam 311 is withdrawn. Upon the shaft 307 are rotatably mounted a plurality of register wheels 313 to 322 integral with each one of which is a toothed wheel 323, and a carrying tooth 324 (Figs. 45, 49, 50), which extends beyond the side of its register wheel. Rigidly secured to the shaft 307 at and near the respective division plates 24 and 25 are two radial arms 325—326 the outer ends of which are rigidly secured to a bar 327 whose ends are slidably arranged in suitably shaped orifices in the respective division plates 24 and 25 (Fig. 3). The register wheel 316 is provided with four additional carry forward teeth 324, and the five teeth are equally spaced, the wheel itself being marked 0, 1, five times making ten equally spaced markings. This is the ten shillings wheel and it is adapted to carry forward (£1) at each alternate movement. The register wheel 313 is marked at equal distances apart with numerals indicating 0, ⅛, ¼, ⅜, ½, ⅝, ¾, ⅞ these being respectively zero and fractions of pence. The register wheel 314 is provided with twelve equally spaced markings viz. 0 to 11, whilst the remaining register wheels 315 and 317 to 322 are provided with ten equally spaced markings viz., 0 to 9. The cam 311 will be actuated by member 367 under control of a cam 328 on the cam shaft 232, and its objects are first to bring the wheels 323 into mesh with the quadrantal racks 151 and secondly to move them out of mesh with those quadrantal racks and into mesh with the quadrantal racks 150 in order that a definite movement will be imparted to them first by one set of quadrantal racks and then by the other set of quadrantal racks. It might here be mentioned that whilst the register wheels and their respective wheels are moved longitudinally with the shaft 307 the length of the carry forward teeth 324 is such that the greatest longitudinal movement of the shaft 307 and parts thereon is not sufficient to move the teeth 324 out of alignment with the respective carry forward wheels 329 to 337. These carry forward wheels 329 to 337 are rotatably mounted upon the shaft 308 and are each provided with a cylindrical boss 338 adapted to fit into another cylindrical boss 339 on the respective toothed wheels 340 to 348 (Fig. 48) both the bosses 338 and 339 being capable of rotating separately. The length of the boss 338 is such that it projects beyond its respective wheel 340 to 348 as will be clearly seen by reference to Figs. 47 and 48. The adjacent pairs of faces of the respective wheels 329 to 337 and 340 to 348 are each provided with a stud pin 349 to which will be secured the respective ends of a coil spring 350 which surround the respective bosses 339. To the outer face of the wheels 340 to 348 is pivoted a double acting pawl 351, the inner end of which is adapted to engage with a detent 352 formed in the projecting ends of the bosses 338 and be normally maintained in frictional contact with the respective detents by a curved plate spring 353 secured to the respective wheels 340 to 348 (Fig. 47).

A toothed locking bar 354, provided with slots 355 through which the respective shafts 308 and 309 pass, is employed for the purpose of normally locking the wheels 329 to 337 until it is necessary to move members 354 out of engagement with wheels 329 to 337 in order to permit wheels 329 to 337 to rotate and thereby enable such movement to be temporarily stored in the respective springs 350 or directly transferred on to the next register wheel according to the calculation that is being made. The locking bars 354 are each provided with a tooth 354a at their lower ends and are each engaged by a tooth 324 as it passes through any of the teeth on the respective wheels 329 to 337. The locking bars lie immediately adjacent to their respective wheels 329 to 337 and are each provided with a catch plate 356 adapted to fit on to any one of the teeth of the respective wheels 329 to 337 and be normally maintained in engagement by means of levers 357 to which they are respectively pivoted at 358, one end of each lever 357 being rotatably mounted upon the shaft 310 the other end having an end of a spring 359 attached thereto, the other end of such springs being secured to a bar 360 that is fixed to the division plates 24 and 25.

When a carry takes place it is necessary to store the movement in the springs 350 and to lock the respective wheels 340 to 348 and for this purpose a plurality of spaced teeth 361 (Fig. 46) are formed upon or rigidly secured to the bar 327 so that as the shaft 307 is moved longitudinally the spaced teeth 361 will be moved into or out of engagement with the teeth on the respective wheels 340 to 348 according to the direction in which the shaft 307 and its attachments are moved.

In order that the movements of the various parts of the registering mechanism may be clearly followed it will be assumed that the result of multiplying one penny half penny (1½) by 9 is to be transferred to the totalling mechanism from the quadrantal racks 150—151. The multiplicand will have been set up on the pin carriage 35 by the depression of the 1 and 4 (½) keys 20, the movement of the regulator bars 154, previously explained, positioning the stepped plates 115, 115a and 116, 116a to determine the amount of movement to be made by the respective quadrantal racks 150 and 151, and the depression of the 9 multiplier key 64 has permitted the quadrantal racks 150, 151 to move that distance in a rearward direction. The various parts are now in readiness for the handle 261 to be operated. The partial rotation of the handle 261 will cause the cam shaft 232 and with it the cams 328, 362 and 363 to partly rotate. The movement of the cam 328 will cause the lever 364 to move upon its shaft 365 and thereby contact with the adjustable lever 366 and raise the rod 367 and cam 311 (fixed to the upper end thereof) to its second position. The cam 311 passes through a slot in the slidable shaft 307 and causes it to slide against a compression spring 312, Figure 3, moving the wheels 313—323 that are mounted on shaft 307 into mesh with the quadrantal racks 151. The return of the quadrantal rack 151 by the further rotation of the handle 261 in conjunction with a cam 362, will cause 4 pence to be registered upon the register wheel 314, this being the carry forward of ½×9. Continuing the movement the cam 311 is moved to the third position thereby moving the shaft 307 and its associated parts to their third position and placing the wheels 313 to 323 into mesh with the quadrantal racks 150. The continued rotation of the cam 363 will cause the cranked ends 368a of the quadrantal racks 150 to return to their normal position and in doing so the register wheel will be rotated so as to show ½ that is, the remainder of ½×9 and 9, (1×9) units will be added to the register wheel 314. It will be noted however that this register wheel already stood at 4, so that the addition of 9 further units will cause the register wheel to rotate until it reads 1 which is the remainder of pence after the addition of 9 to 4. This rotation however has caused the tooth 324 to contact with and raise the locking bar 354 at the same time imparting the movement of one unit to the wheel 329.

It has been explained that longitudinal movement of this shaft 307 by the cam 311 brings the teeth 361 into mesh with any tooth on the wheel 341 (Fig. 45) and it will therefore be clear that when the unit movement is made by the wheel 329 the movement will be stored in the spring 350. The final movement of the handle 261 will withdraw the cam 311 and permit the shaft 307 and the parts thereon to be returned to their normal positions by the springs 312 (Fig. 3). The teeth 361 will now be moved out of engagement with the respective wheels 340 to 348 and the spring 350 will actuate the wheel 341, causing it to move one unit, and to carry with it the toothed wheel 323 and register wheel 315 so that the latter is caused to move from 0 to 1. In this manner the registering mechanism will read 1 shilling one penny and one half penny—the product of 1½ pence × 9. It might here be emphasized that in a calculation involving the conversion of shillings into pounds every alternate unit of movement of the register wheel 316 will impart one unit of movement to the unit of pounds wheel 317. It should be noted that whilst the register wheels shown at Figs. 49 and 50 are the fraction wheels all the units of the registering mechanism are similar in construction.

It has been previously stated that the stepped plates 115—115a to 123—123a are used only in multiplication, but as these plates move in conjunction with the quadrantal racks 150—151, and the quadrantal racks 150 are used in other calculations, it is necessary to provide a means for disconnecting the quadrantal racks 150 from their respective T-shaped connecting plates 146. (Figs. 34 and 35).

By reference particularly to Figs. 34 and 35, it will be seen that a slotted cam 369 is rotatably mounted upon the shaft 272, beside each quadrantal rack 151, the quadrantal racks being used only in multiplying calculations. Each radial arm of the quadrantal racks 150 are provided with a specially shaped bolt 370 having a pin 371 at its lower end, such pin lying within the slot in the respective cams 369. The bolt 370 is arranged to slide in staples 372 formed in the respective radial arms of the quadrantal racks 150, the upper ends of the bolts being offset at 373. The T-shaped connecting plates 146 are each provided with a pivot 374 which lies in a slot formed in the respective radial arm 150 and during multiplying calculations is maintained in engagement with that radial arm by the offset end 373 of the bolt 370.

A shaft 375 is mounted in suitable bearings carried by the division plates 24 and 25 and a side wall of the machine, and fixed to this shaft are a number of radial levers 376 each one of which is connected by a link 377 to the respective cams 369. Another radial lever 378 is rigidly secured at one end to the shaft 375, the other end being secured to the rear end of a push rod 379, which is mounted in anti-friction rollers 380 and is maintained in its normal forward position by a spring 381 one end of which is secured to the push rod 379 (Fig. 40) and the other end to a fixed point 382.

Three additional push rods 383, 384 and 385 (Figs. 39, 41 and 43) are mounted similarly to the push rod 379 and a transversely positioned stop rod 386 is provided for the purpose of limiting the movement imparted to all four push rods by their respective springs 381. The rear end of the push rod 383 terminates in the forked lever 225. The push rod 384 terminates in a forked lever 387 that engages a pin 388 fixed to the adjustable lever 366. It is also provided with an inverted fork 389 that is engaged with one end of a crank lever 390 (Figs. 42, 68 and 69) that is rotatably mounted upon a shaft 391 which is supported in bearings formed in a bracket 392 fixed to the division plate 24, the crank lever 390 being provided with a hollow boss 393 adapted to rotate upon the shaft 391 and being provided with a radial lever 394 located at or near the lower end thereof. One arm of the crank lever 390 and the radial lever 394 are provided with pins that engage with an annular groove 395 formed in the boss of a radial lever 396 that is slidably mounted upon and rotatable with a shaft 397, the latter being supported in bearings formed in the division plates 24 and 25 and a side wall of the casing. The radial lever 396 is provided with an anti-friction roller 398 which when moved with its lever will lie over one end of one or the other cranked levers 399—400 which are rotatably mounted upon a shaft 401 secured in bearings formed in the division plate 24 and the adjacent vertical wall of the casing. The other or near ends of the crank levers 399 and 400 are each provided with anti-friction rollers and are actuated by the respective cams 402 and 403 on the cam shaft 232. The crank levers 399 and 400 are maintained in their normal position by springs 404.

The rear end of the push rod 385 is provided with a fixed cam 405 (Fig. 18) that is in engagement with one end of a radial lever 406 the other end of which is fixed to the vertical shaft 391, to the upper end of which is rigidly secured another radial lever 407. The outer end of the lever 407 is pivotally secured to a shaft 408 which is slidably mounted in bearings formed in the division plates 24 and 25. The object of this arrangement is for the purpose of the positioning of the mechanism which in combination with the pin carriage 35 controls the amount of movement to be made by the quadrantal racks in all calculations other than multiplication. This mechanism includes a plurality of pinions 409 that are rotatably mounted upon and slidable with the shaft 408. Each one of these pinions 409 is adapted to mesh with upper and lower regulating racks 410 and 411 respectively (Figs. 20 and 21), the rear end of the rack 410 being pivotally secured at 412 to the radial arm of its respective quadrantal rack 150, the lower racks 411 being mounted upon anti-friction rollers not shown in the drawings. The function of the lower rack 411 is similar to that of the extension 154a, and motion is imparted to it by the quadrantal rack 150 through the upper rack 410 and pinion 409. The pinions are arranged so that they are at all times in mesh with the respective lower racks 411 but when they are moved with the slidable shaft 408 they are disengaged from the upper racks 410, but they will never be disengaged from the latter racks until they are engaged by a registering tooth 413 which is formed upon the vertical member of its respective guide plate 414. The guide plate 414 may be held in position by horizontally positioned rods (not shown in drawings) upon which anti-friction rollers 415 will be mounted and arranged to contact with the upper edge of the rack 410.

The push rod 383 has a cam 416 formed upon its lower edge for the purpose of actuating certain mechanisms used during addition and subtraction calculations. The lower edge of the push rod 383 (Figs. 33 and 39) is normally in contact with an anti-friction roller mounted upon the forward end of a lever 417 that is fixed to a shaft 418, the rear end of which is pivotally connected to the upper end of a link 419, the lower end of which is connected to the outer end of a radial lever 420 that is rigidly secured to a shaft 421. A cam 422 is also rigidly secured to the shaft 421 its function being to engage the pendant end of a latch 423 that is pivotally secured to a radial lever 424 that is mounted upon a stud shaft 425 fixed to the division plate 25. The latch 423 is controlled by a spring 426, one end of which is secured to the latch the other end being secured to the lever 424, the latter also being controlled by a spring 427, one end of which is connected thereto, the other end being connected to the division plate 25, a stop 428 limiting the movement of the lever by the spring. A similar stop 429 limits the movement of the latch 423. One end of a lever 430 is pivoted to the lever 424, the other end being provided with an anti-friction roller adapted to engage with a cam 431 that is fixed to the cam shaft 232. The movement of the lever 430 is controlled by a spring 432 and the movement is limited by a stop 433. The lever 430 is provided with a catch pin 434 adapted to be engaged by the latch 423, when the lever is moved down by the cam 431 during multiplication and division calculations.

The various mechanisms actuated by the rear ends of the push rods 379, 383, 384 and 385 having been described, it will now be shown how the push rods themselves are moved various distances by the depression of manually operated keys.

Passing slidably through slots in the cover plate 21 are four manually operable keys 435, 436, 437 and 438 which are respectively clearance, addition, subtraction and division keys. The arrangement of these keys is clearly shown at Figs. 39, 40, 41, 43 and 44. The vertical member of each key has connected thereto one end of a spring 439, the other end of each spring being connected to a transverse rod 439a fixed in any convenient manner. Four horizontal shafts 440, 441, 442, 443 are suitably mounted in bearings formed in a side wall of the casing and a vertical division wall 444. The vertical member of each key is also provided with a slot 445 each of which will be pulled into engagement with the adjacent edge of the cover plate 21 by the respective springs 439, when their respective keys 435, 436, 437 or 438 are depressed by the operator and any of those keys will be manually released by moving them forward against the action of their springs. Upon the shafts 440, 441, 442 and 443 are mounted tubular shafts 446, 447, 448, and 449 respectively. The shaft 446 is provided with three radial levers 450, 451, 452 and another radial lever 453, the outer end of which is pivotally secured to the lower end of the key 435. The shaft 447 is provided with four radial levers 454, 455, 456, 457 and another radial lever 458, the outer end of which is pivotally secured to the key 436. The shaft 448 is provided with four radial levers 459, 460, 461, 462 and another radial lever 463, the outer end of which is pivotally secured to the key 437. The shaft 449 is provided with four radial levers 464, 465, 466, 467 and another radial lever 468, the outer end of which is pivotally secured to the key 438. The push rod 383 is provided with four equally spaced stud pins 469, 470, 471 and 472, the push rod 379 having a similar number of stud pins 473, 474, 475 and 476. The push rod 384 also has four stud pins 477, 478, 479 and 480, but the push rod 385 has only three stud pins 481, 482, and 483. The stud pins 469 to 483 inclusive are positioned in the plane of rotation of their respective levers 450, 451, 452, 454, 455, 456, 457, 459, 460, 461, 462, 464, 465, 466 and 467. The keys 435, 436, 437 and 438 move the push rods 383, 379, 384 and 385 longitudinally, but the distance the latter moves when a key is depressed depends upon the arc through which the levers 450 to 452, 454 to 457, 459 to 462, 464 to 467, must travel before they strike the respective pins 469 to 483. For example the levers 452, 461 and 464 lie immediately adjacent to their respective pins 477, 479 and 472, and the full movements of these levers will therefore be imparted to the pins and through them to the respective push rods 384 and 383. The hollow shaft 440 is also provided with an upwardly inclined radial lever 484 (Fig. 39), the outer end of which is pivotally secured to the forward end of a connecting rod 485 (Fig. 1) the rear end of which is pivotally secured to one end of a cranked lever 486 that is pivotally mounted upon a stud shaft 487. The other end of the cranked lever is pivotally secured to the lower end of a connecting rod 488, the upper end of which is pivoted to the outer end of a radial lever 489 (Figs. 1 and 3) the inner end of which is rigidly secured to a shaft 490. The shaft 490 is mounted in suitable bearings formed in a vertical wall of the casing and the division plate 24, its inner end being integral with one end of a horizontal locking plate 491, the other end of the locking plate being provided with a stud shaft 492 that lies in axial alignment with the shaft 490 and is mounted in bearings formed in the division plate 25. The object of the locking plate 491 is that when the clearance key 435 is depressed the locking plate 491 will be caused to impinge upon the locking bars 354 and thus prevent any of the numeral dials 313 to 322 from making a complete revolution by resisting the passage of any of the teeth 324. This locking plate 491 is actuated only for the purpose of returning all the register wheels 313 to 322 to zero.

In certain calculations it is necessary to move the pin carriage 35 against the action of its spring 50 and for this purpose a back spacing key 493 (Fig. 32) is provided. This key 493 passes vertically and slidably through a slot formed in the cover plate 21 and is integral with the forward end of a cranked lever 494 that is pivoted to a standard 495 rigidly secured to a base plate 496. The pendent end of the cranked lever 494 is pivoted to the forward end of a connecting link 497, the rear end of which is pivoted to one end of a lever 498 that is vertically pivoted upon a stud pin fixed to the base plate 496, its other end being pivotally secured to an elongated pawl 499. The rear edge of the forward end of the pawl is curved and this curved portion normally lies in contact with an anti-friction roller 500 mounted upon a stud pin fixed to the base plate 496, so that as the pawl 499 is thrust forward by its lever 498 it is also thrown outwardly in order that it will engage with a ratchet 501 on a plate 502. The plate 502 is slidably arranged in guide pieces 503 fixed to the base plate 496 and the movement of the lever 498 is limited by a stud pin 504 fixed to the base plate 496 in order that a forward thrust of the pawl 499 will move the plate 502 forwardly the distance of one tooth on the ratchet 501 and upon the return of the pawl to its normal position it will be in a position to engage with the next ratchet tooth.

The pawl 499 is maintained in contact with the roller 500 by means of a spring 505 one end of which is secured to the pawl 499, the other end being secured to the lever 498. The lever 498 is maintained in its normal position by a spring 506, one end of which is secured to the lever and the other end to a stud pin 507 fixed to the base plate 496. A toothed rack 508 is formed upon the opposite edge of the plate 502 and a pinion 509, adapted to engage therewith, is fixed upon the lower end of the vertical shaft 56. It will therefore be seen that as the plate 502 is moved by the pawl 499 the rack 508 will move the pinion 509 and with it the shaft 56 and toothed wheel 55, which being in engagement with the rack 54 fixed to the pin carriage 35 will cause the latter to move backwardly against the action of its spring 50.

In certain cases it is necessary to bring one or more stop pins 34, and the pin carriage 35 to their normal positions as for instance when keys have been manually struck in error, and to do this a special "error" lever (or key) 510 is provided. This lever is pivotally secured to a standard 511 that is rigidly secured to the base of the machine and one end thereof projects through a slot formed in the cover plate 21. The lever 510 (Fig. 2) is pivotally secured to the forward end of a rod 512, the rear of which is integral with a sliding plate 513, adapted to slide in bearings formed in standards 514 rising from the base plate 496. This sliding plate 513 (Fig. 32) is provided with a cam 515 adapted to engage the outer end of a radial lever 516 that is rotatably mounted upon the shaft 222, upon which is rigidly secured another radial lever 57, the outer end of which is pivotally secured to the lower end of a connecting rod 58, the upper end of which is connected to the pin carriage 35. Integral with the boss of the lever 516 and projecting radially therefrom is a short lever 519 that is adapted to engage with a stud pin 520 on the lever 57 when the radial lever 516 is actuated by the cam 515 (Fig. 32). This enables the index keyboard 35 to be lowered by the lever 57 on the shaft 222 without moving the lever 516.

The sliding plate 513 is provided with a slot 521 in which is an upwardly projecting pin 522 that is fixed to one end of a lever 523 which is centrally pivoted to the base plate 496, the other end of the lever 523 being provided with an antifriction roller which projects into a slot 524 formed in the plate 502. Both the slot 521 and the sliding plate 513 in which it is formed are of sufficient length to operate the lever 516 and to move the plate 502. The movement of the sliding plate 513 first causes the cam 515 that is connected thereon to operate the lever 516 and to cause the forward end wall of the slot 521 in the sliding plate 513 to contact with the pin 522 that is secured to one end of the lever 523. Continuing the movement of the sliding plate 513 the lever 523 is caused to partially rotate upon its pivot and in doing so moves the plate 502 by the anti-friction roller mounted upon one end of the lever 523 impinging against a wall of the slot 524 that is formed in the plate 502, see Figure 32. The object of the lever 523 is to move the plate 502 so as to rotate the pinion 509 and shaft 56 in order that the movement of the error lever 510 rearwardly will cause the pin carriage to be returned to its normal position after it has been lowered by the lever 516 on to the upper edges of the plates 162 to 170 for the purpose of returning all stops 34 to their normal positions as previously explained.

In order to cushion the rearward movement of the quadrantal racks 150, 151 a pair of cranked levers 525 (Fig. 1) are rotatably mounted upon the shaft 272 the upper ends of such cranked levers being connected together by means of rod 526 adapted to contact with the rear edges of the radial arms of the quadrantal racks 150 and 151, the lower end of the cranked levers 525 being engageable by the rear ends of the respective push rods 135 and 136 when the latter are moved rearwardly by the depression of a key in the bank of keys 64, in order to move the upper ends of the levers and with them the rod 526 forwardly into contact with the radial arms of the quadrantal racks before they start to move rearwardly as previously described. The return of the push rods 135 and 136 will permit the lower ends of the cranked levers to move with them for a part of the way and in doing so the upper ends of the levers will move rearwardly and permit the springs 207 to pull the quadrantal racks in a rearward direction. The springs 207 are connected at one end to the respective radial arms of the quadrantal racks 150 and 151 and at the other end to a transverse rod 208.

The quadrantal racks are separated from one another by quadrantal guide plates 209 (Figure 1) which are provided with a tooth or teeth not shown in the drawings, the ends of the plates 209 being secured to transverse rods 210 each one of which will have its ends securely fastened to the respective division plates 24 and 25. The object of the tooth or teeth on the plates 209 is to mesh with the teeth on the wheels 323 in order to hold them in position while they are being moved laterally by the cam 311.

The handle 261 lies exterior to the case containing the machine and is connected by a lever to a shaft 527 (Fig. 56) which is rotatably mounted in bearings formed in the adjacent side of the case and the division plate 25. The movement of the shaft 527 by the handle 261 operates the cam shaft 232 through a system of springs 528 and 529, levers 530, 531 and 532, and quadrantal rack 533 and the return of the handle is controlled by a dash pot 534. The speed of the forward and rearward movement of the cam shaft 232 is controlled by the dash pot. The handle cannot return until the cam shaft has made a complete forward movement but as this system is well known in connection with calculating machines—see for example U. S. Patent 504,963—it is not considered necessary to enter more fully into the details of construction.

In order to form guides for various sliding parts, combs 541 are provided and are fixed to transverse bars 542 as shown at Fig. 1 in various parts of the machine.

To ensure that every time the bars 135 and 136 are actuated by the depression of a key in the bank of keys 64 they must be thrust to the limit of their travel rearwardly in order that they will perform all the functions they are designed to perform, a double acting pawl 543 (Fig. 5) is pivotally secured to the division plate 25 and upon the underside of the bar 135 a ratchet 544 is formed, the teeth of such ratchet being adapted to engage with the pawl 543. At each end of the ratchet an arcuate reversing gap 545 is formed to permit the pawl 543 to change its position and thereby enable the ratchet to pass over it in the reverse direction.

For the purpose of explaining the movements of the various parts of the machine an example will now be given showing the manner in which the sum of five shillings and seven pence three farthings is multiplied by two hundred and forty three, but this description will deal more particularly with the operation of pin setting plates 162 to 170 and the supplementary plates 204—5—6.

The multiplicand keys 5 7 6 (⁶⁄₈=¾) are depressed in that order and thereby raise the respective vertical pins 32 for the purpose of positioning the three corresponding stop pins 34 successively. The release of each key after its depression actuates the escapement in order to move the pin carriage 35 and thereby position the next adjacent row of stop pins 34 over rods 32 before the next key is depressed. From this it will be seen that the multiplicand is now represented by a stop pin 34 in three separate rows, the final row being positioned to the extreme right or in alignment with the regulating bar 154 relating to the fraction multiplier plates 115—115a. The depression and release of the keys as stated will have caused the amount to be shown upon the indicator mechanism in front of the keyboard.

The multiplying operation may now be carried out and the keys representing the multiplier in the bank of keys 64 will be depressed and released in their reverse order that is to say the key corresponding to the units order digit is depressed and released first, the same as is done in ordinary methods of calculation, but after the release of each key the handle 261 is moved through an arc and returned. The depression of the 3 multiplier digit key releases the mechanism so that any of the regulator bars 154—154a that are free to do so may move to the limit determined by the relative stop pins 34. Simultaneously the pins 152 in the slotted T-shaped connecting plates 146 will have been positioned by the movement of the bell crank levers 141—142, the release of the multiplier digit key causing the locking bar 282 to move and release the quadrantal racks 150—151 when the latter will move rearwardly through an arc by the action of the springs 207 and be returned by the operation of the handle 261 as previously explained, the rearward movement being determined by the amount of movement the pins 152 are permitted to make inwardly towards steps on the multiplier plates 115—115a.

The release and consequent forward movement of the relative combined regulator bars and racks 154—154a will have caused the vertical racks 173, 174 and 175 to move downwardly in order to position the resetting plates 162, 163, 164 and 165 by the action of their respective springs 194 so that when the pin carriage 35 is lowered on to the upper edges of the pin setting plates 162 to 170 and also of the supplementary plates 204, 205 and 206 the stop pins 34 representing 5—7¾ will be returned to their normal position and other stop pins representing ten times 5—7¾ (=£2.16.5½) will be thrown over upon their pivots to the set or actuating position as previously described.

It will now be shown how the pin setting plates are moved in order to reset stop pins 34 to represent 10 times the amount represented by the stop pins 34 already positioned (in this case) by the depression of the multiplicand keys.

The units of movement of the vertical racks 173 to 181 inclusive will be the same in number as the horizontal units of movement of the combined regulator bars and racks 154—154a so that in this example the fraction regulator bar 154a would move the vertical rack 173 downwardly six units so that the pin 187 will be opposite the sixth step in the perforation 162a in the plate 162 thereby permitting the spring 194 to move the plate 162 forwardly four units of movement. It will therefore be seen that the plate 162 having been moved forwardly four units the gap 162b and its associated vertical tooth 162c will be moved to a position vertically below the fourth stop pin 34 (reading right to left) on Fig. 14. The downward movement of the vertical rack 173 carries with it the trip lever 185 which strikes the lever 213 and moves the cranked lever 212 on the plate 163 downwardly six units thus permitting the supplementary plate 204 to be moved seven units by its spring 194 thereby bringing the rear end of the lever 212 into engagement with the sixth step, thus bringing the gap 199 and its associated vertical tooth vertically below the seventh stop pin 34, (reading right to left Fig. 13). It will be noted that whilst only six horizontal steps have been made by the plate 204 the fourth step Z Fig. 13 represents two units of horizontal movement. The reason for this double distance of travel is that ⅜×10=3⅜=3⅝ and the next higher fraction ⅘ (½)×10=5 therefore two units of movement must be made on the next step as the difference between the whole numbers resulting from these two calculations is as the difference between 3 and 5=2.

Simultaneously with the forward movement of the fraction regulator bar 154—154a the pence regulator bar 154—154a will move forwardly seven units and cause the vertical rack to be moved downwardly seven units carrying with it the double acting pin 188—189 and positioning it so that the plate 163 (and with it the supplementary plate 204) will be permitted to move ten units of movement horizontally by the action of its relative spring 194, but as the supplementary plate 204 has already moved forward seven units the total amount of movement of the plates 163 and 204 will be 7+10=17 units of movement. This amount of movement however carries the gap 199 and its associated vertical tooth beyond (or in front of) the frame 35 and brings the gap 200 and its associated tooth vertically below the fifth stop pin 34, and in moving that distance the lower edge of the plate 204 will engage the cam 191 and partly rotate it and the shaft 190 and cam 192 when the latter will raise the cranked lever 216 that is pivoted to the plate 164, and with it the stud pin 217 which permits the supplementary plate 205 to be moved by its relative spring 194 one unit of movement horizontally, this being the one shilling carry forward from the pence plates 163—204 (17 pence= 1 shilling and 5 pence). The movement of the supplementary plate 205 will position the gap $x$ and its associated vertical tooth thereon vertically below the first stop pin 34 in the row of stop pins in the pin carriage above it. The downward movement of the vertical rack 174 will also have moved the end 189 of the double acting pin 188—189 downwardly seven units of movement thus bringing it in alignment with the last position on the double vertical step 535 on the plate 164 thereby permitting the plates 164 and 205 to be moved by their spring 194 five horizontal units and as the supplementary plate 205 has already been moved 1 unit the gap $x$ and its associated vertical tooth will be positioned vertically below the sixth stop pin 34 in the row of stop pins referred to.

Simultaneously with the forward movement of the fractions and pence regulator bars 154—154a the unit of shillings regulator bar will move forwardly five units of movement thus causing the vertical rack 175 to be moved downwardly a similar number of vertical units and to carry with it the pin 193 thus bringing it to the fifth position (the gap 536 in the stepped aperture in the plate 165) and thereby permitting the plate 165 to be moved by its spring 194 one horizontal unit and bringing the gap 537 and its associated vertical tooth vertically below the first stop pin 34 in the tens of shillings row of stop pins on the pin carriage. Up to this point the gap and associated tooth on the fraction plate 162 lies below the fourth stop pin 34 (¼) in the fraction row of stop pins on the pin carriage, the gap and associated vertical tooth on the supplementary plate 204 lies vertically below the fifth stop pin in the pence row, the gap and associated vertical tooth on the plate 164 lies below the sixth stop pin in the units of shillings row and the gap and associated vertical tooth in the plate 165 lies vertically below the first stop pin in the tens of shillings row. The downward movement of the vertical rack 175 has also carried the arm 186, pin 220 and lever 219 downwardly five units of movement so that the rear end of the lever 219 is in alignment with the third step 538 on the plate 206, thus permitting the supplementary plate 206 to be moved two units horizontally by its relative spring 194 and positioning the gap $x$ and its associated vertical tooth vertically below the second stop pin 34 in the units of pounds row of stop pins on the pin carriage.

The return of the handle 261 will cause the pin carriage to be lowered on to the upper edges of the pin setting plates 162 to 170 and their supplementary plates 204, 205, 206 which will cause the 5, 7, and 6 (¼) stop pins which were originally thrown over by the depression of the multiplicand keys 20 to be returned to their normal positions and the 2—16—5—4 (¼) stop pins 34 in the respective units of pounds, tens of shillings, units of shillings pence and fractions rows of stop pins to be thrown over to the set position. This represents a new multiplicand 2—16—5½ being 5—7¾×10. The return of the handle 261 after the depression of the 3 multiplier digit key in the bank of keys 64 will have caused the return of the respective quadrantal racks 150—151 and in doing so they will actuate the registering mechanism and cause the respective register wheels to be moved so as to read 16.11¼=the product of 5—7¾×3.

Continuing the example the 4 multiplier digit key in the multiplier bank of keys 64 will now be depressed and its depression releases the mechanism so that the regulator bars 154—154a that are free to do so may move to the limit determined by the relative stop pins 34 which are now the stop pins representing 2—16—5½ (¼). The regulator bars 154—154a will actuate the respective vertical racks which will determine the amount of movement to be made by the pin setting plates and the supplementary plates 204 and 205 and 206 in a similar manner to that already described so as to position them under stop pins 34 representing

28—4—7=2—16—5½×10

The return of the handle 261 after the depression of the 4 multiplier digit key in the bank of keys 64 will have caused the return of the quadrantal racks 150—151 and in doing so they will actuate the registering mechanism and cause the register wheels to be moved until they read 12.2.9¼=5.7¾×3=16.11¼+5.7¾×40=11.5.10.

It might here be mentioned again that each time the handle 261 is operated the pin setting plates 162 to 170 and the supplementary plates 204—5—6 are returned by cam 241, parallel bars 242 and transverse rod 243 to their normal position after they have reset the stop pins 34 on the pin carriage to determine the amount of movement to be made by the respective regulator bars 154—154a when they are next released.

The next operation is to depress the 2 multiplier digit key in the bank of keys 64 which releases the mechanism so that the regulator bars 154—154a that are free to do so may move to the limit determined by the stop pins 34 which are now those representing £28—4—7. This movement of the regulator bars 154—154a will actuate the respective vertical racks 174—5—7—8 which will determine the amount of movement to be made by the pin setting plates 163, 164, 166, 167 and 168 supplementary plates 205, 206 in a similar manner to that already described so as to position them under the stop pins 34 representing 282.5.10, this being the product of £28.4.7×10. The return of the handle 261 after the depression of the 2 multiplier digit key in the multiplier bank of keys 64 will have caused the return of the quadrantal racks 150—151 and their return movement will actuate the registering mechanism and cause the register wheels to be moved until they read 68.11.11.¼ which is the result of adding £56.9.2 (=5.7¾×200) to £12.2.9¼ already placed upon the registering mechanism.

The calculation is now complete but owing to the automatic pin setting of the stop pins 34 on the pin carriage they are reset at ten times the multiplicand previously set up in each operation of the handle 261, and it is for that reason that the stop pins 34 at this juncture are set to represent 282.5.10 although this amount goes beyond the calculation that has been made. The calculation having been completed it is necessary to return all the parts to their normal positions. This is done by the depression of the clearance key 435 and as the result of its depression will now be described.

The depression of the key 435 will cause the lever 452 to contact with the pin 477 and rod 384 and move the adjustable lever 366 to its third position so that when the handle 261 is operated the cam 311 will immediately place the wheels and their associated numeral dials into their second position. The movement of the rod 384 will also position the lever 396 so that when the handle 261 is operated it will be actuated by the lever 400 and thereby throw the locking bar 282 out of engagement with the quadrantal racks 150—151 so that those that are free to do so may be moved by their springs 207. The depression of the key 435 also actuates the rod 485, crank lever 486, connecting rod 488 and lever 489 so as to move the locking plate 491 into its locking position. It also moves the rod 379 (Fig. 40) and its associated parts so as to withdraw the end 373 of the bolt 370 in order to release the pins 374 and their quadrantal racks 150 from the slotted T-shaped connecting plates 146. The movement of the key 435 and rod 384 will also position the lever 396 so that the locking bar 282 is thrown out of engagement with the quadrantal racks 150 so that those that are free to do so will be actuated by their springs 207 and in moving will gear with the wheels 323 of the registering mechanism and rotate them in a reverse direction until the pins 324 on any of the register wheels 313 to 322 contact with the tooth 354a on the locking bar 354 which prevents their further rotation as the locking bar 354 is prevented from rising by the locking plate 491 being in its locking position. The register wheels are now at their zero positions and the return of the handle 261 will withdraw the cam 311 and permit the wheels 323 to be moved laterally by the spring 312 out of gear with the quadrantal racks 150 when the latter will be returned to their normal positions by means of their cams 363. It may here be noted that the depression of any one of the keys 435—6—7—8 will release the quadrantal racks 150 in a similar manner to that which has just been described in reference to key 435.

The movement of the rod 383 places the lever 226 in the second position ready to be actuated by the cam 539 actuating a lever 228a when the handle 261 is operated; this causes the timed lowering of the pin carriage on to the edges of the resetting plates 162 to 170 (already returned to normal) and these edges will return all the stop pins 34 previously thrown over, to their normal position. At the same time the rod 383 will actuate the lever 417 and through it the lever 419 which will cause the came 422 to operate the latch 423 and release the articulated lever 430 (which was locked under the latch at the commencement of the multiplying calculation) on the pendent lever 424 permitting the cam 431 to move the latter (when the handle 261 has been operated) so as to return the sliding plate 502 to its normal position and this plate, through the rack 508 and toothed wheel 509 in engagement therewith, will cause the return of the pin carriage 35 to its normal position. The various parts have now all been positioned in readiness for the handle 261 to be operated when the release of the key 435 will permit the rods 379, 383 and 384 and their associated parts to be returned to their normal positions by the springs 381.

For making calculations in addition the addition key 436 will be depressed and automatically locked in that position as previously explained and the keys 20 to represent the first item of the amounts to be added together are depressed in order to position the stops 34 on the pin carriage representing that amount. The depression of the addition key 436 brings the levers 454, 455, 456 and 457 into contact with the respective pins 470, 474, 478, 481 and thereby slides the respective rods 383, 379, 384 and 385 rearwardly. The rearward movement of the rod 383 positions the lever 223 in order that it may be operated by the cam 539 through the lever 228a when the handle 261 is rotated in order to return the stops 34 on the index keyboard 35 to their normal positions, and to return the pin carriage 35 itself to its normal position by the cam 416 as previously explained. The rearward movement of the rod 379 moves the bolt 370 and releases the quadrantal racks 150 from the slotted T-shaped connecting plates 146. The rearward movement of the rod 384 places the lever 366 in the second position so that when the handle 261 is operated the lever 366 may be actuated by the lever 364a which is actuated by the cam 328a for the purpose of positioning the register wheels 313 to 321. It also moves the crank lever 390 which positions the lever 396 so that the latter will be actuated by the lever 399 that is actuated by the cam 403, (when the handle 261 is operated), the movement of the lever 396 causing the shaft 397 and lever 540 to partly rotate and doing so move the locking bar 282 out of engagement with and thereby release the quadrantal racks 150 and 151.

From the foregoing description it will be seen that the quadrantal racks 150 have been released (by the movement of the push rod 379) from the slotted T-shaped connecting plates 146 so that when the quadrantal racks 150 are released from engagement with the locking bar 282 they would be free to be moved to the limit by their springs 207, but the movement of the push rod 385 brings a control mechanism into operation in order to control the movement of the quadrantal racks 150. The operations of this mechanism will now be described. The rearward movement of the push rod 385 will cause the cam 405 to actuate the lever 406, shaft 391 and lever 407, so as to move the shaft 408, and pinion 409 thereon, longitudinally from the position shown at Fig. 20 to the position shown at Fig. 21, so as to bring the pinions 489 into mesh with the regulating racks 410 and 411 in order that the motion imparted to any of the quadrantal racks 150 that are free to be moved by their springs 207 will cause the upper regulating bars 410 to rotate their respective pinions 409 which will cause the lower racks to travel forward to the limit determined by the stop pin 34 that has been set in that row of stop pins.

The mechanism has now been placed in readiness for the continuation of the addition calculation and after the depression of the keys 20 representing the amount of each separate item in the calculation, the handle 261 will be operated and at each operation thereof the amount of those items will be added to the amount already shown on the register wheels of the registering mechanism, the amount being added by the return movement of the quadrantal racks 150.

It will here be noted that every item of the addition calculation is automatically shown upon the indicating drums 76—7—8 of the indicator mechanism in front of the keys 20 and after each operation of the handle 261 the indicator mechanism will be manually returned to its normal position in readiness to be actuated for the purpose of showing the amount of the next item represented by the next set of keys 20 depressed.

At the end of the addition calculation the registering mechanism will be returned to its normal zero position by the depression of the clearance key 435, the operation of which has already been described.

Subtraction

In making subtraction calculations the addition key 436 is first depressed and the major amount is then placed upon the pin carriage by the depression of the keys 20 representing that amount. The handle 261 is now operated for the purpose of placing the major amount on the register wheels 313 to 321 and after the return of the handle the addition key 436 is manually released. The release of the addition key 436 will cause it and its associated parts to be returned to their normal positions by the respective springs 381 and 439. The indicating drums 76—7—8 of the registering mechanism will be manually returned to zero by operation of the handle 90. The next operation is to depress the subtraction key 437 and separately depress the keys 20 to represent the minor amount and thereby position the corresponding stop pins 34 on the pin carriage. The depression of the key 437 will first move the push rod 384 and lever 366 into the third position and thereby move the wheels 323 into mesh with quadrantal racks 150 so that when the handle 261 is operated the quadrantal racks will actuate the wheels 323 in its first or rearward movement in the same manner as has already been described in connection with the operation of the clearance key 435. The movement of the rod 384 causes the inverted fork 389 to position the lever 396 for the purpose of disengaging the locking bar 282 from the quadrantal racks 150. The movement of the push rod 379 moves the bolt 370 and releases the quadrantal racks 150 from the slotted T-shaped connecting plates. The movement of the rod 383 is for the purpose of timing the lowering of the pin carriage 35 on to the upper edges of the pin setting plates 162 to 170 (that is upon the operation of the handle 261) and also for positioning the cam 416 so that the pin carriage will be returned to its normal position through the rotation of the cam 431 (Fig. 33) when the handle 261 is operated as has already been described. The movement of the push rod 385 throws the pinions 409 on the shaft 408 into mesh with the upper and lower racks 410 in order that the stop pins 34 on the pin carriage 35 may limit the rearward movement of the quadrantal racks 150 (Fig. 20) as has already been described.

The various mechanisms are now positioned in readiness for the operation of the handle 261 and upon the completion of this operation the register wheels 313—322 will show the result of subtracting the minor amount from the major amount. This having been done the subtraction key 437 will be manually released and its release will permit the parts actuated thereby to be returned to their normal positions.

The calculation having been completed the clearance key 435 will be depressed and automatically held while the handle 261 is operated when the various parts will be returned to their normal position and the register wheels on the registering mechanism returned to zero as has already been explained, and finally the clearance key 435 will be manually released so that it and its associated parts may be returned to their normal positions as previously explained.

*Division*

Division is carried out by the complementary system which is common practice when division is performed on an adding machine. It consists briefly in adding the complement of divisor to the dividend which causes a carry into the next adjacent adding wheel such carrying equalling the number of times the divisor is subtracted from the dividend and thus the carried amount is really the quotient. The description in regard to such calculations will therefore be confined to the procedure for positioning of the parts for making calculations.

The first step is to position the stop pins 34 on the pin carriage 35 to represent the dividend in order that that amount will be indicated on the register wheels 313 to 322 and this is done in exactly the same manner as has previously been described in reference to addition and subtraction and which includes the depression and subsequent release of the addition key 436 and the return of the stop pins 34 and pin carriage 35 to their normal positions. The key or keys 20 representing the divisor according to the system of complementary addition is or are then depressed in order to position corresponding stop pins 34 on the pin carriage. The escapement release key 300 will now be depressed to disengage the escapement locking device 290, the pawl 295 thereby being actuated so as to permit the pin carriage 35 to be drawn to the extreme left of the machine by the springs 50, and its release will return the locking device 290, 295 to its normal position as shown at Fig. 32, wherein the sliding plate 502 is in a position, relative to the escapement shaft 56 and pinion 509, for division calculations. The division key 438 is now depressed and its depression will move the push rod 383 so that it moves the lever 223 to an inoperative position in order that the pin carriage 35 will not be lowered (as in other cases) when the handle 261 is operated and leaving the mechanism for returning the plate 502 in the position shown at Fig. 32. The movement of the push rod 379 will disengage the quadrantal racks 150 so that they will function as in addition. The movement of the push rod 384 will position the lever 366 so that the registering mechanism will be positioned as already described in reference to addition calculations and also position the lever 396 so that the locking bar 282 will be disengaged from the quadrantal racks 150 as also has been described in reference to addition. The movement of the push rod 385 will cause the pinions 409 to mesh with the upper and lower racks 410 and 411 as for addition (Fig. 21).

The stop pins 34, representing the divisor, and the pin carriage 35 having now been placed in an actuating position the calculation may be proceeded with according to the system referred to and when necessary the pin carriage 35 will be caused to be moved one space to the right by the depression of the back spacing key 493 which will actuate the elongated pawl 499 causing the latter to engage with one of the teeth 501 on the sliding plate 502 so as to move the latter the distance of one tooth, this motion being conveyed through the escapement shaft 56 to the pin carriage 35. When the calculation is completed the quotient (reading from left to right) and remainder (if any) will be shown on the register wheels 313 to 322 of the registering mechanism.

The result of the calculation having been obtained the division key 438 will be released when certain parts will automatically be returned to their normal positions and in order to bring to normal all the parts that are still out of their normal positions the clearance key 435 will be depressed and the handle 261 operated so that various parts will be positioned and actuated as previously described when the clearance key 435 will be manually released so that the machine will now be ready for use in making such other calculations as may be required.

When a manual error occurs by striking the wrong key in the bank of keys 20 the error may be corrected by the operation of the error lever 510 which will return the stop pins 34 and pin carriage to their normal positions.

I claim:

1. In a machine of the class described, a register, a carriage, vertically movable, a field of stops in said carriage suitable to represent values, a series of keys for setting said stops, a second series of keys, differential mechanism for said register operative under control of the second series of keys and said stops and including a series of racks horizontally movable in different degree determined by set stops in said field, and means operative upon vertical movement of the carriage to vary the setting of stops in said field and including a series of slidably mounted plates for engaging said stops and movable in variable degree under control of said racks.

2. In a machine of the class described, a register, a carriage, vertically movable, a field of stops in said carriage settable to represent values, a series of keys for setting said stops, a second series of keys, differential mechanism for said register operative under control of said second series of keys and said stops and including a series of racks horizontally movable in different degree determined by set stops in said field, means to vary the setting of stops in said field and including a series of horizontally slidable plates tensioned for movement in different degree for engagement with different stops upon vertical movement of the carriage, and means for controlling the degree of movement of the plates comprising a series of vertically movable racks geared to the racks of the first mentioned series, said last racks and said plates having stepped slot and pin connections therebetween.

3. In a machine of the class described, a register, a carriage, vertically movable, a field of stops in said carriage settable to represent values, a series of keys for setting said stops, a second series of keys, differential mechanism for said register operative under control of said second series of keys and said stops and including a series of racks horizontally movable in different degree determined by set stops in said field, means to vary the setting of stops in said field including a series of horizontally slidable plates tensioned for movement in different degree for engagement with said stops upon vertical movement of said carriage, and means for controlling the degree of movement of the plates comprising a series of vertically movable racks geared to the racks of the first mentioned series, some of the last racks having stepped slot and pin connections with some of said plates singly, and one of said last racks having similar connections with two of said plates for controlling their movement simultaneously and in relatively different degree.

4. In a machine of the class described, a register, a carriage, vertically movable, a field of stops disposed in said carriage in denominational rows and settable to represent values, a series of keys for setting said stops, a second series of keys, differential mechanism operative under control of said second series of keys and set stops in said field, and means operative upon vertical movement of said carriage to vary the set up of stops in said field and including a series of slidably mounted plates having respectively straight edge portions for engaging one row of stops and offset portions for engaging another row of stops, said plates being movable in different degree under control of the differential mechanism for cooperative relation of their offset portions with different stops of their related rows.

5. In a machine of the class described, a register, a carriage, vertically movable, a field of stops disposed in denominational rows in said carriage and settable to represent values, a series of keys for setting said stops, a second series of keys, differential mechanism for said register operative under control of said second series of keys and said stops and including a series of denominational racks horizontally movable in different degree determined by set stops in said field, means to vary the setting of stops in said field including a series of denominational plates tensioned for movement in different degree for engagement with different stops of said rows upon vertical movement of the carriage, means for controlling movement of said plates including a second series of racks geared to the racks of the first series, and stepped slot and pin connections between the racks of said second series and said plates, and auxiliary denominational plates slidable on certain of said series of plates and tensioned for independent movement thereon under control of racks of the second series.

6. In a machine of the class described, a register, a carriage, vertically movable, a field of stops disposed in denominational rows in said carriage and settable to represent values, a series of keys for setting said stops, a second series of keys, differential mechanism for said register operative under control of said second series of keys and said stops and including a series of denominational racks horizontally movable in degree determined by set stops in said field, means to vary the setting of stops in said field including a series of denominational plates tensioned for movement in different degree to engagement with different stops of said rows upon vertical movement of said carriage, means for controlling movement of said plates including a second series of racks geared to the racks of the first series, and stepped slot and pin connections between the racks of the second series and said plates, and auxiliary denominational plates slidable on certain of said series of plates tensioned for independent movement under control of racks of the second series and an auxiliary plate slidably mounted on one plate of said series and movable independently thereon under control of one of the first mentioned auxiliary plates.

7. In a machine for multiplying English currency or the like, a register, a carriage, vertically movable, a field of stops in said carriage settable to represent values, keys for setting up the value of a multiplicand in said field, differential mechanism for said register including a series of racks horizontally movable in different degree determined by set stops in said field, a second series of racks having stop pins thereon and movable under control of said first racks to differentially set said pins, slidable plates having notches therein which coact with the stop pins, carrying mechanism between certain of said plates, the carrying mechanism and coaction of notches and stop pins controlling movement of the plates, and means on the plates movable therewith for engagement with said stops upon vertical movement of the carriage to set stops corresponding in value to the multiplicand value multiplied by ten.

8. In a machine for multiplying English currency or the like, a register, a carriage vertically movable, a field of stops in said carriage settable to represent values, keys for setting up the value of a multiplicand in said field, differential mechanism for said register including a series of racks horizontally movable in different degree predetermined by set stops in said field, a second series of racks having stop pins thereon and movable under control of said first racks to differentially set said pins, slidable plates having notches therein which coact with the stop pins, carrying mechanism between certain of said plates, the carrying mechanism and coaction of notches and stop pins controlling movement of said plates, and means on said plates including lugs for engagement with said stops upon vertical movement of the carriage to set stops corresponding in value to the multiplicand value multiplied by ten.

9. In a machine for multiplying English currency or the like, a register, a carriage vertically movable, a field of stops in said carriage settable to represent values, keys for setting said stops to represent the value of a multiplicand, differential mechanism for said register including a series of racks horizontally movable in different degree under control of set stops in said field, a second series of racks having stop pins thereon movable under control of said first racks to set said pins, a series of slidable plates for engagement with said stops upon vertical movement of the carriage to vary the setting in said field said plates having stepped notches therein for coaction with said stop pins to control movement of said plates in different degrees corresponding to multiplicand values set up on the stop filed multiplied by ten, and means between certain of said plates for effecting a transferring movement from one to another.

10. In a machine for multiplying English currency, a register, a carriage vertically movable, a field of stops arranged in denominational rows in said carriage and settable to represent values, keys for setting said stops to represent the value of a multiplicand, a series of multiplier keys, differential mechanism for said register operative under control of the multiplier keys and stops in said field and including a series of racks horizontally movable under control of the multiplier keys and set stops in said field, means for varying the setting of stops in said field upon vertical movement of the carriage vertically and including a second series of racks having stop pins thereon and movable under control of the first mentioned racks to differentially set said pins, slidable plates having stepped notches therein for coaction with said pins in the different settings thereof said plates corresponding to eighths of pence, pence, and pounds denominations respectively, carrying plates on the pence units of shillings and units of pounds plates movable thereon, stepped notch and pin connections between the carrying plates and the first mentioned plates, the pence carrying plate being notched to represent in degrees of movement eighths of pence multiplied by ten, the units of shillings carrying plate being notched to receive a carry when the total pence exceeds eleven, and the units of pounds carrying plate being notched to represent in degrees of movement any possible carry from the units of shillings when an amouont exceeding one shilling is multiplied by ten.

11. A multiplying machine operating directly in non-decimal notations, comprising in combination a single set of denominational devices including one device for each multiplicand denomination, representing the products of the multiplier digits 1 to 9 multiplied by each digit in the respective nondecimal denomination, a plurality of settable members and means for disposing said members to represent the digits of the multiplicand, range selecting means for selecting the range of products appropriate to each multiplicand digit represented by the settings of said settable members, means for reading the settings of said settable members and for simultaneously operating the range selecting means to select the range of products appropriate to each setting, a plurality of denominational elements for changing the settings of said settable members, and means for moving said setting-changing elements, under the control of the reading means, from a datum position to an extent representing the digit in the respective denomination of the tens multiple of the multiplicand.

12. A multiplying machine operating directly in non-decimal notations, comprising in combination a single set of denominational devices including one device for each multiplicand denomination, representing the products of the multiplier digits 1 to 9 multiplied by each digit in the respective non-decimal denomination, a plurality of settable members and means for disposing said members to represent the digits of the multiplicand, range selecting means for selecting the range of products appropriate to each multiplicand digit represented by the settings of said settable members, a plurality of denominational reading elements for reading the settings of said settable members and for simultaneously operating the range selecting means to select the range of products appropriate to each setting, a plurality of denominational elements for changing the setting of said settable members wherein those setting-changing elements of denominations in which the tens multiple of the corresponding denominational digit of the multiplicand may contain a significant digit are under the direct control of the corresponding denominational reading element, and means for imparting to a setting-changing element of higher denomination under the control of a reading element of lower denomination a movement, additional to any movement imparted to said setting-changing element under the control of its own denominational reading element, and representing the digit in that higher denomination of the tens multiple of the multiplicand digit of said lower denomination.

13. A multiplying machine according to claim 12, for sterling calculations wherein the units of pounds setting changing element has imparted to it under the control of the reading element for the units of shillings denomination, a movement representing the units of pounds digit of the tens multiple of the units of shillings digit of the multiplicand.

14. A multiplying machine according to claim 12, wherein the setting changing elements are in the form of slides having steps co-operating with the reading element which controls the slide, the steps in slides of denominations in which the tens multiple of the corresponding denominational digit of the multiplicand may have a significant digit cooperating with the corresponding denominational reading element, while the steps in slides of denominations in which the tens multiple of the corresponding denominational digit of the multiplicand never has a significant digit co-operate with a reading element of lower denomination, and those slides to which a movement is to be imparted under the control both of the corresponding reading element and of a reading element of lower denomination are made in two relatively movable parts constituting a main slide and an auxiliary slide whereof the main slide has steps co-operating with the corresponding denominational reading element and the auxiliary slide has steps co-operating with a reading element of lower denomination.

15. A multiplying machine according to claim 12 wherein the settable members are in the form of settable stops and the setting changing elements are in the form of slides having steps co-operating with the reading element which controls the slide, the steps in slides of denominations in which the tens multiple of the corresponding denominational digit of the multiplicand may have a significant digit co-operating with the corresponding denominational reading element, while the steps in slides of denominations in which the tens multiple of the corresponding denominational digit of the multiplicand never has a significant digit co-operate with a reading element of lower denomination, and those slides to which a movement is to be imparted under the control both of the corresponding reading element and of a reading element of lower denomination are made in two relatively movable parts constituting a main slide and an auxiliary slide whereof the main slide has steps co-operating with the corresponding denominational reading element and the auxiliary slide has steps co-operating with a reading element of lower denomination, each single slide and each auxiliary slide carrying a projection disposed so as to register with a given stop when the slide has been moved to an extent representing the value of that stop, the machine including also means for effecting relative movement between the stops and the slides to effect restoration to normal position of previously set stops and to cause the projections on the slides to set the stops with which they are in register.

16. A multiplying machine operating directly in non-decimal notations, comprising in combination a single set of denominational devices including one device for each multiplicand denomination, representing the products of the multiplier digits 1 to 9 multiplied by each digit in the respective non-decimal denomination, a plurality of columns of settable stops, means for disposing said stops to represent the digits of the multiplicand, range selecting means for selecting the range of products appropriate to each multiplicand digit represented by the setting of said stops, a plurality of denominational reading elements for reading the settings of said stops and for simultaneously operating the range selecting means to select the range of products appropriate to each setting, a plurality of denominational slides, means for moving said slides under the control of the reading elements an amount representing the tens multiple of the stop setting, and means on said slides for disposing the previously set stops to normal position and for resetting the stops to represent the amount to which the slides have been set.

17. A multiplying machine according to claim 16, wherein the setting changing elements are in the form of slides having steps co-operating with the reading element which controls the slide, the steps in slides of denominations in which the tens multiple of the corresponding denominational digit of the multiplicand may have a significant digit co-operating with the corresponding denominational reading element, while the steps in slides of denominations in which the tens multiple of the corresponding denominational digit of the multiplicand never has a significant digit co-operate with a reading element of lower denomination, and those slides to which a movement is to be imparted under the control both of the corresponding reading element and of a reading element of lower denomination are made in two relatively movable parts constituting a main slide and an auxiliary slide whereof the main slide has steps co-operating with the corresponding denominational reading element and the auxiliary slide has steps co-operating with a reading element of lower denomination.

18. A multiplying machine according to claim 16 wherein the elements for reading the settings of the stops are in the form of denominational reciprocating members, and including a pair of notched partial product plates to each of said reciprocating members, an element for sensing the notches in each of said partial product plates, an operative connection between each reading element and the corresponding pair of partial product plates, a control member for each slide and an operative connection between each control member and the corresponding denominational reading element, whereby when each reading element takes a setting from a stop the corresponding slide is positioned to represent the corresponding denominational digit of the tens multiple of the multiplicand and each partial product plate is positioned to present to the corresponding sensing element a range of notches appropriate to the corresponding denominational multiplicand digit which has been read, means for moving each notch sensing element to a position in the range of notches which has been presented to it corresponding to a desired multiplier digit, means for thereupon moving each sensing element into the notch thereby presented to it, a plurality of denominational devices for indicating the product, and operative connections between said denominational devices and the corresponding notch-sensing elements.

ERNEST CHARLES McCLURE.